US012810378B2

(12) United States Patent
Hughes et al.

(10) Patent No.: US 12,810,378 B2
(45) Date of Patent: Nov. 24, 2026

(54) CHAINED ACCELERATOR OPERATIONS WITH STORAGE FOR INTERMEDIATE RESULTS

(71) Applicant: INTEL PRODUCTS IP LLC, Santa Clara, CA (US)

(72) Inventors: Christopher J. Hughes, Santa Clara, CA (US); Saurabh Gayen, Portland, OR (US); Utkarsh Y. Kakaiya, Folsom, CA (US); Alexander F. Heinecke, San Jose, CA (US)

(73) Assignee: INTEL PRODUCTS IP LLC, Santa Clara, CA (US)

( * ) Notice: Subject to any disclaimer, the term of this patent is extended or adjusted under 35 U.S.C. 154(b) by 0 days.

(21) Appl. No.: 17/967,768

(22) Filed: Oct. 17, 2022

(65) Prior Publication Data

US 2024/0127392 A1 Apr. 18, 2024

(51) Int. Cl.
*G06T 1/60* (2006.01)
*G06T 1/20* (2006.01)

(52) U.S. Cl.
CPC . *G06T 1/60* (2013.01); *G06T 1/20* (2013.01)

(58) Field of Classification Search
CPC . G06T 1/60; G06T 1/20; G06F 9/3836; G06F 13/1668
See application file for complete search history.

(56) References Cited

U.S. PATENT DOCUMENTS 10,728,091 B2 7/2020 Zhao et al.
10,757,487 B2 * 8/2020 Kumar ................. G02B 6/3882
10,891,707 B2 1/2021 Appu et al.
11,281,602 B1 3/2022 Iyer et al.
11,550,585 B2 1/2023 Rusitoru et al.
11,809,341 B2 * 11/2023 Lee ......................... G06F 3/061
2018/0349292 A1 * 12/2018 Tal ........................ G06F 12/123
2019/0005703 A1 1/2019 Golas et al.
2020/0210351 A1 * 7/2020 Mody ..................... G06F 13/28
2021/0026686 A1 * 1/2021 Sakharshete .......... G06F 9/3877
(Continued)

OTHER PUBLICATIONS

Andersch et al., "Inside the NVIDIA Hopper Architecture", NVIDIA, Mar. 22, 2022, 51 Pages.
(Continued)

*Primary Examiner* — Jin Cheng Wang
(74) *Attorney, Agent, or Firm* — Nicholson De Vos Webster & Elliott LLP

(57) ABSTRACT

A chip or other apparatus of an aspect includes a first accelerator and a second accelerator. The first accelerator has support for a chained accelerator operation. The first accelerator is to be controlled as part of the chained accelerator operation to access an input data from a source memory location in system memory, process the input data, generate first intermediate data, and store the first intermediate data to a storage. The second accelerator also has support for the chained accelerator operation. The second accelerator is to be controlled as part of the chained accelerator operation to receive the first intermediate data from the storage, without the first intermediate data having been sent to the system memory, process the first intermediate data, and generate additional data. Other apparatus, methods, systems, and machine-readable medium are disclosed.

25 Claims, 39 Drawing Sheets

(56) References Cited

U.S. PATENT DOCUMENTS

| | | | | |
|---|---|---|---|---|
| 2021/0117360 | A1 | 4/2021 | Kutch et al. | |
| 2021/0149680 | A1* | 5/2021 | Hughes | G06F 12/0811 |
| 2021/0303481 | A1* | 9/2021 | Ray | G06F 9/38885 |
| 2023/0049442 | A1* | 2/2023 | Hung | G06F 9/30043 |
| 2024/0069736 | A1* | 2/2024 | Madugula | G06F 3/0611 |
| 2024/0126555 | A1 | 4/2024 | Gayen et al. | |
| 2024/0127392 | A1 | 4/2024 | Hughes et al. | |
| 2024/0272872 | A1* | 8/2024 | Ito | G06F 11/20 |

OTHER PUBLICATIONS

Andersch et al., "NVIDIA Hopper Architecture In-Depth", Technical Blog, 2022, 15 pages.

Intel ,"Intel Registered Resource Director Technology (Intel Registered RDT) on 2nd Generation Intel (Registered) Xeon Registered Scalable Processers reference Manual", Revision 1.0, Apr. 2019, 24 pages.

Intel, "Intel Registered Virtualization Technology for Directed I/O", Architecture Specification, Order No. D51397-011, Rev. 3.1, Jun. 2019, 285 Pages.

Intel, "Scalable I/O Virtualization Revision 1.0", Version 1.2, Open Compute Project, Feb. 2022, 30 pages.

Khang T Nguyen "Introduction to Cache Allocation Technology in the Intel (Registered) Xeon (Registered) E5 v4 Family", available online at <https://www.intel.com/content/www/us/en/developer/articles/technical/introduction-to-cache-allocation-technology.html>, Feb. 11, 2016, 4 pages.

NVIDIA, "NVIDIA A100 Tensor Core GPU Architecture Unprecedented Acceleration at Every Scale", V1.0, 2020, pp. 1-82.

NVIDIA, "NVIDIA Grace Hopper Superchip Architecture Performance and Productivity for Strong-Scaling HPC and Giant AI Workloads", V1.0, 2022, 39 Pages.

NVIDIA, "NVIDIA H100 Tensor Core GPU Architecture Exceptional Performance, Scalability, and Security for the Data Center", 2022, pp. 1-70.

Saileshwar et al., "Bespoke Cache Enclaves: Fine-Grained and Scalable Isolation from Cache Side-Channels via Flexible Set-Partitioning", 2021, 13 pages.

Non-Final Office Action, U.S. Appl. No. 17/967,740, Jan. 9, 2025, 49 pages.

Non-Final Office Action, U.S. Appl. No. 17/967,756, Mar. 9, 2026, 13 pages.

* cited by examiner

CHAINED ACCELERATOR OPERATIONS WITH STORAGE FOR INTERMEDIATE RESULTS

BACKGROUND

Technical Field

Embodiments described herein generally relate to data processing. In particular, embodiments described herein generally relate to the use of accelerators to perform data processing.

Background Information

Computer systems and other electronic devices generally include a central processing unit (CPU) including one or more cores. The CPU is used to perform general-purpose processing. Some computer systems and electronic devices also include one or more accelerators. The accelerators often represent more specialized and/or less general-purpose processors that are generally able to perform some function, workload, or operation better in at least some way (e.g., with higher performance and/or greater energy efficiency) than the CPU.

BRIEF DESCRIPTION OF THE DRAWINGS

The invention may best be understood by referring to the following description and accompanying drawings that are used to illustrate embodiments. In the drawings.

DETAILED DESCRIPTION OF EMBODIMENTS

Disclosed herein methods, apparatus, systems, and machine-readable medium storing instructions, which are associated with chaining together two or more accelerators and/or performing chained accelerator operations. In the following description, numerous specific details are set forth (e.g., specific chains of accelerators, specific chained accelerator operations, specific standards/protocols, etc.). However, embodiments may be practiced without these specific details. In other instances, well-known circuits, structures and techniques have not been shown in detail to avoid obscuring the understanding of the description.

Figure 1:
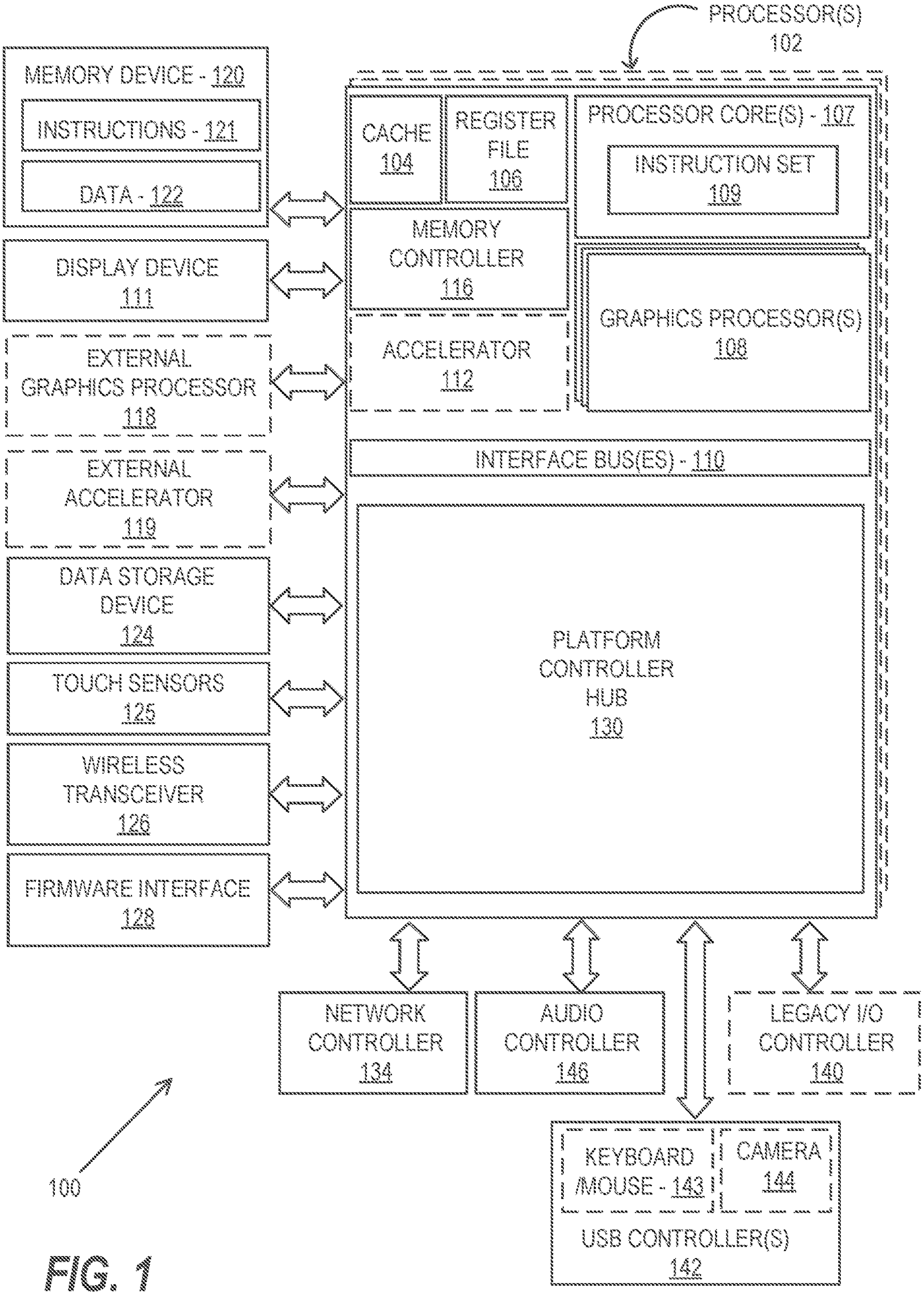
FIG. 1 is a block diagram of a processing system, according to an embodiment.

FIG. 1 is a block diagram of a processing system 100, according to an embodiment. Processing system 100 may be used in a single processor desktop system, a multiprocessor workstation system, or a server system having a large number of processors 102 or processor cores 107. In one embodiment, the processing system 100 is a processing platform incorporated within a system-on-a-chip (SoC) integrated circuit for use in mobile, handheld, or embedded devices such as within Internet-of-things (IoT) devices with wired or wireless connectivity to a local or wide area network.

In one embodiment, processing system 100 can include, couple with, or be integrated within: a server-based gaming platform; a game console, including a game and media console; a mobile gaming console, a handheld game console, or an online game console. In some embodiments the processing system 100 is part of a mobile phone, smart phone, tablet computing device or mobile Internet-connected device such as a laptop with low internal storage capacity. Processing system 100 can also include, couple with, or be integrated within: a wearable device, such as a smart watch wearable device; smart eyewear or clothing enhanced with augmented reality (AR) or virtual reality (VR) features to provide visual, audio or tactile outputs to supplement real world visual, audio or tactile experiences or otherwise provide text, audio, graphics, video, holographic images or video, or tactile feedback; other augmented reality (AR) device; or other virtual reality (VR) device. In some embodiments, the processing system 100 includes or is part of a television or set top box device. In one embodiment, processing system 100 can include, couple with, or be integrated within a self-driving vehicle such as a bus, tractor trailer, car, motor or electric power cycle, plane, or glider (or any combination thereof). The self-driving vehicle may use processing system 100 to process the environment sensed around the vehicle.

In some embodiments, the one or more processors 102 each include one or more processor cores 107 to process instructions which, when executed, perform operations for system or user software. In some embodiments, at least one of the one or more processor cores 107 is configured to process a specific instruction set 109. In some embodiments, instruction set 109 may facilitate Complex Instruction Set Computing (CISC), Reduced Instruction Set Computing (RISC), or computing via a Very Long Instruction Word (VLIW). One or more processor cores 107 may process a different instruction set 109, which may include instructions to facilitate the emulation of other instruction sets. Processor core 107 may also include other processing devices, such as a Digital Signal Processor (DSP).

In some embodiments, the processor 102 includes cache memory 104. Depending on the architecture, the processor 102 can have a single internal cache or multiple levels of internal cache. In some embodiments, the cache memory is shared among various components of the processor 102. In some embodiments, the processor 102 also uses an external cache (e.g., a Level-3 (L3) cache or Last Level Cache (LLC)) (not shown), which may be shared among processor cores 107 using known cache coherency techniques. A register file 106 can be additionally included in processor 102 and may include different types of registers for storing different types of data (e.g., integer registers, floating point registers, status registers, and an instruction pointer register). Some registers may be general-purpose registers, while other registers may be specific to the design of the processor 102.

In some embodiments, one or more processor(s) 102 are coupled with one or more interface bus(es) 110 to transmit communication signals such as address, data, or control signals between processor 102 and other components in the processing system 100. The interface bus 110, in one embodiment, can be a processor bus, such as a version of the Direct Media Interface (DMI) bus. However, processor busses are not limited to the DMI bus, and may include one or more Peripheral Component Interconnect buses (e.g., PCI, PCI express), memory busses, or other types of interface busses. In one embodiment the processor(s) 102 include a memory controller 116 and a platform controller hub 130. The memory controller 116 facilitates communication between a memory device and other components of the processing system 100, while the platform controller hub (PCH) 130 provides connections to I/O devices via a local I/O bus.

The memory device 120 can be a dynamic random-access memory (DRAM) device, a static random-access memory (SRAM) device, flash memory device, phase-change memory device, or some other memory device having suitable performance to serve as process memory. In one embodiment the memory device 120 can operate as system memory for the processing system 100, to store data 122 and instructions 121 for use when the one or more processors 102 executes an application or process. The memory controller 116 also couples with an optional external graphics processor 118, which may communicate with the one or more graphics processors 108 in processors 102 to perform graphics and media operations. In some embodiments, graphics, media, and or compute operations may be assisted by an accelerator 112 which is a coprocessor that can be configured to perform a specialized set of graphics, media, or compute operations. For example, in one embodiment the accelerator 112 is a matrix multiplication accelerator used to optimize machine learning or compute operations. In one embodiment the accelerator 112 is a ray-tracing accelerator that can be used to perform ray-tracing operations in concert with the graphics processor 108. In one embodiment, an external accelerator 119 may be used in place of or in concert with the accelerator 112.

In some embodiments a display device 111 can connect to the processor(s) 102. The display device 111 can be one or more of an internal display device, as in a mobile electronic device or a laptop device or an external display device attached via a display interface (e.g., DisplayPort, etc.). In one embodiment the display device 111 can be a head mounted display (HMD) such as a stereoscopic display device for use in virtual reality (VR) applications or augmented reality (AR) applications.

In some embodiments the platform controller hub 130 enables peripherals to connect to memory device 120 and processor 102 via a high-speed I/O bus. The I/O peripherals include, but are not limited to, an audio controller 146, a network controller 134, a firmware interface 128, a wireless transceiver 126, touch sensors 125, a data storage device 124 (e.g., non-volatile memory, volatile memory, hard disk drive, flash memory, NAND, 3D NAND, 3D XPoint, etc.). The data storage device 124 can connect via a storage interface (e.g., SATA) or via a peripheral bus, such as a Peripheral Component Interconnect bus (e.g., PCI, PCI express). The touch sensors 125 can include touch screen sensors, pressure sensors, or fingerprint sensors. The wireless transceiver 126 can be a Wi-Fi transceiver, a Bluetooth transceiver, or a mobile network transceiver such as a 3G, 4G, 5G, or Long-Term Evolution (LTE) transceiver. The firmware interface 128 enables communication with system firmware, and can be, for example, a unified extensible firmware interface (UEFI). The network controller 134 can enable a network connection to a wired network. In some embodiments, a high-performance network controller (not shown) couples with the interface bus 110. The audio controller 146, in one embodiment, is a multi-channel high-definition audio controller. In one embodiment the processing system 100 includes an optional legacy I/O controller 140 for coupling legacy (e.g., Personal System 2 (PS/2)) devices to the system. The platform controller hub 130 can also connect to one or more Universal Serial Bus (USB) controllers 142 connect input devices, such as keyboard and mouse 143 combinations, a camera 144, or other USB input devices.

It will be appreciated that the processing system 100 shown is exemplary and not limiting, as other types of data processing systems that are differently configured may also be used. For example, an instance of the memory controller 116 and platform controller hub 130 may be integrated into a discreet external graphics processor, such as the external graphics processor 118. In one embodiment the platform controller hub 130 and/or memory controller 116 may be external to the one or more processor(s) 102 and reside in a system chipset that is in communication with the processor(s) 102.

For example, circuit boards ("sleds") can be used on which components such as CPUs, memory, and other components are placed are designed for increased thermal performance. In some examples, processing components such as the processors are located on a top side of a sled while near memory, such as DIMMs, are located on a bottom side of the sled. As a result of the enhanced airflow provided by this design, the components may operate at higher frequencies and power levels than in typical systems, thereby increasing performance. Furthermore, the sleds are configured to blindly mate with power and data communication cables in a rack, thereby enhancing their ability to be quickly removed, upgraded, reinstalled, and/or replaced. Similarly, individual components located on the sleds, such as processors, accelerators, memory, and data storage drives, are configured to be easily upgraded due to their increased spacing from each other. In the illustrative embodiment, the components additionally include hardware attestation features to prove their authenticity.

A data center can utilize a single network architecture ("fabric") that supports multiple other network architectures including Ethernet and Omni-Path. The sleds can be coupled to switches via optical fibers, which provide higher bandwidth and lower latency than typical twisted pair cabling (e.g., Category 5, Category 5e, Category 6, etc.). Due to the high bandwidth, low latency interconnections and network architecture, the data center may, in use, pool resources, such as memory, accelerators (e.g., GPUs, graphics accelerators, FPGAs, ASICs, neural network and/or artificial intelligence accelerators, etc.), and data storage drives that are physically disaggregated, and provide them to compute resources (e.g., processors) on an as needed basis, enabling the compute resources to access the pooled resources as if they were local.

A power supply or source can provide voltage and/or current to processing system 100 or any component or system described herein. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

FIGS. 2A-2D illustrate computing systems and graphics processors provided by embodiments described herein. The elements of FIGS. 2A-2D having the same reference numbers (or names) as the elements of any other figure herein can operate or function in any manner similar to that described elsewhere herein, but are not limited to such.

Figure 2A:
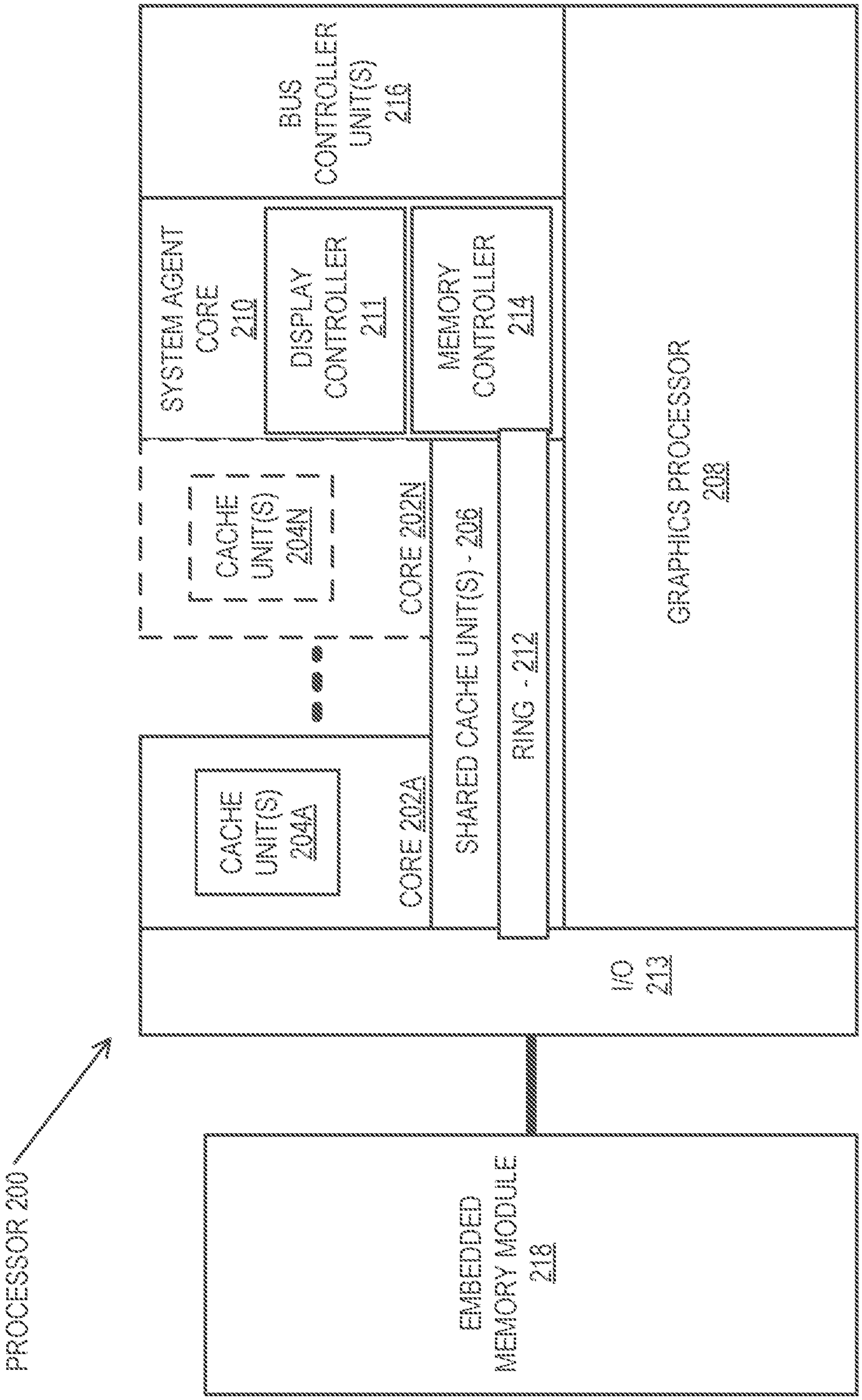
FIG. 2A is a block diagram of an embodiment of a processor having one or more processor cores, an integrated memory controller, and an integrated graphics processor.

FIG. 2A is a block diagram of an embodiment of a processor 200 having one or more processor cores 202A-202N, an integrated memory controller 214, and an integrated graphics processor 208. Processor 200 can include additional cores up to and including additional core 202N represented by the dashed lined boxes. Each of processor cores 202A-202N includes one or more internal cache units 204A-204N. In some embodiments each processor core also has access to one or more shared cached units 206. The internal cache units 204A-204N and shared cache units 206 represent a cache memory hierarchy within the processor 200. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 206 and 204A-204N.

In some embodiments, processor 200 may also include a set of one or more bus controller units 216 and a system agent core 210. The one or more bus controller units 216 manage a set of peripheral buses, such as one or more PCI or PCI express busses. System agent core 210 provides management functionality for the various processor components. In some embodiments, system agent core 210 includes one or more integrated memory controllers 214 to manage access to various external memory devices (not shown).

In some embodiments, one or more of the processor cores 202A-202N include support for simultaneous multi-threading. In such embodiment, the system agent core 210 includes components for coordinating and operating cores 202A-202N during multi-threaded processing. System agent core 210 may additionally include a power control unit (PCU), which includes logic and components to regulate the power state of processor cores 202A-202N and graphics processor 208.

In some embodiments, processor 200 additionally includes graphics processor 208 to execute graphics processing operations. In some embodiments, the graphics processor 208 couples with the set of shared cache units 206, and the system agent core 210, including the one or more integrated memory controllers 214. In some embodiments, the system agent core 210 also includes a display controller 211 to drive graphics processor output to one or more coupled displays. In some embodiments, display controller 211 may also be a separate module coupled with the graphics processor via at least one interconnect, or may be integrated within the graphics processor 208.

In some embodiments, a ring-based interconnect 212 is used to couple the internal components of the processor 200. However, an alternative interconnect unit may be used, such as a point-to-point interconnect, a switched interconnect, a mesh interconnect, or other techniques, including techniques well known in the art. In some embodiments, graphics processor 208 couples with the ring-based interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module or a high-bandwidth memory (HBM) module. In some embodiments, each of the processor cores 202A-202N and graphics processor 208 can use the embedded memory module 218 as a shared Last Level Cache.

In some embodiments, processor cores 202A-202N are homogenous cores executing the same instruction set architecture. In another embodiment, processor cores 202A-202N are heterogeneous in terms of instruction set architecture (ISA), where one or more of processor cores 202A-202N execute a first instruction set, while at least one of the other cores executes a subset of the first instruction set or a different instruction set. In one embodiment, processor cores 202A-202N are heterogeneous in terms of microarchitecture, where one or more cores having a relatively higher power consumption couple with one or more power cores having a lower power consumption. In one embodiment, processor cores 202A-202N are heterogeneous in terms of computational capability. Additionally, processor 200 can be implemented on one or more chips or as an SoC integrated circuit having the illustrated components, in addition to other components.

Figure 2B:
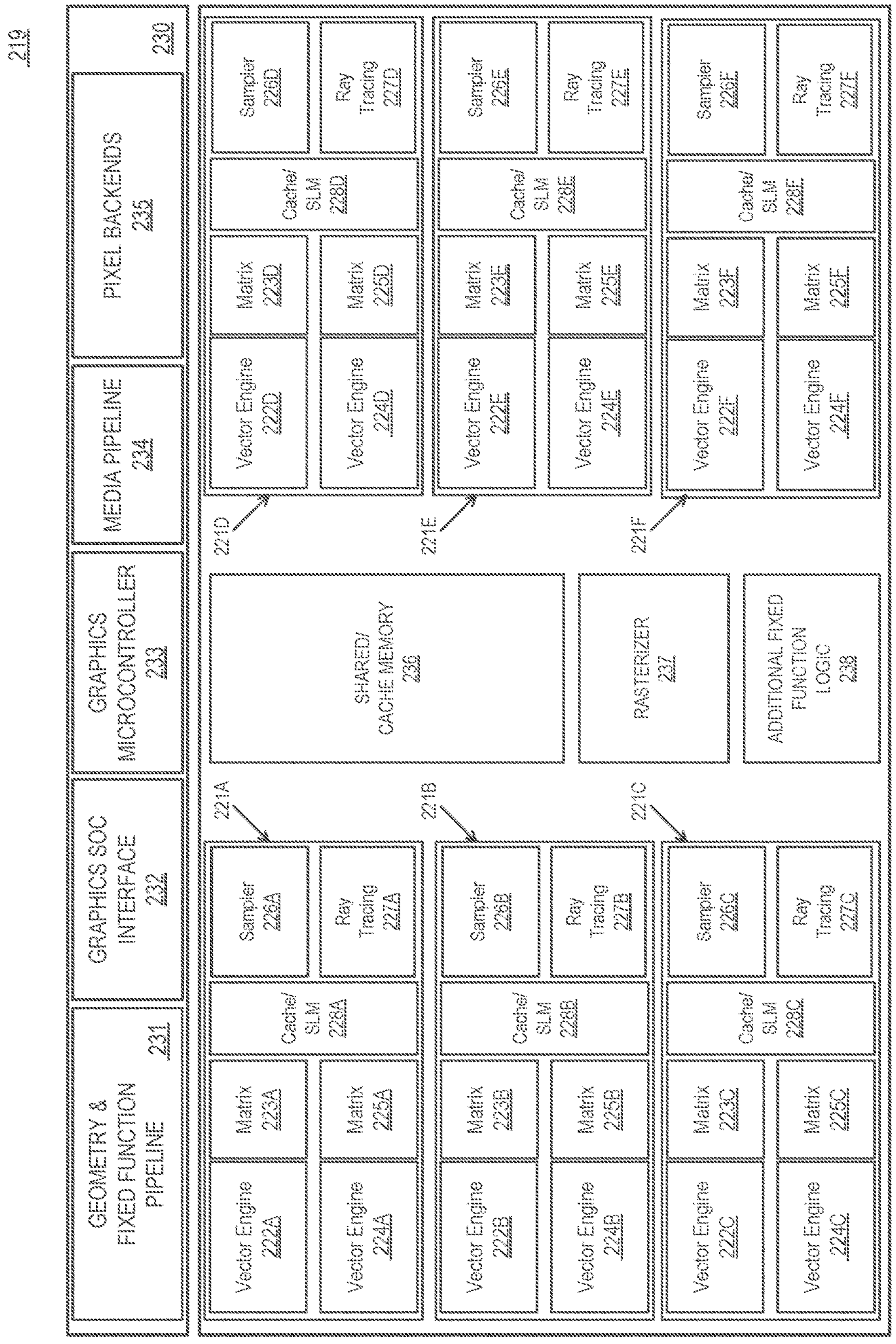
FIG. 2B is a block diagram of hardware logic of a graphics processor core block, according to some embodiments described herein.

FIG. 2B is a block diagram of hardware logic of a graphics processor core block 219, according to some embodiments described herein. In some embodiments, elements of FIG. 2B having the same reference numbers (or names) as the elements of any other figure herein may operate or function in a manner similar to that described elsewhere herein. The graphics processor core block 219 is exemplary of one partition of a graphics processor. The graphics processor core block 219 can be included within the integrated graphics processor 208 of FIG. 2A or a discrete graphics processor, parallel processor, and/or compute accelerator. A graphics processor as described herein may include multiple graphics core blocks based on target power and performance envelopes. Each graphics processor core block 219 can include a function block 230 coupled with multiple graphics cores 221A-221F that include modular blocks of fixed function logic and general-purpose programmable logic. The graphics processor core block 219 also includes shared/cache memory 236 that is accessible by all graphics cores 221A-221F, rasterizer logic 237, and additional fixed function logic 238.

In some embodiments, the function block 230 includes a geometry/fixed function pipeline 231 that can be shared by all graphics cores in the graphics processor core block 219. In various embodiments, the geometry/fixed function pipeline 231 includes a 3D geometry pipeline a video front-end unit, a thread spawner and global thread dispatcher, and a unified return buffer manager, which manages unified return buffers. In one embodiment the function block 230 also includes a graphics SoC interface 232, a graphics microcontroller 233, and a media pipeline 234. The graphics SoC interface 232 provides an interface between the graphics processor core block 219 and other core blocks within a graphics processor or compute accelerator SoC. The graphics microcontroller 233 is a programmable sub-processor that is configurable to manage various functions of the graphics processor core block 219, including thread dispatch, scheduling, and pre-emption. The media pipeline 234 includes logic to facilitate the decoding, encoding, preprocessing, and/or post-processing of multimedia data, including image and video data. The media pipeline 234 implement media operations via requests to compute or sampling logic within the graphics cores 221-221F. One or more pixel backends 235 can also be included within the function block 230. The pixel backends 235 include a cache memory to store pixel color values and can perform blend operations and lossless color compression of rendered pixel data.

In one embodiment the graphics SoC interface 232 enables the graphics processor core block 219 to communicate with general-purpose application processor cores (e.g., CPUs) and/or other components within an SoC or a system host CPU that is coupled with the SoC via a peripheral interface. The graphics SoC interface 232 also enables communication with off-chip memory hierarchy elements such as a shared last level cache memory, system RAM, and/or embedded on-chip or on-package DRAM. The SoC interface 232 can also enable communication with fixed function devices within the SoC, such as camera imaging pipelines, and enables the use of and/or implements global memory atomics that may be shared between the graphics processor core block 219 and CPUs within the SoC. The graphics SoC interface 232 can also implement power management controls for the graphics processor core block 219 and enable an interface between a clock domain of the graphics processor core block 219 and other clock domains within the SoC. In one embodiment the graphics SoC interface 232 enables receipt of command buffers from a command streamer and global thread dispatcher that are configured to provide commands and instructions to each of one or more graphics cores within a graphics processor. The commands and instructions can be dispatched to the media pipeline 234 when media operations are to be performed, the geometry and fixed function pipeline 231 when graphics processing operations are to be performed. When compute operations are to be performed, compute dispatch logic can dispatch the commands to the graphics cores 221A-221F, bypassing the geometry and media pipelines.

The graphics microcontroller 233 can be configured to perform various scheduling and management tasks for the graphics processor core block 219. In one embodiment the graphics microcontroller 233 can perform graphics and/or compute workload scheduling on the various vector engines 222A-222F, 224A-224F and matrix engines 223A-223F, 225A-225F within the graphics cores 221A-221F. In this scheduling model, host software executing on a CPU core of an SoC including the graphics processor core block 219 can submit workloads one of multiple graphics processor doorbells, which invokes a scheduling operation on the appropriate graphics engine. Scheduling operations include determining which workload to run next, submitting a workload to a command streamer, pre-empting existing workloads running on an engine, monitoring progress of a workload, and notifying host software when a workload is complete. In one embodiment the graphics microcontroller 233 can also facilitate low-power or idle states for the graphics processor core block 219, providing the graphics processor core block 219 with the ability to save and restore registers within the graphics processor core block 219 across low-power state transitions independently from the operating system and/or graphics driver software on the system.

The graphics processor core block 219 may have greater than or fewer than the illustrated graphics cores 221A-221F, up to N modular graphics cores. For each set of N graphics cores, the graphics processor core block 219 can also include shared/cache memory 236, which can be configured as shared memory or cache memory, rasterizer logic 237, and additional fixed function logic 238 to accelerate various graphics and compute processing operations.

Within each graphics cores 221A-221F is set of execution resources that may be used to perform graphics, media, and compute operations in response to requests by graphics pipeline, media pipeline, or shader programs. The graphics cores 221A-221F include multiple vector engines 222A-222F, 224A-224F, matrix acceleration units 223A-223F, 225A-225D, cache/shared local memory (SLM), a sampler 226A-226F, and a ray tracing unit 227A-227F.

The vector engines 222A-222F, 224A-224F are general-purpose graphics processing units capable of performing floating-point and integer/fixed-point logic operations in service of a graphics, media, or compute operation, including graphics, media, or compute/GPGPU programs. The vector engines 222A-222F, 224A-224F can operate at variable vector widths using SIMD, SIMT, or SIMT+SIMD execution modes. The matrix acceleration units 223A-223F, 225A-225D include matrix-matrix and matrix-vector acceleration logic that improves performance on matrix operations, particularly low and mixed precision (e.g., INT8, FP16, BF16) matrix operations used for machine learning. In one embodiment, each of the matrix acceleration units 223A-223F, 225A-225D includes one or more systolic arrays of processing elements that can perform concurrent matrix multiply or dot product operations on matrix elements.

The sampler 226A-226F can read media or texture data into memory and can sample data differently based on a configured sampler state and the texture/media format that is being read. Threads executing on the vector engines 222A-222F, 224A-224F or matrix acceleration units 223A-223F, 225A-225D can make use of the cache/SLM 228A-228F within each execution core. The cache/SLM 228A-228F can be configured as cache memory or as a pool of shared memory that is local to each of the respective graphics cores 221A-221F. The ray tracing units 227A-227F within the graphics cores 221A-221F include ray traversal/intersection circuitry for performing ray traversal using bounding volume hierarchies (BVHs) and identifying intersections between rays and primitives enclosed within the BVH volumes. In one embodiment the ray tracing units 227A-227F include circuitry for performing depth testing and culling (e.g., using a depth buffer or similar arrangement). In one implementation, the ray tracing units 227A-227F perform traversal and intersection operations in concert with image denoising, at least a portion of which may be performed using an associated matrix acceleration unit 223A-223F, 225A-225D.

Figure 2C:
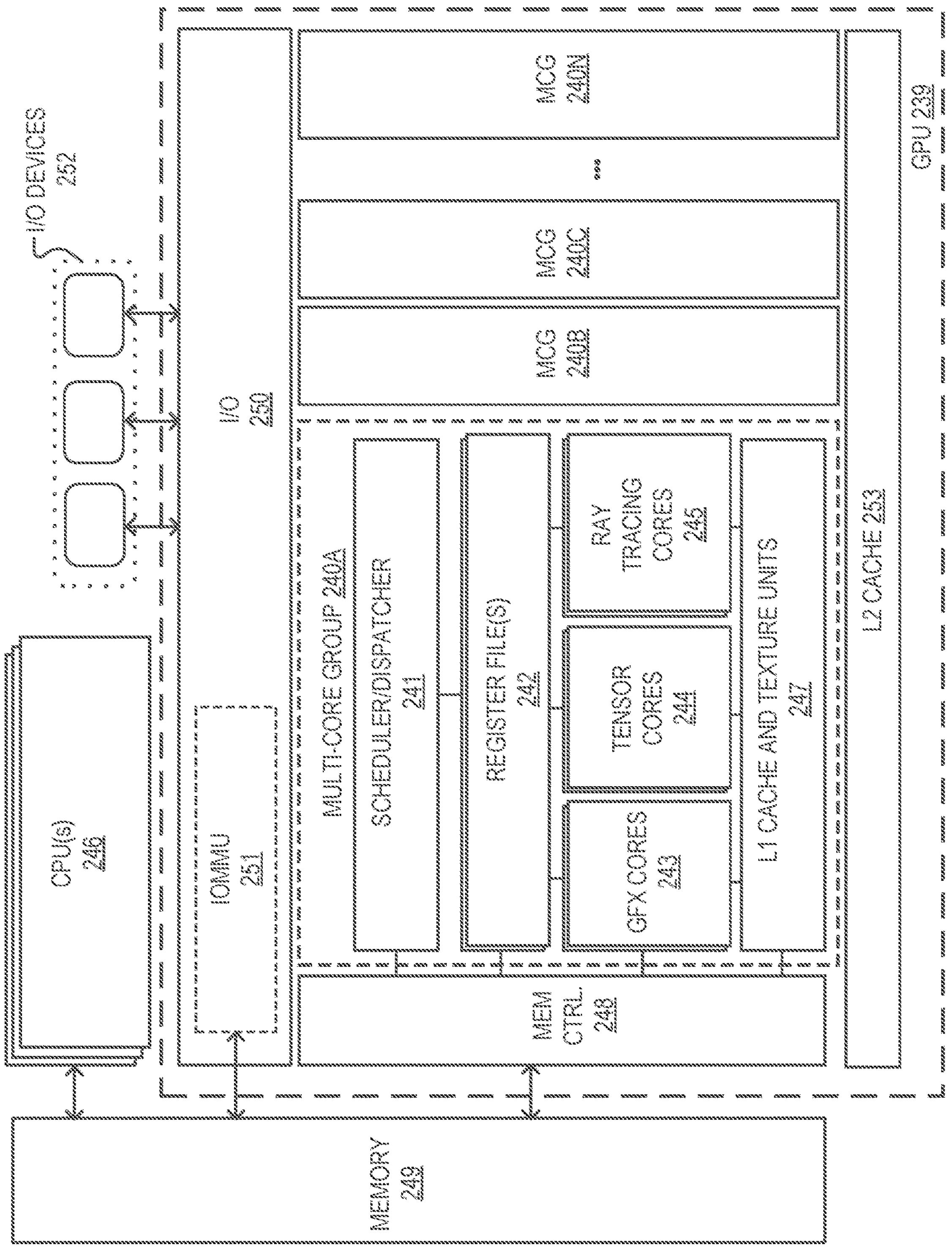
FIG. 2C illustrates a graphics processing unit (GPU) that includes dedicated sets of graphics processing resources arranged into multi-core groups.

FIG. 2C illustrates a graphics processing unit (GPU) 239 that includes dedicated sets of graphics processing resources arranged into multi-core groups 240A-240N. The details of multi-core group 240A are illustrated. Multi-core groups 240B-240N may be equipped with the same or similar sets of graphics processing resources.

As illustrated, a multi-core group 240A may include a set of graphics cores 243, a set of tensor cores 244, and a set of ray tracing cores 245. A scheduler/dispatcher 241 schedules and dispatches the graphics threads for execution on the various cores 243, 244, 245. In one embodiment the tensor cores 244 are sparse tensor cores with hardware to enable multiplication operations having a zero-value input to be bypassed. The graphics cores 243 of the GPU 239 of FIG. 2C differ in hierarchical abstraction level relative to the graphics cores 221A-221F of FIG. 2B, which are analogous to the multi-core groups 240A-240N of FIG. 2C. The graphics cores 243, tensor cores 244, and ray tracing cores 245 of FIG. 2C are analogous to, respectively, the vector engines 222A-222F, 224A-224F, matrix engines 223A-223F, 225A-225F, and ray tracing units 227A-227F of FIG. 2B.

A set of register files 242 can store operand values used by the cores 243, 244, 245 when executing the graphics threads. These may include, for example, integer registers for storing integer values, floating point registers for storing floating point values, vector registers for storing packed data elements (integer and/or floating-point data elements) and tile registers for storing tensor/matrix values. In one embodiment, the tile registers are implemented as combined sets of vector registers.

One or more combined level 1 (L1) caches and shared memory units 247 store graphics data such as texture data, vertex data, pixel data, ray data, bounding volume data, etc., locally within each multi-core group 240A. One or more texture units 247 can also be used to perform texturing operations, such as texture mapping and sampling. A Level 2 (L2) cache 253 shared by all or a subset of the multi-core groups 240A-240N stores graphics data and/or instructions for multiple concurrent graphics threads. As illustrated, the L2 cache 253 may be shared across a plurality of multi-core groups 240A-240N. One or more memory controllers 248 couple the GPU 239 to a memory 249 which may be a system memory (e.g., DRAM) and/or a dedicated graphics memory (e.g., GDDR6 memory).

Input/output (I/O) circuitry 250 couples the GPU 239 to one or more I/O devices 252 such as digital signal processors (DSPs), network controllers, or user input devices. An on-chip interconnect may be used to couple the I/O devices 252 to the GPU 239 and memory 249. One or more I/O memory management units (IOMMUs) 251 of the I/O circuitry 250 couple the I/O devices 252 directly to the memory 249. In one embodiment, the IOMMU 251 manages multiple sets of page tables to map virtual addresses to physical addresses in memory 249. In this embodiment, the I/O devices 252, CPU(s) 246, and GPU 239 may share the same virtual address space.

In one implementation, the IOMMU 251 supports virtualization. In this case, it may manage a first set of page tables to map guest/graphics virtual addresses to guest/graphics physical addresses and a second set of page tables to map the guest/graphics physical addresses to system/host physical addresses (e.g., within memory 249). The base addresses of each of the first and second sets of page tables may be stored in control registers and swapped out on a context switch (e.g., so that the new context is provided with access to the relevant set of page tables). While not illustrated in FIG. 2C, each of the cores 243, 244, 245 and/or multi-core groups 240A-240N may include translation lookaside buffers (TLBs) to cache guest virtual to guest physical translations, guest physical to host physical translations, and guest virtual to host physical translations.

In one embodiment, the CPUs 246, GPU 239, and I/O devices 252 are integrated on a single semiconductor chip and/or chip package. The memory 249 may be integrated on the same chip or may be coupled to the memory controllers 248 via an off-chip interface. In one implementation, the memory 249 comprises GDDR6 memory which shares the same virtual address space as other physical system-level memories, although the underlying principles of the embodiments described herein are not limited to this specific implementation.

In one embodiment, the tensor cores 244 include a plurality of functional units specifically designed to perform matrix operations, which are the fundamental compute operation used to perform deep learning operations. For example, simultaneous matrix multiplication operations may be used for neural network training and inferencing. The tensor cores 244 may perform matrix processing using a variety of operand precisions including single precision floating-point (e.g., 32 bits), half-precision floating point (e.g., 16 bits), integer words (16 bits), bytes (8 bits), and half-bytes (4 bits). In one embodiment, a neural network implementation extracts features of each rendered scene, potentially combining details from multiple frames, to construct a high-quality final image.

In deep learning implementations, parallel matrix multiplication work may be scheduled for execution on the tensor cores 244. The training of neural networks, in particular, requires a significant number of matrix dot product operations. In order to process an inner-product formulation of an N×N×N matrix multiply, the tensor cores 244 may include at least N dot-product processing elements. Before the matrix multiply begins, one entire matrix is loaded into tile registers and at least one column of a second matrix is loaded each cycle for N cycles. Each cycle, there are N dot products that are processed.

Matrix elements may be stored at different precisions depending on the particular implementation, including 16-bit words, 8-bit bytes (e.g., INT8) and 4-bit half-bytes (e.g., INT4). Different precision modes may be specified for the tensor cores 244 to ensure that the most efficient precision is used for different workloads (e.g., such as inferencing workloads which can tolerate quantization to bytes and half-bytes).

In one embodiment, the ray tracing cores 245 accelerate ray tracing operations for both real-time ray tracing and non-real-time ray tracing implementations. In particular, the ray tracing cores 245 include ray traversal/intersection circuitry for performing ray traversal using bounding volume hierarchies (BVHs) and identifying intersections between rays and primitives enclosed within the BVH volumes. The ray tracing cores 245 may also include circuitry for performing depth testing and culling (e.g., using a Z buffer or similar arrangement). In one implementation, the ray tracing cores 245 perform traversal and intersection operations in concert with the image denoising techniques described herein, at least a portion of which may be executed on the tensor cores 244. For example, in one embodiment, the tensor cores 244 implement a deep learning neural network to perform denoising of frames generated by the ray tracing cores 245. However, the CPU(s) 246, graphics cores 243, and/or ray tracing cores 245 may also implement all or a portion of the denoising and/or deep learning algorithms.

In addition, as described above, a distributed approach to denoising may be employed in which the GPU 239 is in a computing device coupled to other computing devices over a network or high-speed interconnect. In this embodiment, the interconnected computing devices share neural network learning/training data to improve the speed with which the overall system learns to perform denoising for different types of image frames and/or different graphics applications.

In one embodiment, the ray tracing cores 245 process all BVH traversal and ray-primitive intersections, saving the graphics cores 243 from being overloaded with thousands of instructions per ray. In one embodiment, each ray tracing core 245 includes a first set of specialized circuitry for performing bounding box tests (e.g., for traversal operations) and a second set of specialized circuitry for performing the ray-triangle intersection tests (e.g., intersecting rays which have been traversed). Thus, in one embodiment, the multi-core group 240A can simply launch a ray probe, and the ray tracing cores 245 independently perform ray traversal and intersection and return hit data (e.g., a hit, no hit, multiple hits, etc.) to the thread context. The other cores 243, 244 are freed to perform other graphics or compute work while the ray tracing cores 245 perform the traversal and intersection operations.

In one embodiment, each ray tracing core 245 includes a traversal unit to perform BVH testing operations and an intersection unit which performs ray-primitive intersection tests. The intersection unit generates a "hit", "no hit", or "multiple hit" response, which it provides to the appropriate thread. During the traversal and intersection operations, the execution resources of the other cores (e.g., graphics cores 243 and tensor cores 244) are freed to perform other forms of graphics work.

In one particular embodiment described below, a hybrid rasterization/ray tracing approach is used in which work is distributed between the graphics cores 243 and ray tracing cores 245.

In one embodiment, the ray tracing cores 245 (and/or other cores 243, 244) include hardware support for a ray tracing instruction set such as Microsoft's DirectX Ray Tracing (DXR) which includes a DispatchRays command, as well as ray-generation, closest-hit, any-hit, and miss shaders, which enable the assignment of unique sets of shaders and textures for each object. Another ray tracing platform which may be supported by the ray tracing cores 245, graphics cores 243 and tensor cores 244 is Vulkan 1.1.85. Note, however, that the underlying principles of the embodiments described herein are not limited to any particular ray tracing ISA.

In general, the various cores 245, 244, 243 may support a ray tracing instruction set that includes instructions/functions for ray generation, closest hit, any hit, ray-primitive intersection, per-primitive and hierarchical bounding box construction, miss, visit, and exceptions. More specifically, one embodiment includes ray tracing instructions to perform the following functions:

Ray Generation—Ray generation instructions may be executed for each pixel, sample, or other user-defined work assignment.

Closest Hit—A closest hit instruction may be executed to locate the closest intersection point of a ray with primitives within a scene.

Any Hit—An any hit instruction identifies multiple intersections between a ray and primitives within a scene, potentially to identify a new closest intersection point.

Intersection—An intersection instruction performs a ray-primitive intersection test and outputs a result.

Per-primitive Bounding box Construction—This instruction builds a bounding box around a given primitive or group of primitives (e.g., when building a new BVH or other acceleration data structure).

Miss—Indicates that a ray misses all geometry within a scene, or specified region of a scene.

Visit—Indicates the child volumes a ray will traverse.

Exceptions—Includes various types of exception handlers (e.g., invoked for various error conditions).

In one embodiment the ray tracing cores 245 may be adapted to accelerate general-purpose compute operations that can be accelerated using computational techniques that are analogous to ray intersection tests. A compute framework can be provided that enables shader programs to be compiled into low level instructions and/or primitives that perform general-purpose compute operations via the ray tracing cores. Exemplary computational problems that can benefit from compute operations performed on the ray tracing cores 245 include computations involving beam, wave, ray, or particle propagation within a coordinate space. Interactions associated with that propagation can be computed relative to a geometry or mesh within the coordinate space. For example, computations associated with electromagnetic signal propagation through an environment can be accelerated via the use of instructions or primitives that are executed via the ray tracing cores. Diffraction and reflection of the signals by objects in the environment can be computed as direct ray-tracing analogies.

Ray tracing cores 245 can also be used to perform computations that are not directly analogous to ray tracing. For example, mesh projection, mesh refinement, and volume sampling computations can be accelerated using the ray tracing cores 245. Generic coordinate space calculations, such as nearest neighbor calculations can also be performed. For example, the set of points near a given point can be discovered by defining a bounding box in the coordinate space around the point. BVH and ray probe logic within the ray tracing cores 245 can then be used to determine the set of point intersections within the bounding box. The intersections constitute the origin point and the nearest neighbors to that origin point. Computations that are performed using the ray tracing cores 245 can be performed in parallel with computations performed on the graphics cores 243 and tensor cores 244. A shader compiler can be configured to compile a compute shader or other general-purpose graphics processing program into low level primitives that can be parallelized across the graphics cores 243, tensor cores 244, and ray tracing cores 245.

Figure 2D:
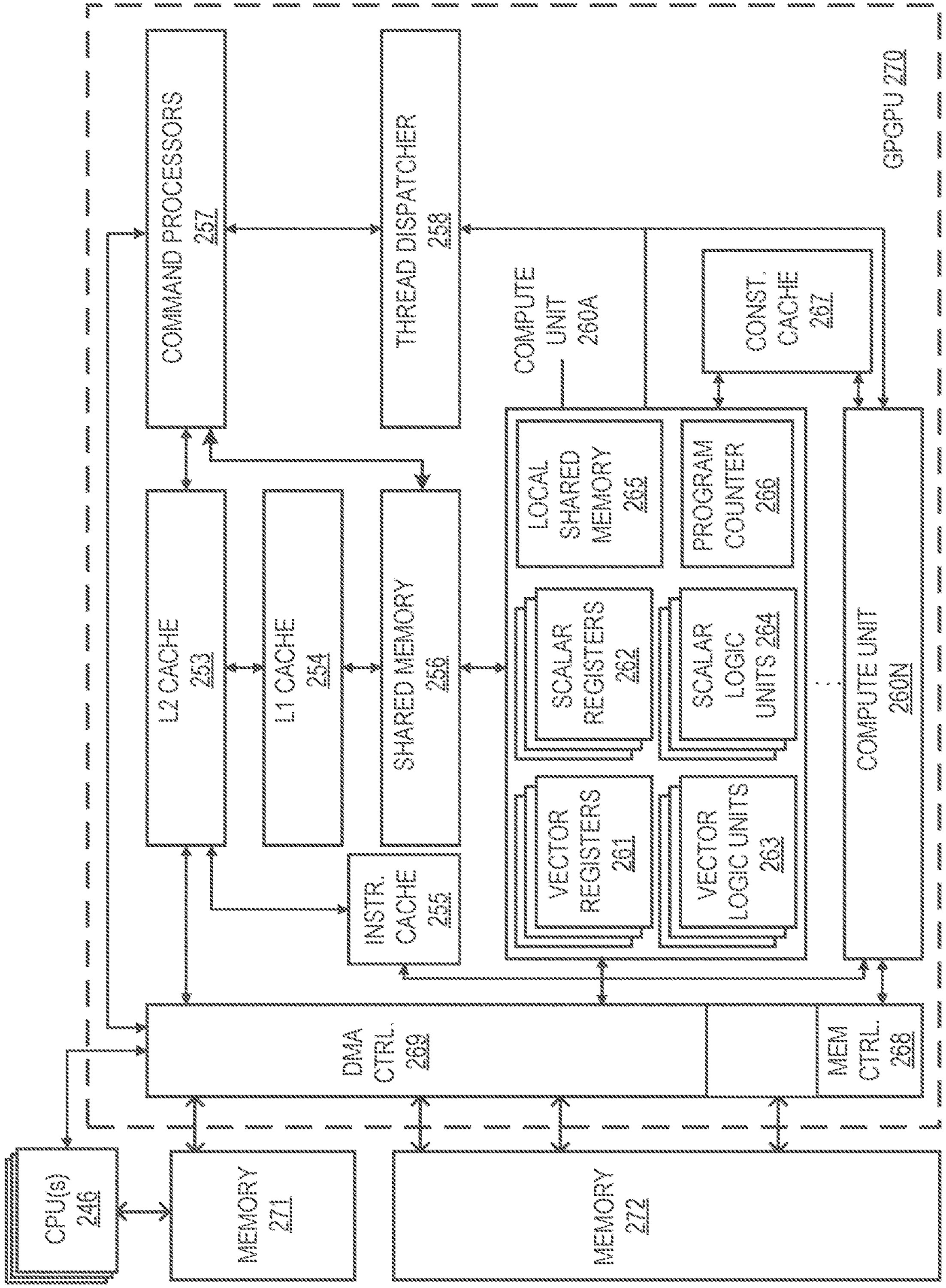
FIG. 2D is a block diagram of general-purpose graphics processing unit (GPGPU) that can be configured as a graphics processor and/or compute accelerator, according to embodiments described herein.

FIG. 2D is a block diagram of general-purpose graphics processing unit (GPGPU) 270 that can be configured as a graphics processor and/or compute accelerator, according to embodiments described herein. The GPGPU 270 can interconnect with host processors (e.g., one or more CPU(s) 246) and memory 271, 272 via one or more system and/or memory busses. In one embodiment the memory 271 is system memory that may be shared with the one or more CPU(s) 246, while memory 272 is device memory that is dedicated to the GPGPU 270. In one embodiment, components within the GPGPU 270 and memory 272 may be mapped into memory addresses that are accessible to the one or more CPU(s) 246. Access to memory 271 and 272 may be facilitated via a memory controller 268. In one embodiment the memory controller 268 includes an internal direct memory access (DMA) controller 269 or can include logic to perform operations that would otherwise be performed by a DMA controller.

The GPGPU 270 includes multiple cache memories, including an L2 cache 253, L1 cache 254, an instruction cache 255, and shared memory 256, at least a portion of which may also be partitioned as a cache memory. The GPGPU 270 also includes multiple compute units 260A-260N, which represent a hierarchical abstraction level analogous to the graphics cores 221A-221F of FIG. 2B and the multi-core groups 240A-240N of FIG. 2C. Each compute unit 260A-260N includes a set of vector registers 261, scalar registers 262, vector logic units 263, and scalar logic units 264. The compute units 260A-260N can also include local shared memory 265 and a program counter 266. The compute units 260A-260N can couple with a constant cache 267, which can be used to store constant data, which is data that will not change during the run of kernel or shader program that executes on the GPGPU 270. In one embodiment the constant cache 267 is a scalar data cache and cached data can be fetched directly into the scalar registers 262.

During operation, the one or more CPU(s) 246 can write commands into registers or memory in the GPGPU 270 that has been mapped into an accessible address space. The command processors 257 can read the commands from registers or memory and determine how those commands will be processed within the GPGPU 270. A thread dispatcher 258 can then be used to dispatch threads to the compute units 260A-260N to perform those commands. Each compute unit 260A-260N can execute threads independently of the other compute units. Additionally, each compute unit 260A-260N can be independently configured for conditional computation and can conditionally output the results of computation to memory. The command processors 257 can interrupt the one or more CPU(s) 246 when the submitted commands are complete.

Figure 3A:
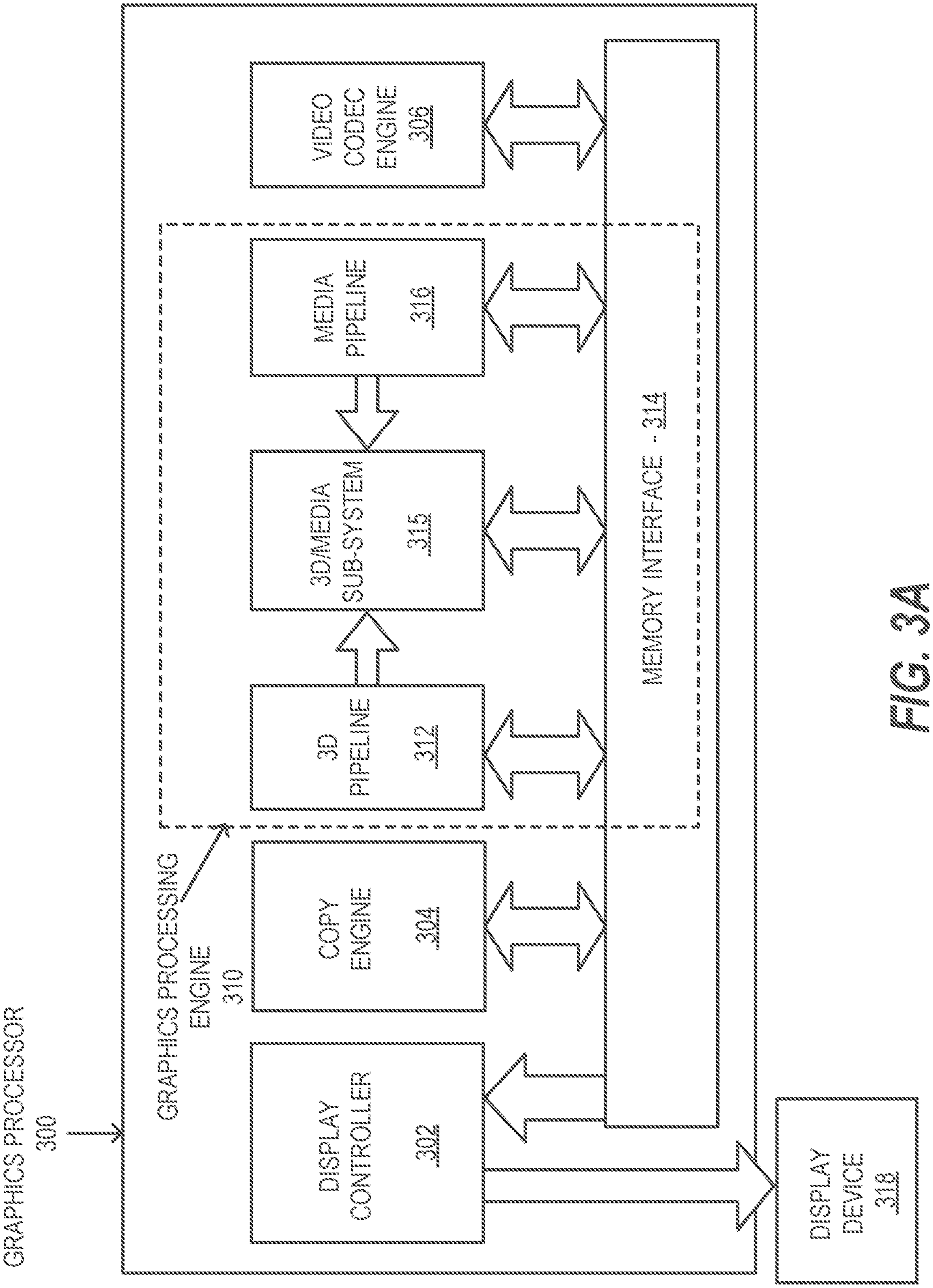
FIG. 3A is a block diagram of a graphics processor, which may be a discrete graphics processing unit, or may be a graphics processor integrated with a plurality of processing cores, or other semiconductor devices such as, but not limited to, memory devices or network interfaces.
Figure 3B:
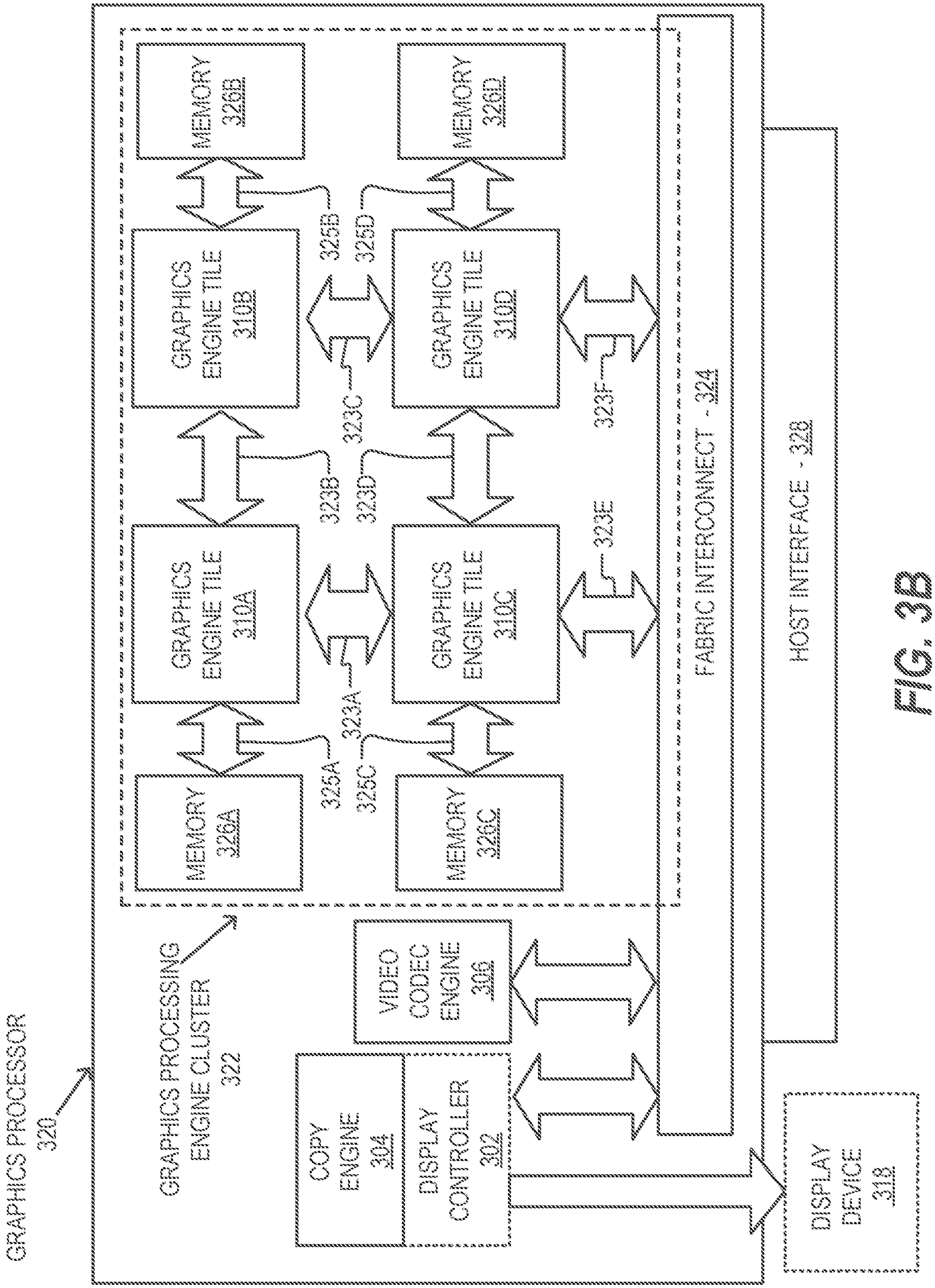
FIG. 3B illustrates a graphics processor having a tiled architecture, according to embodiments described herein.
Figure 3C:
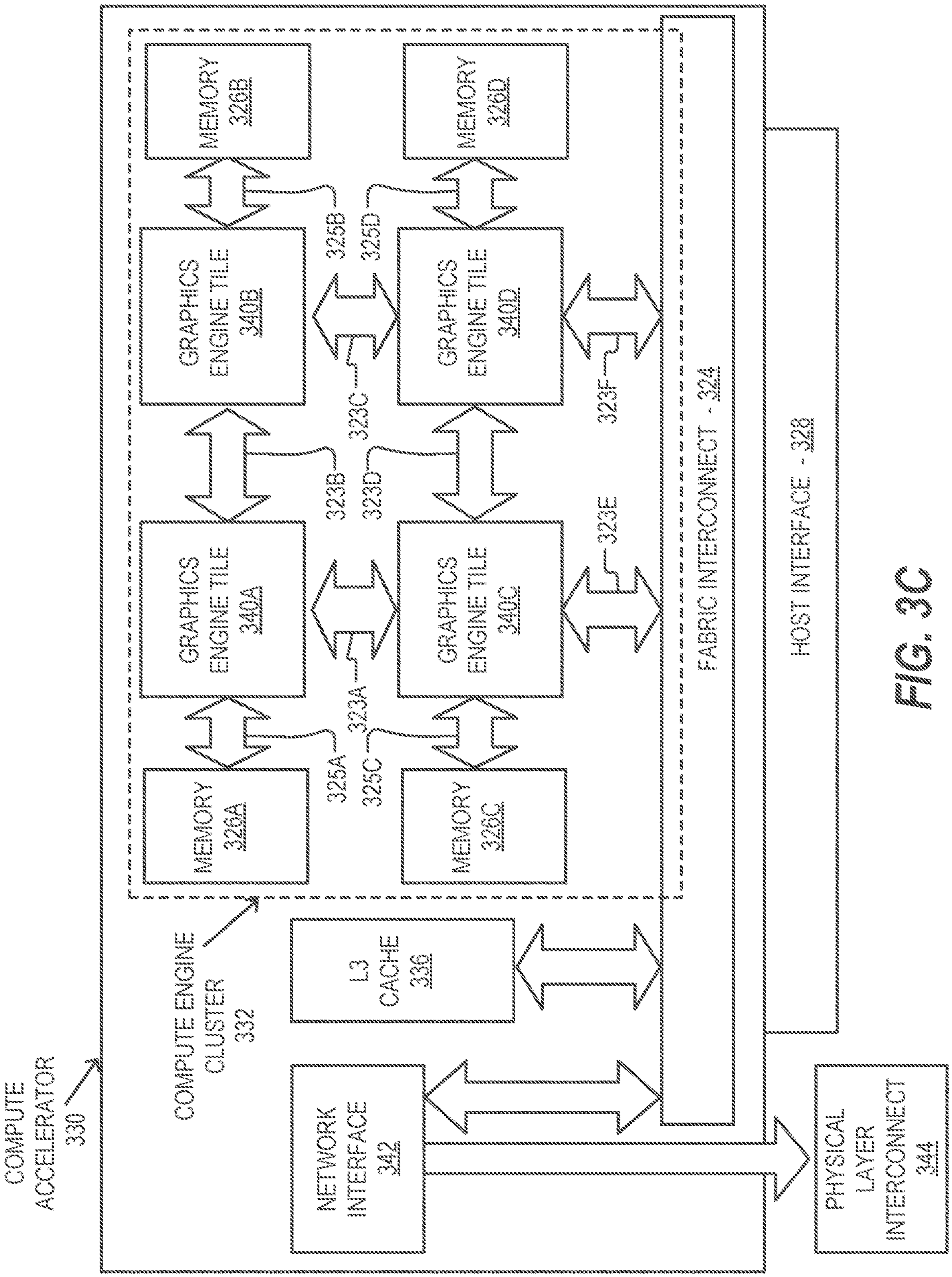
FIG. 3C illustrates a compute accelerator, according to embodiments described herein.

FIGS. 3A-3C illustrate block diagrams of additional graphics processor and compute accelerator architectures provided by embodiments described herein. The elements of FIGS. 3A-3C having the same reference numbers (or names) as the elements of any other figure herein can operate or function in any manner similar to that described elsewhere herein, but are not limited to such.

FIG. 3A is a block diagram of a graphics processor 300, which may be a discrete graphics processing unit, or may be a graphics processor integrated with a plurality of processing cores, or other semiconductor devices such as, but not limited to, memory devices or network interfaces. In some embodiments, the graphics processor communicates via a memory mapped I/O interface to registers on the graphics processor and with commands placed into the processor memory. In some embodiments, graphics processor 300 includes a memory interface 314 to access memory. Memory interface 314 can be an interface to local memory, one or more internal caches, one or more shared external caches, and/or to system memory.

In some embodiments, graphics processor 300 also includes a display controller 302 to drive display output data to a display device 318. Display controller 302 includes hardware for one or more overlay planes for the display and composition of multiple layers of video or user interface elements. The display device 318 can be an internal or external display device. In one embodiment the display device 318 is a head mounted display device, such as a virtual reality (VR) display device or an augmented reality (AR) display device. In some embodiments, graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, H.265/HEVC, Alliance for Open Media (AOMedia) VP8, VP9, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 300 includes a block image transfer (BLIT) engine 304 to perform two-dimensional (2D) rasterizer operations including, for example, bit-boundary block transfers. However, in one embodiment, 2D graphics operations are performed using one or more components of graphics processing engine (GPE) 310. In some embodiments, GPE 310 is a compute engine for performing graphics operations, including three-dimensional (3D) graphics operations and media operations.

In some embodiments, GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media subsystem 315. While 3D pipeline 312 can be used to perform media operations, an embodiment of GPE 310 also includes a media pipeline 316 that is specifically used to perform media operations, such as video post-processing and image enhancement.

In some embodiments, media pipeline 316 includes fixed function or programmable logic units to perform one or more specialized media operations, such as video decode acceleration, video de-interlacing, and video encode acceleration in place of, or on behalf of video codec engine 306. In some embodiments, media pipeline 316 additionally includes a thread spawning unit to spawn threads for execution on 3D/Media subsystem 315. The spawned threads perform computations for the media operations on one or more graphics cores included in 3D/Media subsystem 315.

In some embodiments, 3D/Media subsystem 315 includes logic for executing threads spawned by 3D pipeline 312 and media pipeline 316. In one embodiment, the pipelines send thread execution requests to 3D/Media subsystem 315, which includes thread dispatch logic for arbitrating and dispatching the various requests to available thread execution resources. The execution resources include an array of graphics cores to process the 3D and media threads. In some embodiments, 3D/Media subsystem 315 includes one or more internal caches for thread instructions and data. In some embodiments, the subsystem also includes shared memory, including registers and addressable memory, to share data between threads and to store output data.

FIG. 3B illustrates a graphics processor 320 having a tiled architecture, according to embodiments described herein. In one embodiment the graphics processor 320 includes a graphics processing engine cluster 322 having multiple instances of the graphics processing engine 310 of FIG. 3A within a graphics engine tile 310A-310D. Each graphics engine tile 310A-310D can be interconnected via a set of tile interconnects 323A-323F. Each graphics engine tile 310A-310D can also be connected to a memory module or memory device 326A-326D via memory interconnects 325A-325D. The memory devices 326A-326D can use any graphics memory technology. For example, the memory devices 326A-326D may be graphics double data rate (GDDR) memory. The memory devices 326A-326D, in one embodiment, are HBM modules that can be on-die with their respective graphics engine tile 310A-310D. In one embodiment the memory devices 326A-326D are stacked memory devices that can be stacked on top of their respective graphics engine tile 310A-310D. In one embodiment, each graphics engine tile 310A-310D and associated memory 326A-326D reside on separate chiplets, which are bonded to a base die or base substrate, as described on further detail in FIGS. 11B-11D.

The graphics processor 320 may be configured with a non-uniform memory access (NUMA) systemin which memory devices 326A-326D are coupled with associated graphics engine tiles 310A-310D. A given memory device may be accessed by graphics engine tiles other than the tile to which it is directly connected. However, access latency to the memory devices 326A-326D may be lowest when accessing a local tile. In one embodiment, a cache coherent NUMA (ccNUMA) system is enabled that uses the tile interconnects 323A-323F to enable communication between cache controllers within the graphics engine tiles 310A-310D to maintain a consistent memory image when more than one cache stores the same memory location.

The graphics processing engine cluster 322 can connect with an on-chip or on-package fabric interconnect 324. In one embodiment the fabric interconnect 324 includes a network processor, network on a chip (NoC), or another switching processor to enable the fabric interconnect 324 to act as a packet switched fabric interconnect that switches data packets between components of the graphics processor 320. The fabric interconnect 324 can enable communication between graphics engine tiles 310A-310D and components such as the video codec engine 306 and one or more copy engines 304. The copy engines 304 can be used to move data out of, into, and between the memory devices 326A-326D and memory that is external to the graphics processor 320 (e.g., system memory). The fabric interconnect 324 can also couple with one or more of the tile interconnects 323A-323F to facilitate or enhance the interconnection between the graphics engine tiles 310A-310D. The fabric interconnect 324 is also configurable to interconnect multiple instances of the graphics processor 320 (e.g., via the host interface 328), enabling tile-to-tile communication between graphics engine tiles 310A-310D of multiple GPUs. In one embodiment, the graphics engine tiles 310A-310D of multiple GPUs can be presented to a host system as a single logical device.

The graphics processor 320 may optionally include a display controller 302 to enable a connection with the display device 318. The graphics processor may also be configured as a graphics or compute accelerator. In the accelerator configuration, the display controller 302 and display device 318 may be omitted.

The graphics processor 320 can connect to a host system via a host interface 328. The host interface 328 can enable communication between the graphics processor 320, system memory, and/or other system components. The host interface 328 can be, for example a PCI express bus or another type of host system interface. For example, the host interface 328 may be an NVLink or NVSwitch interface. The host interface 328 and fabric interconnect 324 can cooperate to enable multiple instances of the graphics processor 320 to act as single logical device. Cooperation between the host interface 328 and fabric interconnect 324 can also enable the individual graphics engine tiles 310A-310D to be presented to the host system as distinct logical graphics devices.

FIG. 3C illustrates a compute accelerator 330, according to embodiments described herein. The compute accelerator 330 can include architectural similarities with the graphics processor 320 of FIG. 3B and is optimized for compute acceleration. A compute engine cluster 332 can include a set of compute engine tiles 340A-340D that include execution logic that is optimized for parallel or vector-based general-purpose compute operations. In some embodiments, the compute engine tiles 340A-340D do not include fixed function graphics processing logic, although in one embodiment one or more of the compute engine tiles 340A-340D can include logic to perform media acceleration. The compute engine tiles 340A-340D can connect to memory 326A-326D via memory interconnects 325A-325D. The memory 326A-326D and memory interconnects 325A-325D may be similar technology as in graphics processor 320 or can be different. The graphics compute engine tiles 340A-340D can also be interconnected via a set of tile interconnects 323A-323F and may be connected with and/or interconnected by a fabric interconnect 324. Cross-tile communications can be facilitated via the fabric interconnect 324. The fabric interconnect 324 (e.g., via the host interface 328) can also facilitate communication between compute engine tiles 340A-340D of multiple instances of the compute accelerator 330. In one embodiment the compute accelerator 330 includes a large L3 cache 336 that can be configured as a device-wide cache. The compute accelerator 330 can also connect to a host processor and memory via a host interface 328 in a similar manner as the graphics processor 320 of FIG. 3B.

The compute accelerator 330 can also include an integrated network interface 342. In one embodiment the network interface 342 includes a network processor and controller logic that enables the compute engine cluster 332 to communicate over a physical layer interconnect 344 without requiring data to traverse memory of a host system. In one embodiment, one of the compute engine tiles 340A-340D is replaced by network processor logic and data to be transmitted or received via the physical layer interconnect 344 may be transmitted directly to or from memory 326A-326D. Multiple instances of the compute accelerator 330 may be joined via the physical layer interconnect 344 into a single logical device. Alternatively, the various compute engine tiles 340A-340D may be presented as distinct network accessible compute accelerator devices.

Graphics Processing Engine

Figure 4:
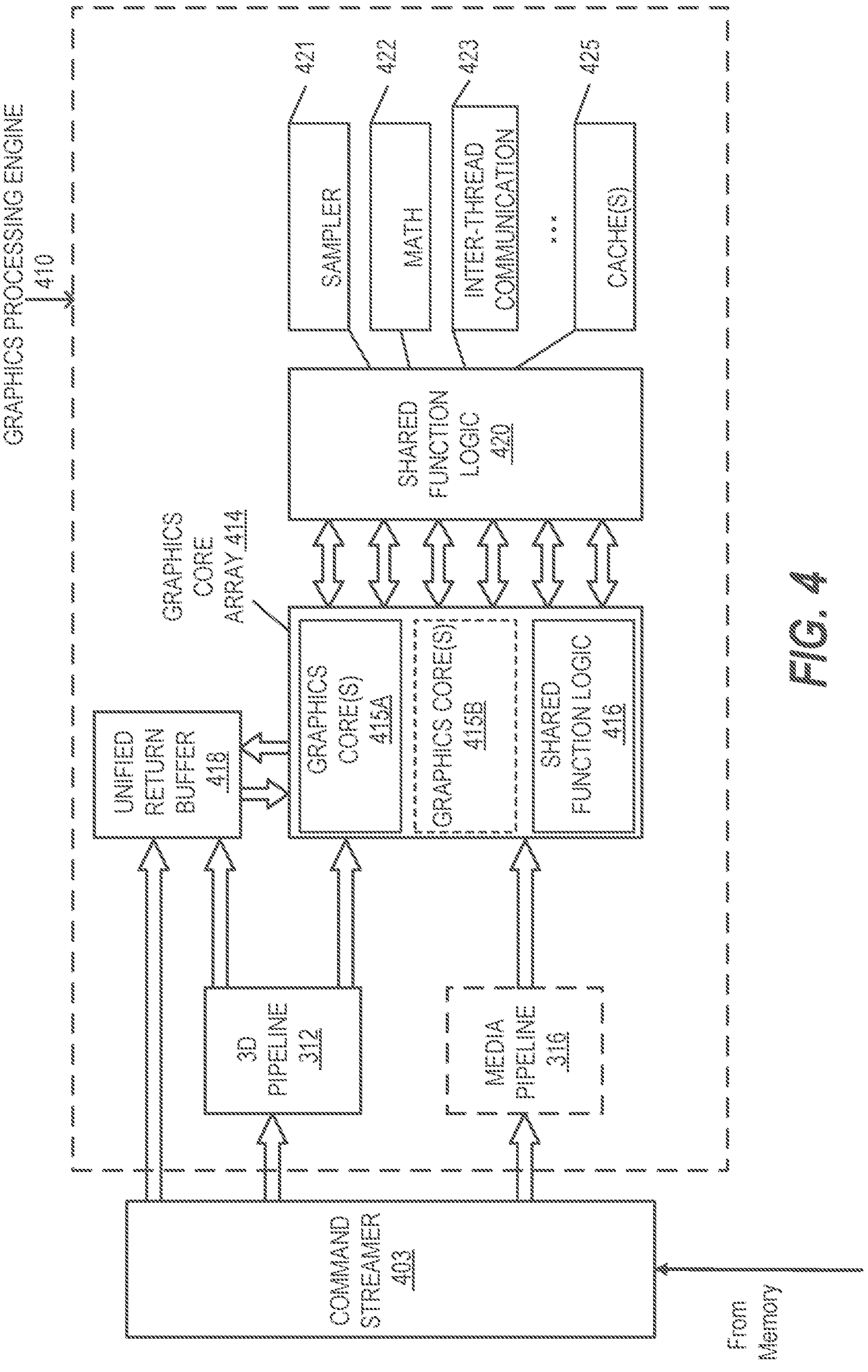
FIG. 4 is a block diagram of a graphics processing engine of a graphics processor in accordance with some embodiments.

FIG. 4 is a block diagram of a graphics processing engine 410 of a graphics processor in accordance with some embodiments. In one embodiment, the graphics processing engine (GPE) 410 is a version of the GPE 310 shown in FIG. 3A and may also represent a graphics engine tile 310A-310D of FIG. 3B. Elements of FIG. 4 having the same reference numbers (or names) as the elements of any other figure herein can operate or function in any manner similar to that described elsewhere herein, but are not limited to such. For example, the 3D pipeline 312 and media pipeline 316 of FIG. 3A are illustrated. The media pipeline 316 is optional in some embodiments of the GPE 410 and may not be explicitly included within the GPE 410. For example and in at least one embodiment, a separate media and/or image processor is coupled to the GPE 410.

In some embodiments, GPE 410 couples with or includes a command streamer 403, which provides a command stream to the 3D pipeline 312 and/or media pipelines 316. Alternatively or additionally, the command streamer 403 may be directly coupled to a unified return buffer 418. The unified return buffer 418 may be communicatively coupled to a graphics core cluster 414. In some embodiments, command streamer 403 is coupled with memory, which can be system memory, or one or more of internal cache memory and shared cache memory. In some embodiments, command streamer 403 receives commands from the memory and sends the commands to 3D pipeline 312 and/or media pipeline 316. The commands are directives fetched from a ring buffer, which stores commands for the 3D pipeline 312 and media pipeline 316. In one embodiment, the ring buffer can additionally include batch command buffers storing batches of multiple commands. The commands for the 3D pipeline 312 can also include references to data stored in memory, such as but not limited to vertex and geometry data for the 3D pipeline 312 and/or image data and memory objects for the media pipeline 316. The 3D pipeline 312 and media pipeline 316 process the commands and data by performing operations via logic within the respective pipelines or by dispatching one or more execution threads to a graphics core cluster 414. In one embodiment the graphics core cluster 414 include one or more blocks of graphics cores (e.g., graphics core block 415A, graphics core block 415B), each block including one or more graphics cores. Each graphics core includes a set of graphics execution resources that includes general-purpose and graphics specific execution logic to perform graphics and compute operations, as well as fixed function texture processing and/or machine learning and artificial intelligence acceleration logic, such as matrix or AI acceleration logic.

In various embodiments the 3D pipeline 312 can include fixed function and programmable logic to process one or more shader programs, such as vertex shaders, geometry shaders, pixel shaders, fragment shaders, compute shaders, or other shader and/or GPGPU programs, by processing the instructions and dispatching execution threads to the graphics core cluster 414. The graphics core cluster 414 provides a unified block of execution resources for use in processing these shader programs. Multi-purpose execution logic within the graphics core blocks 415A-415B of the graphics core cluster 414 includes support for various 3D API shader languages and can execute multiple simultaneous execution threads associated with multiple shaders.

In some embodiments, the graphics core cluster 414 includes execution logic to perform media functions, such as video and/or image processing. In one embodiment, the graphics cores include general-purpose logic that is programmable to perform parallel general-purpose computational operations, in addition to graphics processing operations. The general-purpose logic can perform processing operations in parallel or in conjunction with general-purpose logic within the processor core(s) 107 of FIG. 1 or core 202A-202N as in FIG. 2A.

Output data generated by threads executing on the graphics core cluster 414 can output data to memory in a unified return buffer (URB) 418. The URB 418 can store data for multiple threads. In some embodiments the URB 418 may be used to send data between different threads executing on the graphics core cluster 414. In some embodiments the URB 418 may additionally be used for synchronization between threads on the graphics core array and fixed function logic within the shared function logic 420.

In some embodiments, graphics core cluster 414 is scalable, such that the cluster includes a variable number of graphics cores, each having a variable number of graphics cores based on the target power and performance level of GPE 410. In one embodiment the execution resources are dynamically scalable, such that execution resources may be enabled or disabled as needed.

The graphics core cluster 414 couples with shared function logic 420 that includes multiple resources that are shared between the graphics cores in the graphics core array. The shared functions within the shared function logic 420 are hardware logic units that provide specialized supplemental functionality to the graphics core cluster 414. In various embodiments, shared function logic 420 may include, but is not limited to sampler 421, math 422, and inter-thread communication (ITC) 423 logic. Additionally, some embodiments implement one or more cache(s) 425 within the shared function logic 420. The shared function logic 420 can implement the same or similar functionality as the additional fixed function logic 238 of FIG. 2B.

A shared function is implemented at least in a case where the demand for a given specialized function is insufficient for inclusion within the graphics core cluster 414. Instead, a single instantiation of that specialized function is implemented as a stand-alone entity in the shared function logic 420 and shared among the execution resources within the graphics core cluster 414. The precise set of functions that are shared between the graphics core cluster 414 and included within the graphics core cluster 414 varies across embodiments. In some embodiments, specific shared functions within the shared function logic 420 that are used extensively by the graphics core cluster 414 may be included within shared function logic 416 within the graphics core cluster 414. In various embodiments, the shared function logic 416 within the graphics core cluster 414 can include some or all logic within the shared function logic 420. In one embodiment, all logic elements within the shared function logic 420 may be duplicated within the shared function logic 416 of the graphics core cluster 414. In one embodiment the shared function logic 420 is excluded in favor of the shared function logic 416 within the graphics core cluster 414.

Graphics Processing Resources

Figure 5A:
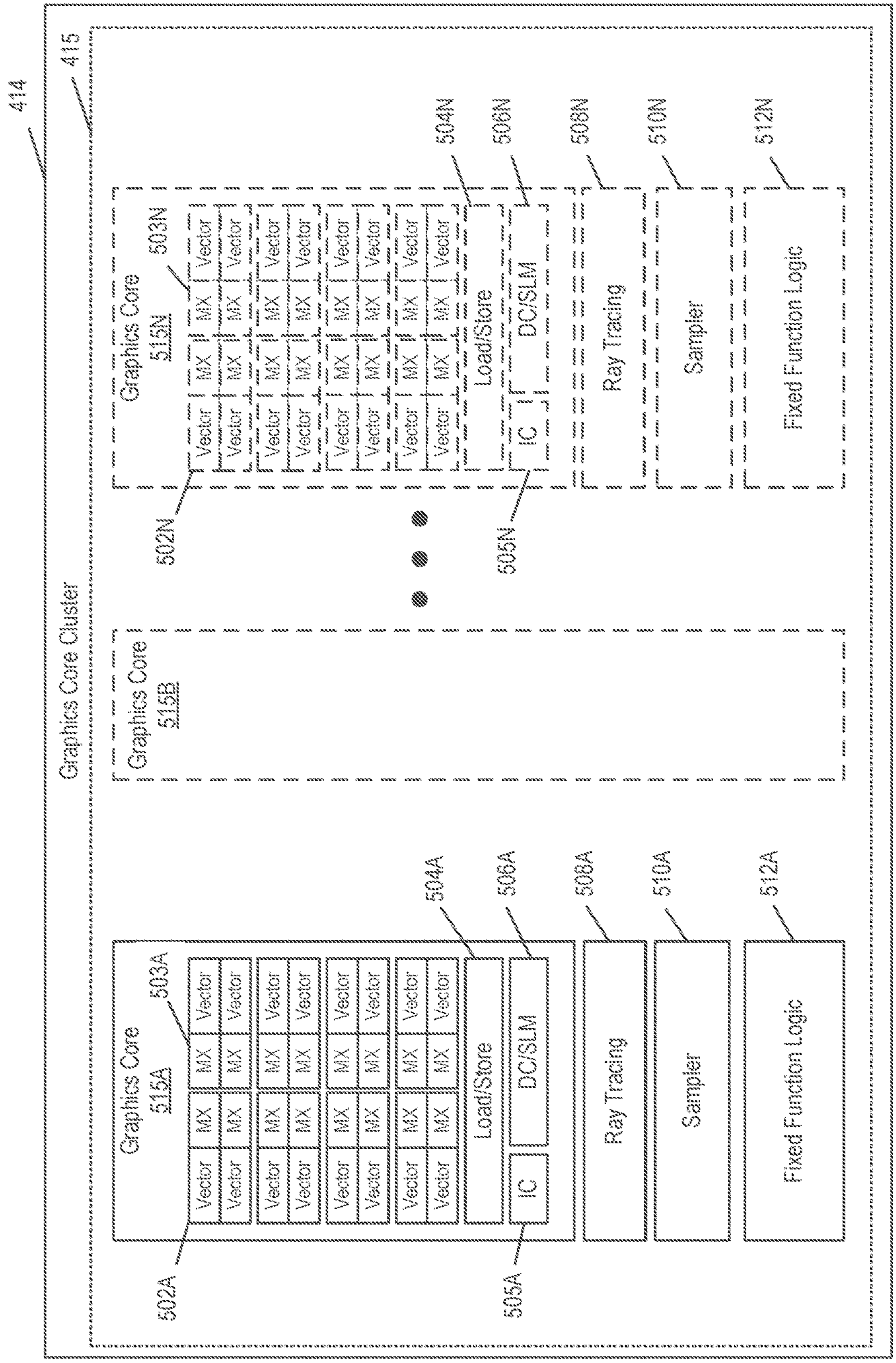
FIG. 5A illustrates graphics core cluster, according to an embodiment.
Figure 5B:
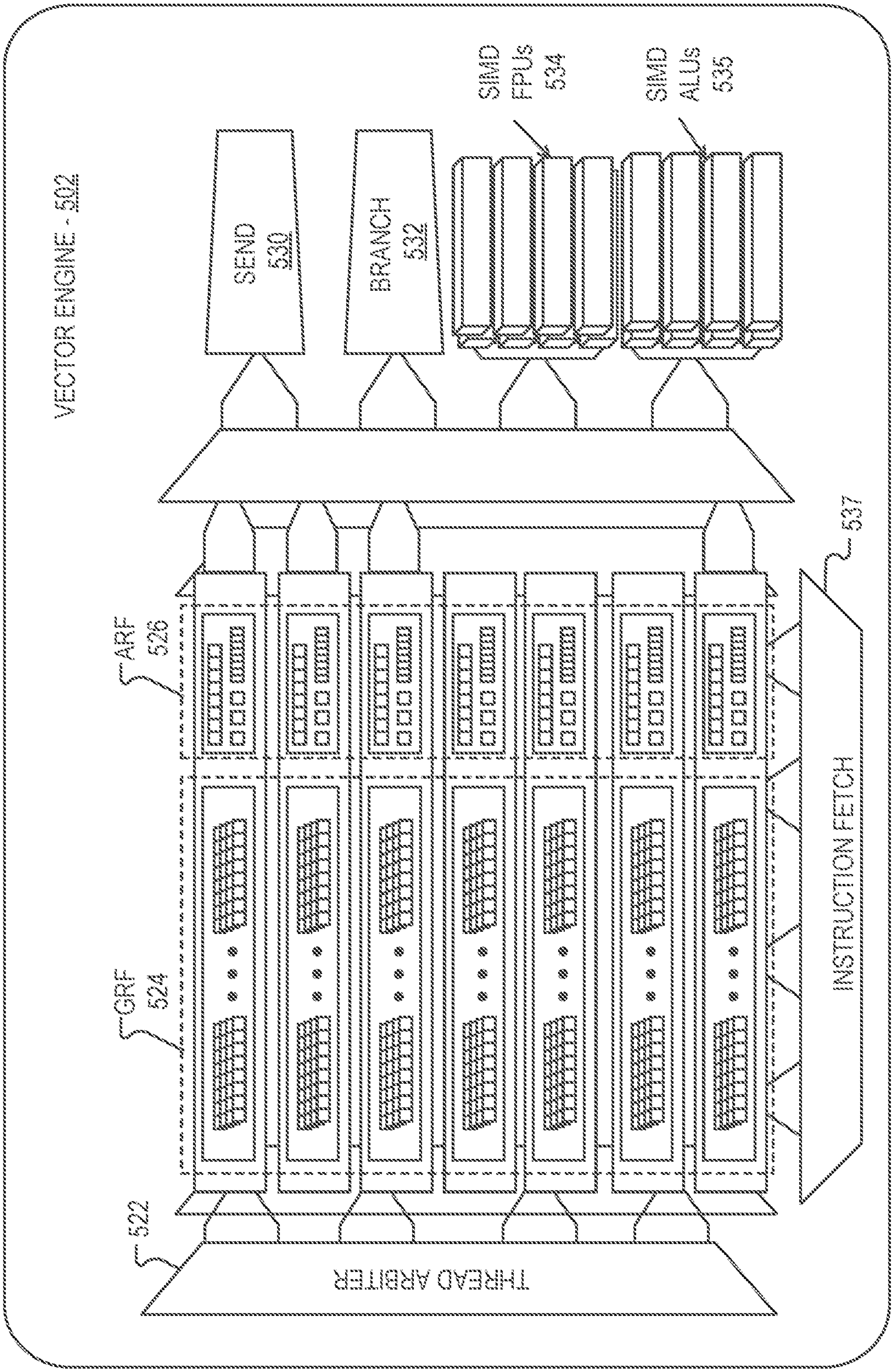
FIG. 5B illustrates a vector engine of a graphics core, according to an embodiment.
Figure 5C:
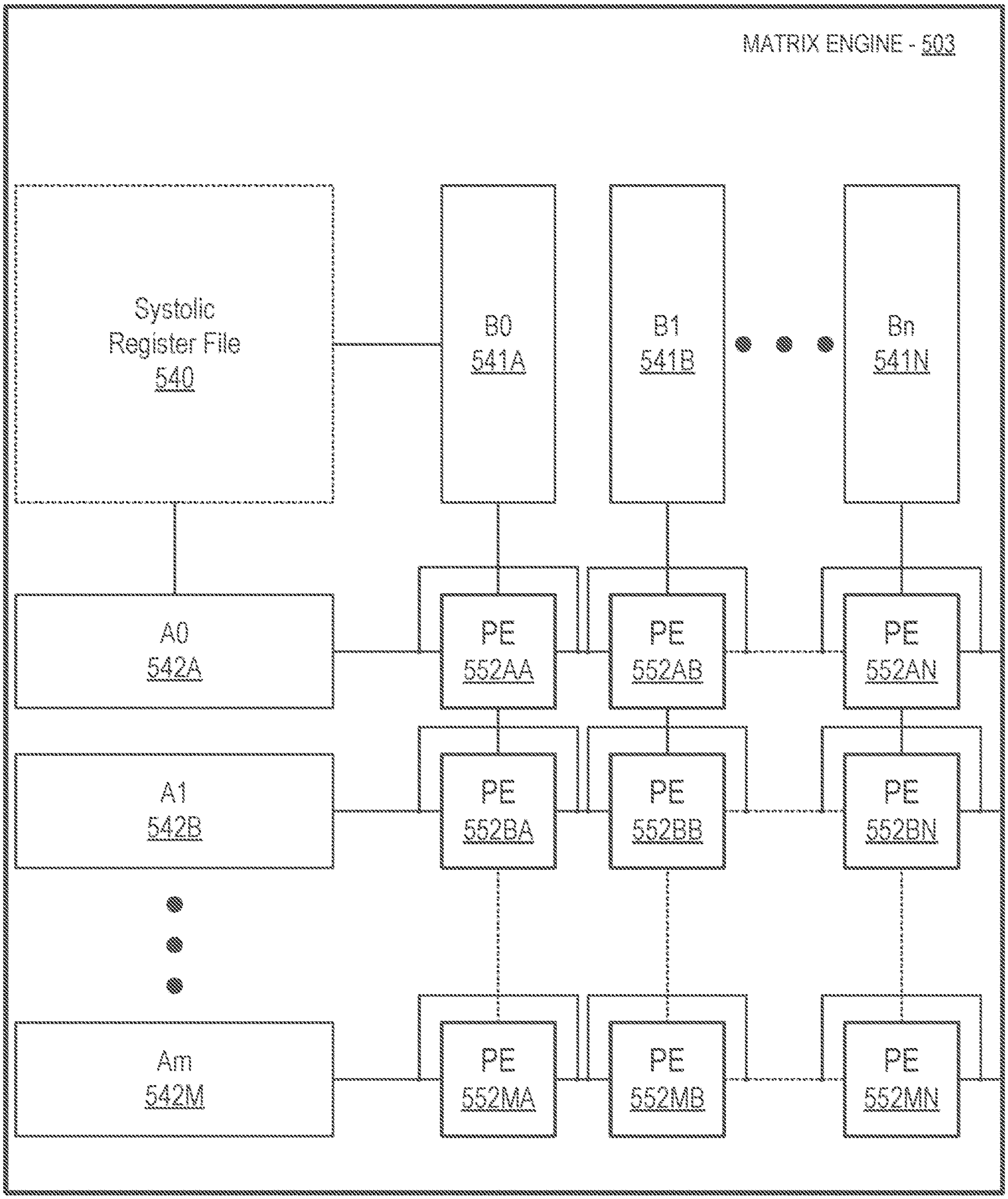
FIG. 5C illustrates a matrix engine of a graphics core, according to an embodiment.

FIG. 5A-5C illustrate execution logic including an array of processing elements employed in a graphics processor, according to embodiments described herein. FIG. 5A illustrates graphics core cluster, according to an embodiment. FIG. 5B illustrates a vector engine of a graphics core, according to an embodiment. FIG. 5C illustrates a matrix engine of a graphics core, according to an embodiment. Elements of FIG. 5A-5C having the same reference numbers as the elements of any other figure herein may operate or function in any manner similar to that described elsewhere herein, but are not limited as such. For example, the elements of FIG. 5A-5C can be considered in the context of the graphics processor core block 219 of FIG. 2B, and/or the graphics core blocks 415A-415B of FIG. 4. In one embodiment, the elements of FIG. 5A-5C have similar functionality to equivalent components of the graphics processor 208 of FIG. 2A, the GPU 239 of FIG. 2C or the GPGPU 270 of FIG. 2D.

As shown in FIG. 5A, in one embodiment the graphics core cluster 414 includes a graphics core block 415, which may be graphics core block 415A or graphics core block 415B of FIG. 4. The graphics core block 415 can include any number of graphics cores (e.g., graphics core 515A, graphics core 515B, through graphics core 515N). Multiple instances of the graphics core block 415 may be included. In one embodiment the elements of the graphics cores 515A-515N have similar or equivalent functionality as the elements of the graphics cores 221A-221F of FIG. 2B. In such embodiment, the graphics cores 515A-515N each include circuitry including but not limited to vector engines 502A-502N, matrix engines 503A-503N, memory load/store units 504A-504N, instruction caches 505A-505N, data caches/shared local memory 506A-506N, ray tracing units 508A-508N, samplers 510A-2710N. The circuitry of the graphics cores 515A-515N can additionally include fixed function logic 512A-512N. The number of vector engines 502A-502N and matrix engines 503A-503N within the graphics cores 515A-515N of a design can vary based on the workload, performance, and power targets for the design.

With reference to graphics core 515A, the vector engine 502A and matrix engine 503A are configurable to perform parallel compute operations on data in a variety of integer and floating-point data formats based on instructions associated with shader programs. Each vector engine 502A and matrix engine 503A can act as a programmable general-purpose computational unit that is capable of executing multiple simultaneous hardware threads while processing multiple data elements in parallel for each thread. The vector engine 502A and matrix engine 503A support the processing of variable width vectors at various SIMD widths, including but not limited to SIMD8, SIMD16, and SIMD32. Input data elements can be stored as a packed data type in a register and the vector engine 502A and matrix engine 503A can process the various elements based on the data size of the elements. For example, when operating on a 256-bit wide vector, the 256 bits of the vector are stored in a register and the vector is processed as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible. In one embodiment, the vector engine 502A and matrix engine 503A are also configurable for SIMT operation on warps or thread groups of various sizes (e.g., 8, 16, or 32 threads).

Continuing with graphics core 515A, the memory load/store unit 504A services memory access requests that are issued by the vector engine 502A, matrix engine 503A, and/or other components of the graphics core 515A that have access to memory. The memory access request can be processed by the memory load/store unit 504A to load or store the requested data to or from cache or memory into a register file associated with the vector engine 502A and/or matrix engine 503A. The memory load/store unit 504A can also perform prefetching operations. In one embodiment, the memory load/store unit 504A is configured to provide SIMT scatter/gather prefetching or block prefetching for data stored in memory 610, from memory that is local to other tiles via the tile interconnect 608, or from system memory. Prefetching can be performed to a specific L1 cache (e.g., data cache/shared local memory 506A), the L2 cache 604 or the L3 cache 606. In one embodiment, a prefetch to the L3 cache 606 automatically results in the data being stored in the L2 cache 604.

The instruction cache 505A stores instructions to be executed by the graphics core 515A. In one embodiment, the graphics core 515A also includes instruction fetch and prefetch circuitry that fetches or prefetches instructions into the instruction cache 505A. The graphics core 515A also includes instruction decode logic to decode instructions within the instruction cache 505A. The data cache/shared local memory 506A can be configured as a data cache that is managed by a cache controller that implements a cache replacement policy and/or configured as explicitly managed shared memory. The ray tracing unit 508A includes circuitry to accelerate ray tracing operations. The sampler 510A provides texture sampling for 3D operations and media sampling for media operations. The fixed function logic 512A includes fixed function circuitry that is shared between the various instances of the vector engine 502A and matrix engine 503A. Graphics cores 515B-515N can operate in a similar manner as graphics core 515A.

Functionality of the instruction caches 505A-505N, data caches/shared local memory 506A-506N, ray tracing units 508A-508N, samplers 510A-2710N, and fixed function logic 512A-512N corresponds with equivalent functionality in the graphics processor architectures described herein. For example, the instruction caches 505A-505N can operate in a similar manner as instruction cache 255 of FIG. 2D. The data caches/shared local memory 506A-506N, ray tracing units 508A-508N, and samplers 510A-2710N can operate in a similar manner as the cache/SLM 228A-228F, ray tracing units 227A-227F, and samplers 226A-226F of FIG. 2B. The fixed function logic 512A-512N can include elements of the geometry/fixed function pipeline 231 and/or additional fixed function logic 238 of FIG. 2B. In one embodiment, the ray tracing units 508A-508N include circuitry to perform ray tracing acceleration operations performed by the ray tracing cores 245 of FIG. 2C.

As shown in FIG. 5B, in one embodiment the vector engine 502 includes an instruction fetch unit 537, a general register file array (GRF) 524, an architectural register file array (ARF) 526, a thread arbiter 522, a send unit 530, a branch unit 532, a set of SIMD floating point units (FPUs) 534, and in one embodiment a set of integer SIMD ALUs 535. The GRF 524 and ARF 526 includes the set of general register files and architecture register files associated with each hardware thread that may be active in the vector engine 502. In one embodiment, per thread architectural state is maintained in the ARF 526, while data used during thread execution is stored in the GRF 524. The execution state of each thread, including the instruction pointers for each thread, can be held in thread-specific registers in the ARF 526.

In one embodiment the vector engine 502 has an architecture that is a combination of Simultaneous Multi-Threading (SMT) and fine-grained Interleaved Multi-Threading (IMT). The architecture has a modular configuration that can be fine-tuned at design time based on a target number of simultaneous threads and number of registers per graphics core, where graphics core resources are divided across logic used to execute multiple simultaneous threads. The number of logical threads that may be executed by the vector engine 502 is not limited to the number of hardware threads, and multiple logical threads can be assigned to each hardware thread.

In one embodiment, the vector engine 502 can co-issue multiple instructions, which may each be different instructions. The thread arbiter 522 can dispatch the instructions to one of the send unit 530, branch unit 532, or SIMD FPU(s) 534 for execution. Each execution thread can access 128 general-purpose registers within the GRF 524, where each register can store 32 bytes, accessible as a variable width vector of 32-bit data elements. In one embodiment, each thread has access to 4 Kbytes within the GRF 524, although embodiments are not so limited, and greater or fewer register resources may be provided in other embodiments. In one embodiment the vector engine 502 is partitioned into seven hardware threads that can independently perform computational operations, although the number of threads per vector engine 502 can also vary according to embodiments. For example, in one embodiment up to 16 hardware threads are supported. In an embodiment in which seven threads may access 4 Kbytes, the GRF 524 can store a total of 28 Kbytes. Where 16 threads may access 4 Kbytes, the GRF 524 can store a total of 64 Kbytes. Flexible addressing modes can permit registers to be addressed together to build effectively wider registers or to represent strided rectangular block data structures.

In one embodiment, memory operations, sampler operations, and other longer-latency system communications are dispatched via "send" instructions that are executed by the message passing send unit 530. In one embodiment, branch instructions are dispatched to a dedicated branch unit 532 to facilitate SIMD divergence and eventual convergence.

In one embodiment the vector engine 502 includes one or more SIMD floating point units (FPU(s)) 534 to perform floating-point operations. In one embodiment, the FPU(s) 534 also support integer computation. In one embodiment the FPU(s) 534 can execute up to M number of 32-bit floating-point (or integer) operations, or execute up to 2M 16-bit integer or 16-bit floating-point operations. In one embodiment, at least one of the FPU(s) provides extended math capability to support high-throughput transcendental math functions and double precision 64-bit floating-point. In some embodiments, a set of 8-bit integer SIMD ALUs 535 are also present and may be specifically optimized to perform operations associated with machine learning computations. In one embodiment, the SIMD ALUs are replaced by an additional set of SIMD FPUs 534 that are configurable to perform integer and floating-point operations. In one embodiment, the SIMD FPUs 534 and SIMD ALUs 535 are configurable to execute SIMT programs. In one embodiment, combined SIMD+SIMT operation is supported.

In one embodiment, arrays of multiple instances of the vector engine 502 can be instantiated in a graphics core. For scalability, product architects can choose the exact number of vector engines per graphics core grouping. In one embodiment the vector engine 502 can execute instructions across a plurality of execution channels. In a further embodiment, each thread executed on the vector engine 502 is executed on a different channel.

As shown in FIG. 5C, in one embodiment the matrix engine 503 includes an array of processing elements that are configured to perform tensor operations including vector/matrix and matrix/matrix operations, such as but not limited to matrix multiply and/or dot product operations. The matrix engine 503 is configured with M rows and N columns of processing elements (PE 552AA-PE 552MN) that include multiplier and adder circuits organized in a pipelined fashion. In one embodiment, the processing elements 552AA-PE 552MN make up the physical pipeline stages of an N wide and M deep systolic array that can be used to perform vector/matrix or matrix/matrix operations in a data-parallel manner, including matrix multiply, fused multiply-add, dot product or other general matrix-matrix multiplication (GEMM) operations. In one embodiment the matrix engine 503 supports 16-bit floating point operations, as well as 8-bit, 4-bit, 2-bit, and binary integer operations. The matrix engine 503 can also be configured to accelerate specific machine learning operations. In such embodiments, the matrix engine 503 can be configured with support for the bfloat (brain floating point) 16-bit floating point format or a tensor float 32-bit floating point format (TF32) that have different numbers of mantissa and exponent bits relative to Institute of Electrical and Electronics Engineers (IEEE) 754 formats.

In one embodiment, during each cycle, each stage can add the result of operations performed at that stage to the output of the previous stage. In other embodiments, the pattern of data movement between the processing elements 552AA-552MN after a set of computational cycles can vary based on the instruction or macro-operation being performed. For example, in one embodiment partial sum loopback is enabled and the processing elements may instead add the output of a current cycle with output generated in the previous cycle. In one embodiment, the final stage of the systolic array can be configured with a loopback to the initial stage of the systolic array. In such embodiment, the number of physical pipeline stages may be decoupled from the number of logical pipeline stages that are supported by the matrix engine 503. For example, where the processing elements 552AA-552MN are configured as a systolic array of M physical stages, a loopback from stage M to the initial pipeline stage can enable the processing elements 552AA-PE552MN to operate as a systolic array of, for example, 2M, 3M, 4M, etc., logical pipeline stages.

In one embodiment, the matrix engine 503 includes memory 541A-541N, 542A-542M to store input data in the form of row and column data for input matrices. Memory 542A-542M is configurable to store row elements (A0-Am) of a first input matrix and memory 541A-541N is configurable to store column elements (B0-Bn) of a second input matrix. The row and column elements are provided as input to the processing elements 552AA-552MN for processing. In one embodiment, row and column elements of the input matrices can be stored in a systolic register file 540 within the matrix engine 503 before those elements are provided to the memory 541A-541N, 542A-542M. In one embodiment, the systolic register file 540 is excluded and the memory 541A-541N, 542A-542M is loaded from registers in an associated vector engine (e.g., GRF 524 of vector engine 502 of FIG. 5B) or other memory of the graphics core that includes the matrix engine 503 (e.g., data cache/shared local memory 506A for matrix engine 503A of FIG. 5A). Results generated by the processing elements 552AA-552MN are then output to an output buffer and/or written to a register file (e.g., systolic register file 540, GRF 524, data cache/shared local memory 506A-506N) for further processing by other functional units of the graphics processor or for output to memory.

In some embodiments, the matrix engine 503 is configured with support for input sparsity, where multiplication operations for sparse regions of input data can be bypassed by skipping multiply operations that have a zero-value operand. In one embodiment, the processing elements 552AA-552MN are configured to skip the performance of certain operations that have zero value input. In one embodiment, sparsity within input matrices can be detected and operations having known zero output values can be bypassed before being submitted to the processing elements 552AA-552MN. The loading of zero value operands into the processing elements can be bypassed and the processing elements 552AA-552MN can be configured to perform multiplications on the non-zero value input elements. The matrix engine 503 can also be configured with support for output sparsity, such that operations with results that are pre-determined to be zero are bypassed. For input sparsity and/or output sparsity, in one embodiment, metadata is provided to the processing elements 552AA-552MN to indicate, for a processing cycle, which processing elements and/or data channels are to be active during that cycle.

In one embodiment, the matrix engine 503 includes hardware to enable operations on sparse data having a compressed representation of a sparse matrix that stores non-zero values and metadata that identifies the positions of the non-zero values within the matrix. Exemplary compressed representations include but are not limited to compressed tensor representations such as compressed sparse row (CSR), compressed sparse column (CSC), compressed sparse fiber (CSF) representations. Support for compressed representations enable operations to be performed on input in a compressed tensor format without requiring the compressed representation to be decompressed or decoded. In such embodiment, operations can be performed only on non-zero input values and the resulting non-zero output values can be mapped into an output matrix. In some embodiments, hardware support is also provided for machine-specific lossless data compression formats that are used when transmitting data within hardware or across system busses. Such data may be retained in a compressed format for sparse input data and the matrix engine 503 can used the compression metadata for the compressed data to enable operations to be performed on only non-zero values, or to enable blocks of zero data input to be bypassed for multiply operations.

In various embodiments, input data can be provided by a programmer in a compressed tensor representation, or a codec can compress input data into the compressed tensor representation or another sparse data encoding. In addition to support for compressed tensor representations, streaming compression of sparse input data can be performed before the data is provided to the processing elements 552AA-552MN. In one embodiment, compression is performed on data written to a cache memory associated with the graphics core cluster 414, with the compression being performed with an encoding that is supported by the matrix engine 503. In one embodiment, the matrix engine 503 includes support for input having structured sparsity in which a pre-determined level or pattern of sparsity is imposed on input data. This data may be compressed to a known compression ratio, with the compressed data being processed by the processing elements 552AA-552MN according to metadata associated with the compressed data.

Figure 6:
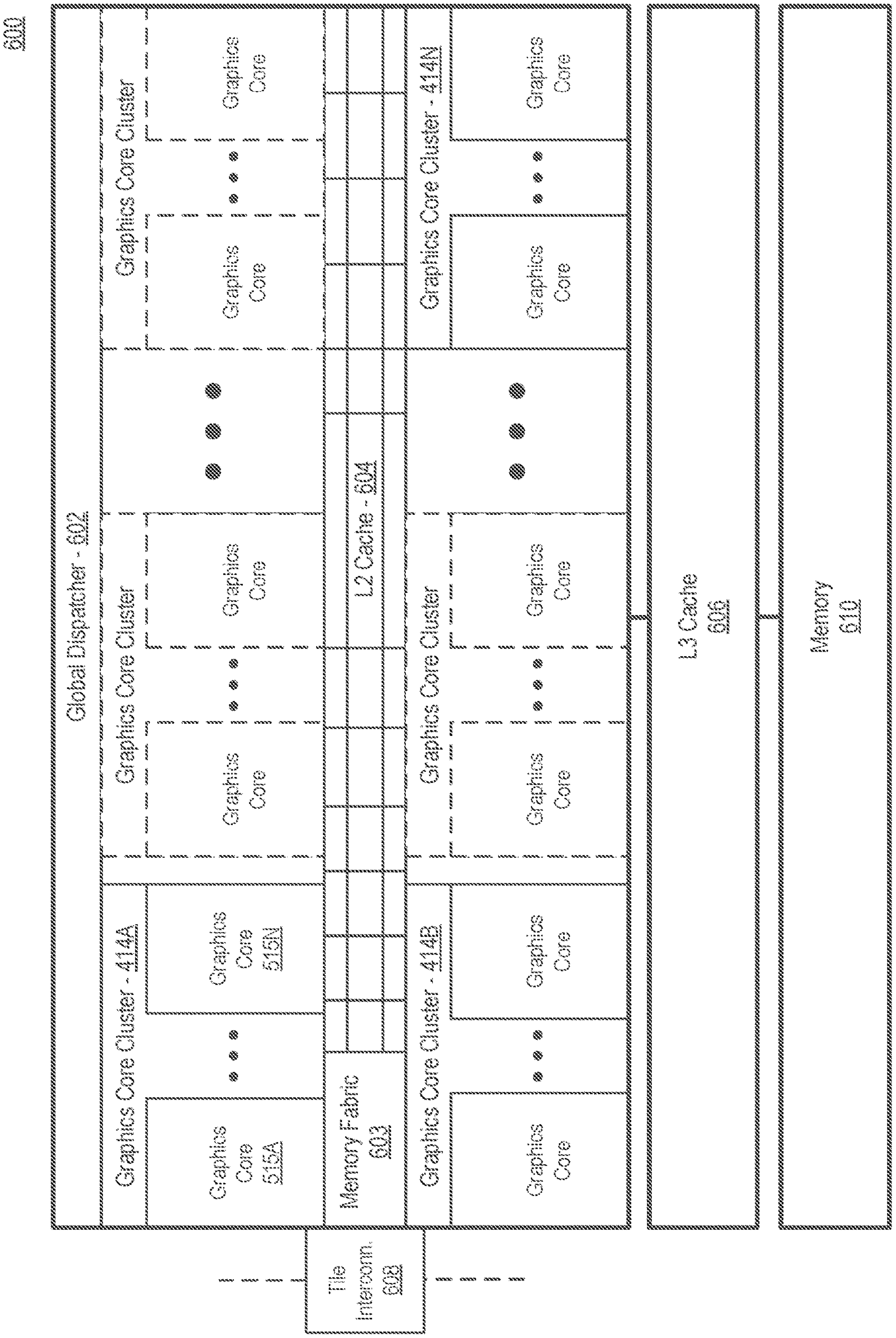
FIG. 6 illustrates a tile of a multi-tile processor, according to an embodiment.

FIG. 6 illustrates a tile 600 of a multi-tile processor, according to an embodiment. In one embodiment, the tile 600 is representative of one of the graphics engine tiles 310A-310D of FIG. 3B or compute engine tiles 340A-340D of FIG. 3C. The tile 600 of the multi-tile graphics processor includes an array of graphics core clusters (e.g., graphics core cluster 414A, graphics core cluster 414B, through graphics core cluster 414N), with each graphics core cluster having an array of graphics cores 515A-515N. The tile 600 also includes a global dispatcher 602 to dispatch threads to processing resources of the tile 600.

The tile 600 can include or couple with an L3 cache 606 and memory 610. In various embodiments, the L3 cache 606 may be excluded or the tile 600 can include additional levels of cache, such as an L4 cache. In one embodiment, each instance of the tile 600 in the multi-tile graphics processor has an associated memory 610, such as in FIG. 3B and FIG. 3C. In one embodiment, a multi-tile processor can be configured as a multi-chip module in which the L3 cache 606 and/or memory 610 reside on separate chiplets than the graphics core clusters 414A-414N. In this context, a chiplet is an at least partially packaged integrated circuit that includes distinct units of logic that can be assembled with other chiplets into a larger package. For example, the L3 cache 606 can be included in a dedicated cache chiplet or can reside on the same chiplet as the graphics core clusters 414A-414N. In one embodiment, the L3 cache 606 can be included in an active base die or active interposer, as illustrated in FIG. 11C.

A memory fabric 603 enables communication among the graphics core clusters 414A-414N, L3 cache 606, and memory 610. An L2 cache 604 couples with the memory fabric 603 and is configurable to cache transactions performed via the memory fabric 603. A tile interconnect 608 enables communication with other tiles on the graphics processors and may be one of tile interconnects 323A-323F of FIGS. 3B and 3C. In embodiments in which the L3 cache 606 is excluded from the tile 600, the L2 cache 604 may be configured as a combined L2/L3 cache. The memory fabric 603 is configurable to route data to the L3 cache 606 or memory controllers associated with the memory 610 based on the presence or absence of the L3 cache 606 in a specific implementation. The L3 cache 606 can be configured as a per-tile cache that is dedicated to processing resources of the tile 600 or may be a partition of a GPU-wide L3 cache.

Figure 7:
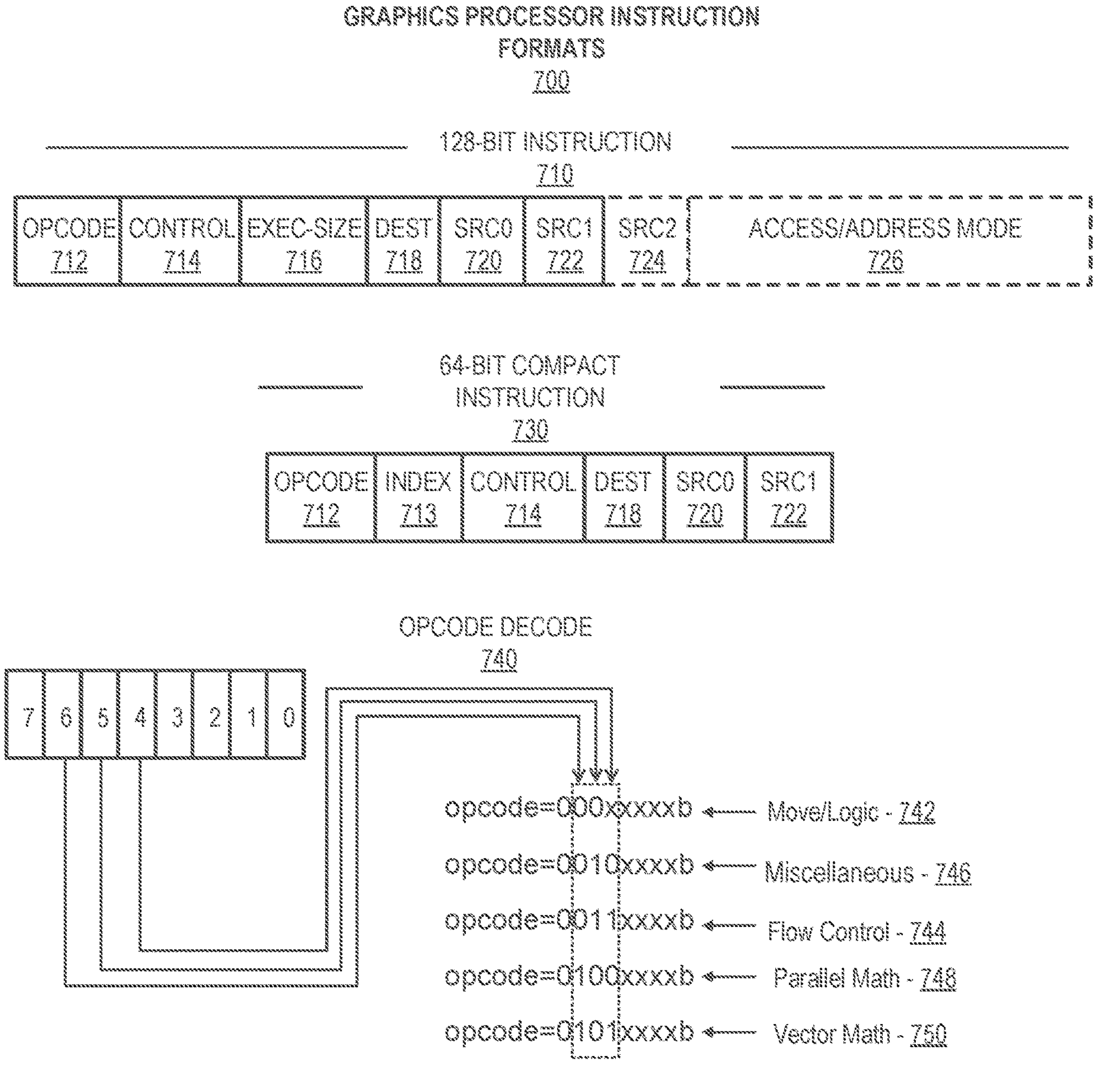
FIG. 7 is a block diagram illustrating graphics processor instruction formats according to some embodiments.

FIG. 7 is a block diagram illustrating graphics processor instruction formats 700 according to some embodiments. In one or more embodiment, the graphics processor cores support an instruction set having instructions in multiple formats. The solid lined boxes illustrate the components that are generally included in a graphics core instruction, while the dashed lines include components that are optional or that are only included in a sub-set of the instructions. In some embodiments, the graphics processor instruction format 700 described and illustrated are macro-instructions, in that they are instructions supplied to the graphics core, as opposed to micro-operations resulting from instruction decode once the instruction is processed. Thus, a single instruction may cause hardware to perform multiple micro-operations.

In some embodiments, the graphics processor natively supports instructions in a 128-bit instruction format 710. A 64-bit compacted instruction format 730 is available for some instructions based on the selected instruction, instruction options, and number of operands. The native 128-bit instruction format 710 provides access to all instruction options, while some options and operations are restricted in the 64-bit format 730. The native instructions available in the 64-bit format 730 vary by embodiment. In some embodiments, the instruction is compacted in part using a set of index values in an index field 713. The graphics core hardware references a set of compaction tables based on the index values and uses the compaction table outputs to reconstruct a native instruction in the 128-bit instruction format 710. Other sizes and formats of instruction can be used.

For each format, instruction opcode 712 defines the operation that the graphics core is to perform. The graphics cores execute each instruction in parallel across the multiple data elements of each operand. For example, in response to an add instruction the graphics core performs a simultaneous add operation across each color channel representing a texture element or picture element. By default, the graphics core performs each instruction across all data channels of the operands. In some embodiments, instruction control field 714 enables control over certain execution options, such as channels selection (e.g., predication) and data channel order (e.g., swizzle). For instructions in the 128-bit instruction format 710 an exec-size field 716 limits the number of data channels that will be executed in parallel. In some embodiments, exec-size field 716 is not available for use in the 64-bit compact instruction format 730.

Some graphics core instructions have up to three operands including two source operands, src0 720, src1 722, and one destination 718. In some embodiments, the graphics cores support dual destination instructions, where one of the destinations is implied. Data manipulation instructions can have a third source operand (e.g., SRC2 724), where the instruction opcode 712 determines the number of source operands. An instruction's last source operand can be an immediate (e.g., hard-coded) value passed with the instruction.

In some embodiments, the 128-bit instruction format 710 includes an access/address mode field 726 specifying, for example, whether direct register addressing mode or indirect register addressing mode is used. When direct register addressing mode is used, the register address of one or more operands is directly provided by bits in the instruction.

In some embodiments, the 128-bit instruction format 710 includes an access/address mode field 726, which specifies an address mode and/or an access mode for the instruction. In one embodiment the access mode is used to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction may use byte-aligned addressing for source and destination operands and when in a second mode, the instruction may use 16-byte-aligned addressing for all source and destination operands.

In one embodiment, the address mode portion of the access/address mode field 726 determines whether the instruction is to use direct or indirect addressing. When direct register addressing mode is used bits in the instruction directly provide the register address of one or more operands. When indirect register addressing mode is used, the register address of one or more operands may be computed based on an address register value and an address immediate field in the instruction.

In some embodiments instructions are grouped based on opcode 712 bit-fields to simplify Opcode decode 740. For an 8-bit opcode, bits 4, 5, and 6 allow the graphics core to determine the type of opcode. The precise opcode grouping shown is merely an example. In some embodiments, a move and logic opcode group 742 includes data movement and logic instructions (e.g., move (mov), compare (cmp)). In some embodiments, move and logic group 742 shares the five most significant bits (MSB), where move (mov) instructions are in the form of 0000xxxxb and logic instructions are in the form of 0001xxxxb. A flow control instruction group 744 (e.g., call, jump (jmp)) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, multiply (mul)) in the form of 0100xxxxb (e.g., 0x40). The parallel math instruction group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands. The illustrated opcode decode 740, in one embodiment, can be used to determine which portion of a graphics core will be used to execute a decoded instruction. For example, some instructions may be designated as systolic instructions that will be performed by a systolic array. Other instructions, such as ray-tracing instructions (not shown) can be routed to a ray-tracing core or ray-tracing logic within a slice or partition of execution logic.

Graphics Pipeline

Figure 8:
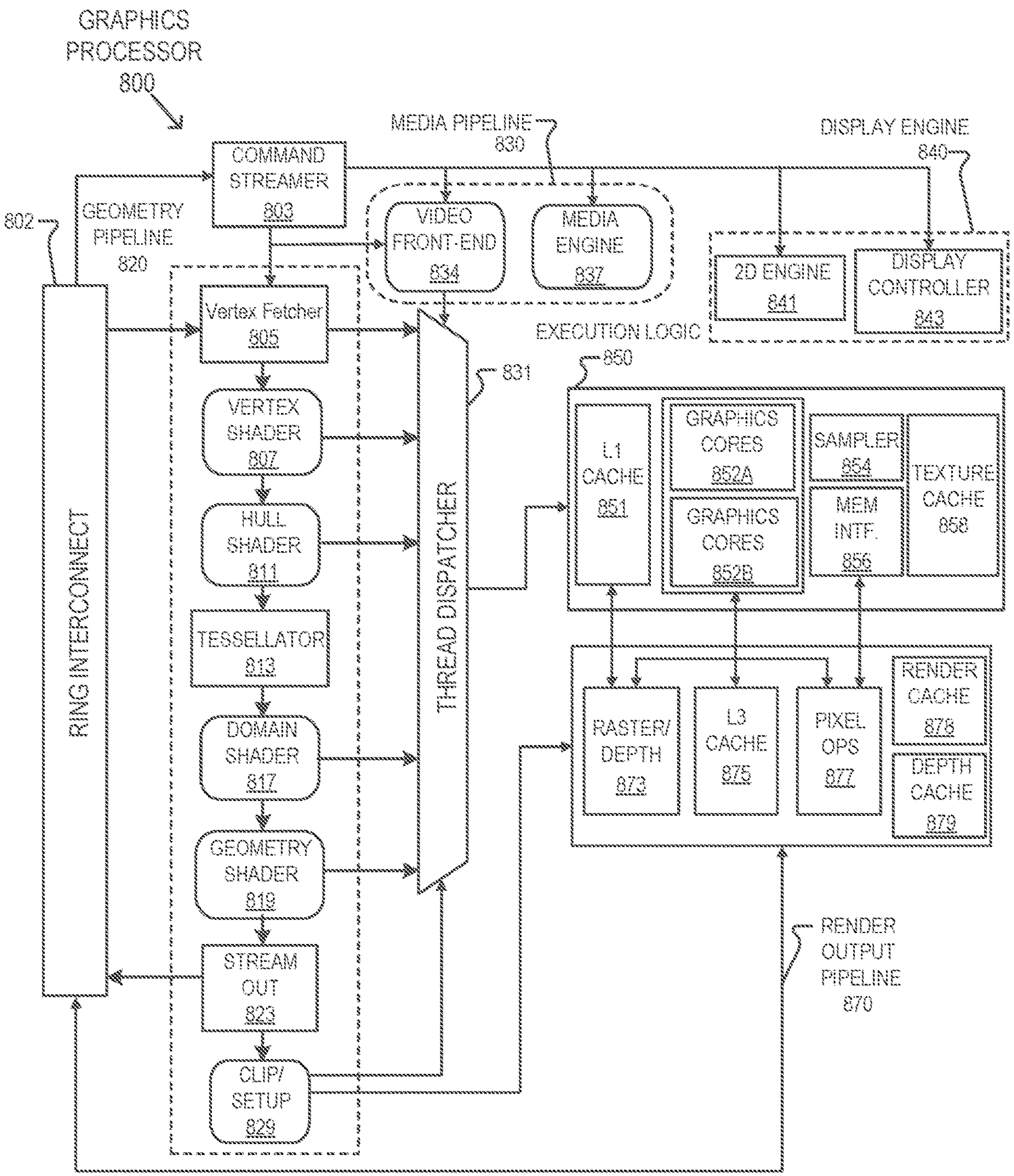
FIG. 8 is a block diagram of another embodiment of a graphics processor.

FIG. 8 is a block diagram of another embodiment of a graphics processor 800. Elements of FIG. 8 having the same reference numbers (or names) as the elements of any other figure herein can operate or function in any manner similar to that described elsewhere herein, but are not limited to such.

In some embodiments, graphics processor 800 includes a geometry pipeline 820, a media pipeline 830, a display engine 840, thread execution logic 850, and a render output pipeline 870. In some embodiments, graphics processor 800 is a graphics processor within a multi-core processing system that includes one or more general-purpose processing cores. The graphics processor is controlled by register writes to one or more control registers (not shown) or via commands issued to graphics processor 800 via a ring interconnect 802. In some embodiments, ring interconnect 802 couples graphics processor 800 to other processing components, such as other graphics processors or general-purpose processors. Commands from ring interconnect 802 are interpreted by a command streamer 803, which supplies instructions to individual components of the geometry pipeline 820 or the media pipeline 830.

In some embodiments, command streamer 803 directs the operation of a vertex fetcher 805 that reads vertex data from memory and executes vertex-processing commands provided by command streamer 803. In some embodiments, vertex fetcher 805 provides vertex data to a vertex shader 807, which performs coordinate space transformation and lighting operations to each vertex. In some embodiments, vertex fetcher 805 and vertex shader 807 execute vertex-processing instructions by dispatching execution threads to graphics cores 852A-852B via a thread dispatcher 831.

In some embodiments, graphics cores 852A-852B are an array of vector processors having an instruction set for performing graphics and media operations. In some embodiments, graphics cores 852A-852B have an attached L1 cache 851 that is specific for each array or shared between the arrays. The cache can be configured as a data cache, an instruction cache, or a single cache that is partitioned to contain data and instructions in different partitions.

In some embodiments, geometry pipeline 820 includes tessellation components to perform hardware-accelerated tessellation of 3D objects. In some embodiments, a programmable hull shader 811 configures the tessellation operations. A programmable domain shader 817 provides backend evaluation of tessellation output. A tessellator 813 operates at the direction of hull shader 811 and contains special purpose logic to generate a set of detailed geometric objects based on a coarse geometric model that is provided as input to geometry pipeline 820. In some embodiments, if tessellation is not used, tessellation components (e.g., hull shader 811, tessellator 813, and domain shader 817) can be bypassed. The tessellation components can operate based on data received from the vertex shader 807.

In some embodiments, complete geometric objects can be processed by a geometry shader 819 via one or more threads dispatched to graphics cores 852A-852B or can proceed directly to the clipper 829. In some embodiments, the geometry shader operates on entire geometric objects, rather than vertices or patches of vertices as in previous stages of the graphics pipeline. If the tessellation is disabled the geometry shader 819 receives input from the vertex shader 807. In some embodiments, geometry shader 819 is programmable by a geometry shader program to perform geometry tessellation if the tessellation units are disabled.

Before rasterization, a clipper 829 processes vertex data. The clipper 829 may be a fixed function clipper or a programmable clipper having clipping and geometry shader functions. In some embodiments, a rasterizer and depth test component 873 in the render output pipeline 870 dispatches pixel shaders to convert the geometric objects into per pixel representations. In some embodiments, pixel shader logic is included in thread execution logic 850. In some embodiments, an application can bypass the rasterizer and depth test component 873 and access un-rasterized vertex data via a stream out unit 823.

The graphics processor 800 has an interconnect bus, interconnect fabric, or some other interconnect mechanism that allows data and message passing amongst the major components of the processor. In some embodiments, graphics cores 852A-852B and associated logic units (e.g., L1 cache 851, sampler 854, texture cache 858, etc.) interconnect via a data port 856 to perform memory access and communicate with render output pipeline components of the processor. In some embodiments, sampler 854, caches 851, 858 and graphics cores 852A-852B each have separate memory access paths. In one embodiment the texture cache 858 can also be configured as a sampler cache.

In some embodiments, render output pipeline 870 contains a rasterizer and depth test component 873 that converts vertex-based objects into an associated pixel-based representation. In some embodiments, the rasterizer logic includes a windower/masker unit to perform fixed function triangle and line rasterization. An associated render cache 878 and depth cache 879 are also available in some embodiments. A pixel operations component 877 performs pixel-based operations on the data, though in some instances, pixel operations associated with 2D operations (e.g., bit block image transfers with blending) are performed by the 2D engine 841, or substituted at display time by the display controller 843 using overlay display planes. In some embodiments, a shared L3 cache 875 is available to all graphics components, allowing the sharing of data without the use of main system memory.

In some embodiments, media pipeline 830 includes a media engine 837 and a video front-end 834. In some embodiments, video front-end 834 receives pipeline commands from the command streamer 803. In some embodiments, media pipeline 830 includes a separate command streamer. In some embodiments, video front-end 834 processes media commands before sending the command to the media engine 837. In some embodiments, media engine 837 includes thread spawning functionality to spawn threads for dispatch to thread execution logic 850 via thread dispatcher 831.

In some embodiments, graphics processor 800 includes a display engine 840. In some embodiments, display engine 840 is external to processor 800 and couples with the graphics processor via the ring interconnect 802, or some other interconnect bus or fabric. In some embodiments, display engine 840 includes a 2D engine 841 and a display controller 843. In some embodiments, display engine 840 contains special purpose logic capable of operating independently of the 3D pipeline. In some embodiments, display controller 843 couples with a display device (not shown), which may be a system integrated display device, as in a laptop computer, or an external display device attached via a display device connector.

In some embodiments, the geometry pipeline 820 and media pipeline 830 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL), Open Computing Language (OpenCL), and/or Vulkan graphics and compute API, all from the Khronos Group. In some embodiments, support may also be provided for the Direct3D library from the Microsoft Corporation. In some embodiments, a combination of these libraries may be supported. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming

Figure 9A:
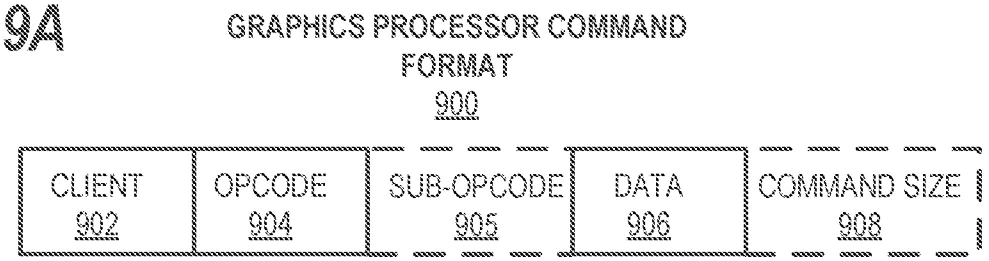
FIG. 9A is a block diagram illustrating a graphics processor command format that may be used to program graphics processing pipelines according to some embodiments.
Figure 9B:
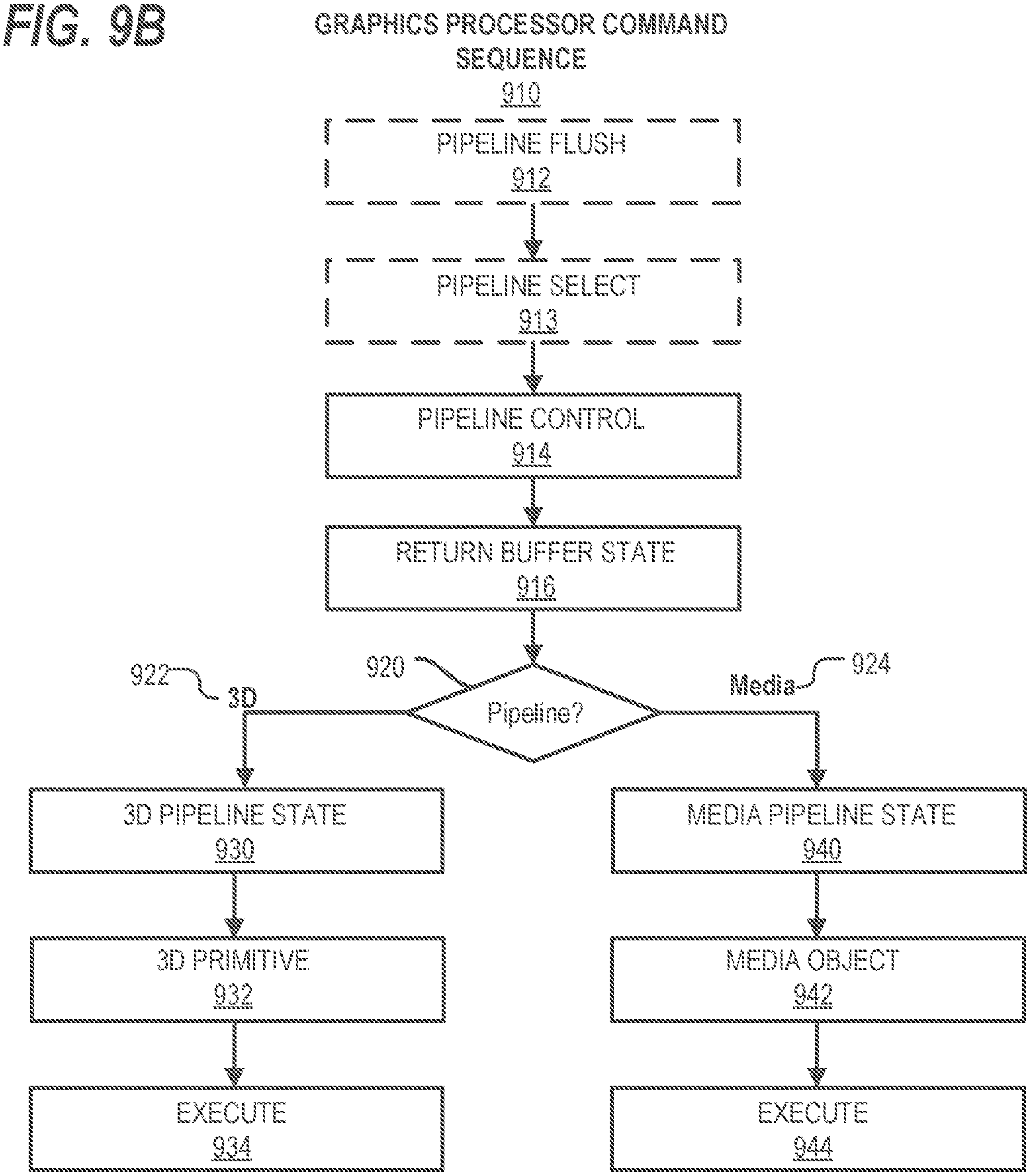
FIG. 9B is a block diagram illustrating a graphics processor command sequence according to an embodiment.

FIG. 9A is a block diagram illustrating a graphics processor command format 900 that may be used to program graphics processing pipelines according to some embodiments. FIG. 9B is a block diagram illustrating a graphics processor command sequence 910 according to an embodiment. The solid lined boxes in FIG. 9A illustrate the components that are generally included in a graphics command while the dashed lines include components that are optional or that are only included in a sub-set of the graphics commands. The exemplary graphics processor command format 900 of FIG. 9A includes data fields to identify a client 902, a command operation code (opcode) 904, and a data field 906 for the command. A sub-opcode 905 and a command size 908 are also included in some commands.

In some embodiments, client 902 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 904 and, if present, sub-opcode 905 to determine the operation to perform. The client unit performs the command using information in data field 906. For some commands an explicit command size 908 is expected to specify the size of the command. In some embodiments, the command parser automatically determines the size of at least some of the commands based on the command opcode. In some embodiments commands are aligned via multiples of a double word. Other command formats can be used.

The flow diagram in FIG. 9B illustrates an exemplary graphics processor command sequence 910. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 910 may begin with a pipeline flush command 912 to cause any active graphics pipeline to complete the currently pending commands for the pipeline. In some embodiments, the 3D pipeline 922 and the media pipeline 924 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 912 can be used for pipeline synchronization or before placing the graphics processor into a low power state.

In some embodiments, a pipeline select command 913 is used when a command sequence requires the graphics processor to explicitly switch between pipelines. In some embodiments, a pipeline select command 913 is required only once within an execution context before issuing pipeline commands unless the context is to issue commands for both pipelines. In some embodiments, a pipeline flush command 912 is required immediately before a pipeline switch via the pipeline select command 913.

In some embodiments, a pipeline control command 914 configures a graphics pipeline for operation and is used to program the 3D pipeline 922 and the media pipeline 924. In some embodiments, pipeline control command 914 configures the pipeline state for the active pipeline. In one embodiment, the pipeline control command 914 is used for pipeline synchronization and to clear data from one or more cache memories within the active pipeline before processing a batch of commands.

In some embodiments, commands related to the return buffer state 916 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, the return buffer state 916 includes selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930 or the media pipeline 924 beginning at the media pipeline state 940.

The commands to configure the 3D pipeline state 930 include 3D state setting commands for vertex buffer state, vertex element state, constant color state, depth buffer state, and other state variables that are to be configured before 3D primitive commands are processed. The values of these commands are determined at least in part based on the particular 3D API in use. In some embodiments, 3D pipeline state 930 commands are also able to selectively disable or bypass certain pipeline elements if those elements will not be used.

In some embodiments, 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. In some embodiments, 3D primitive 932 command is used to perform vertex operations on 3D primitives via vertex shaders. To process vertex shaders, 3D pipeline 922 dispatches shader programs to the graphics cores.

In some embodiments, 3D pipeline 922 is triggered via an execute 934 command or event. In some embodiments, a register write triggers command execution. In some embodiments execution is triggered via a 'go' or 'kick' command in the command sequence. In one embodiment, command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back-end operations may also be included for those operations.

In some embodiments, the graphics processor command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. In some embodiments, the media pipeline can also be bypassed and media decode can be performed in whole or in part using resources provided by one or more general-purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 924 is configured in a similar manner as the 3D pipeline 922. A set of commands to configure the media pipeline state 940 are dispatched or placed into a command queue before the media object commands 942. In some embodiments, commands for the media pipeline state 940 include data to configure the media pipeline elements that will be used to process the media objects. This includes data to configure the video decode and video encode logic within the media pipeline, such as encode or decode format. In some embodiments, commands for the media pipeline state 940 also support the use of one or more pointers to "indirect" state elements that contain a batch of state settings.

In some embodiments, media object commands 942 supply pointers to media objects for processing by the media pipeline. The media objects include memory buffers containing video data to be processed. In some embodiments, all media pipeline states must be valid before issuing a media object command 942. Once the pipeline state is configured and media object commands 942 are queued, the media pipeline 924 is triggered via an execute command 944 or an equivalent execute event (e.g., register write). Output from media pipeline 924 may then be post processed by operations provided by the 3D pipeline 922 or the media pipeline 924. In some embodiments, GPGPU operations are configured and executed in a similar manner as media operations.

Graphics Software Architecture

Figure 10:
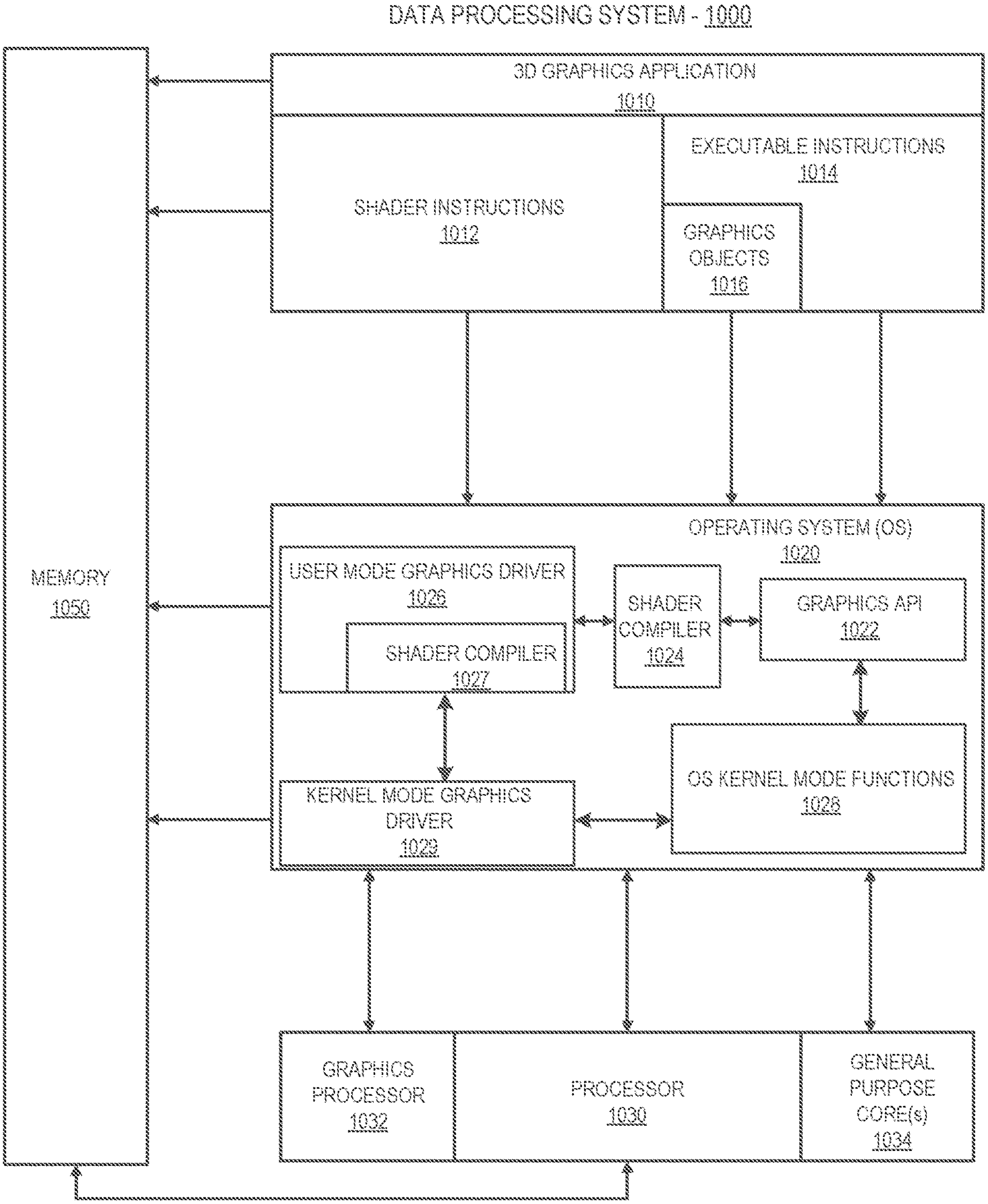
FIG. 10 illustrates an exemplary graphics software architecture for a data processing system according to some embodiments.

FIG. 10 illustrates an exemplary graphics software architecture for a data processing system 1000 according to some embodiments. In some embodiments, software architecture includes a 3D graphics application 1010, an operating system 1020, and at least one processor 1030. In some embodiments, processor 1030 includes a graphics processor 1032 and one or more general-purpose processor core(s) 1034. The graphics application 1010 and operating system 1020 each execute in the system memory 1050 of the data processing system.

In some embodiments, 3D graphics application 1010 contains one or more shader programs including shader instructions 1012. The shader language instructions may be in a high-level shader language, such as the High-Level Shader Language (HLSL) of Direct3D, the OpenGL Shader Language (GLSL), and so forth. The application also includes executable instructions 1014 in a machine language suitable for execution by the general-purpose processor core 1034. The application also includes graphics objects 1016 defined by vertex data.

In some embodiments, operating system 1020 is a Microsoft® Windows® operating system from the Microsoft Corporation, a proprietary UNIX-like operating system, or an open source UNIX-like operating system using a variant of the Linux kernel. The operating system 1020 can support a graphics API 1022 such as the Direct3D API, the OpenGL API, or the Vulkan API. When the Direct3D API is in use, the operating system 1020 uses a front-end shader compiler 1024 to compile any shader instructions 1012 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 1010. In some embodiments, the shader instructions 1012 are provided in an intermediate form, such as a version of the Standard Portable Intermediate Representation (SPIR) used by the Vulkan API.

In some embodiments, user mode graphics driver 1026 contains a back-end shader compiler 1027 to convert the shader instructions 1012 into a hardware specific representation. When the OpenGL API is in use, shader instructions 1012 in the GLSL high-level language are passed to a user mode graphics driver 1026 for compilation. In some embodiments, user mode graphics driver 1026 uses operating system kernel mode functions 1028 to communicate with a kernel mode graphics driver 1029. In some embodiments, kernel mode graphics driver 1029 communicates with graphics processor 1032 to dispatch commands and instructions.

IP Core Implementations

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 11A:
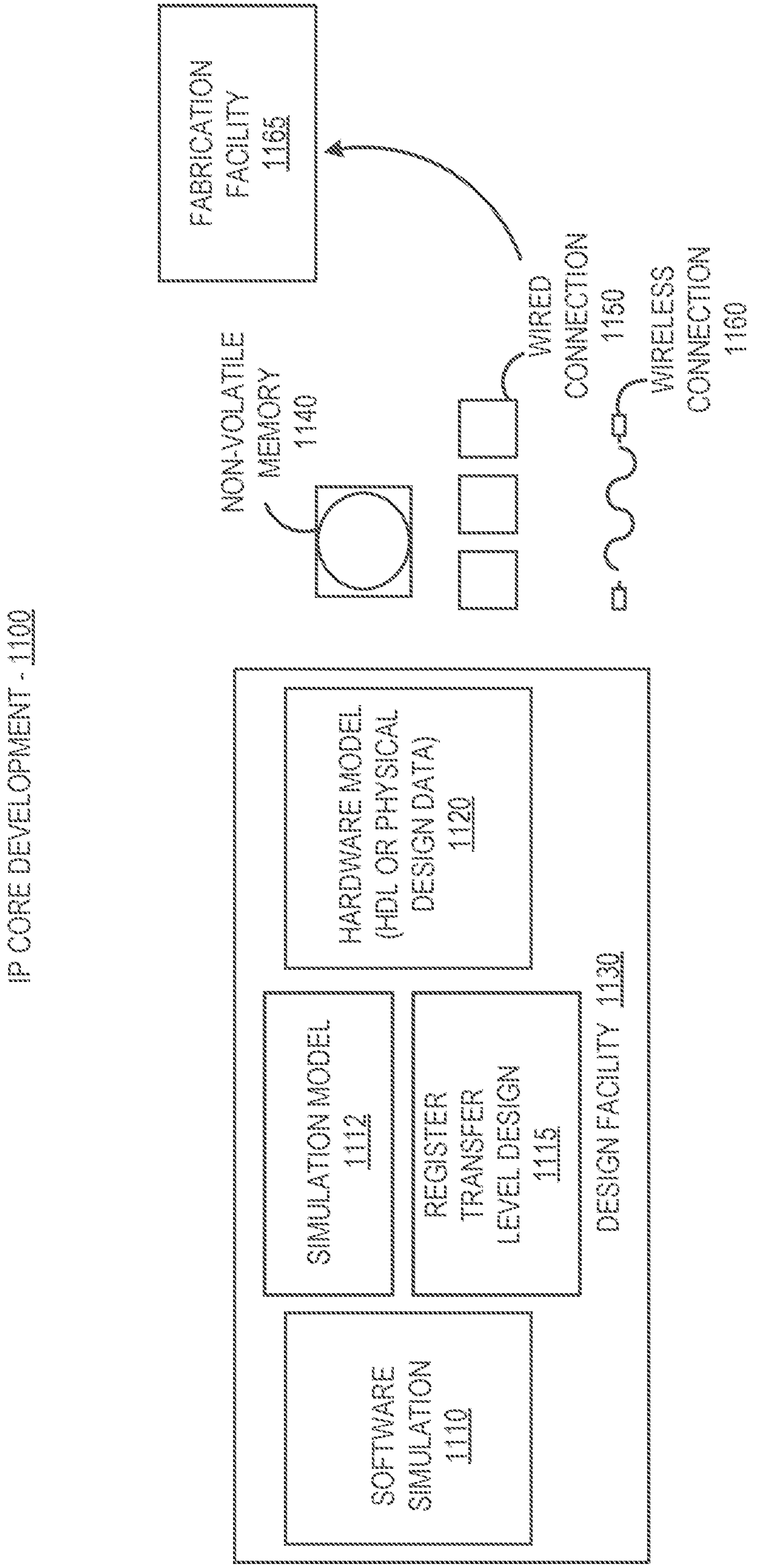
FIG. 11A is a block diagram illustrating an IP core development system that may be used to manufacture an integrated circuit to perform operations according to an embodiment.

FIG. 11A is a block diagram illustrating an IP core development system 1100 that may be used to manufacture an integrated circuit to perform operations according to an embodiment. The IP core development system 1100 may be used to generate modular, re-usable designs that can be incorporated into a larger design or used to construct an entire integrated circuit (e.g., an SOC integrated circuit). A design facility 1130 can generate a software simulation 1110 of an IP core design in a high-level programming language (e.g., C/C++). The software simulation 1110 can be used to design, test, and verify the behavior of the IP core using a simulation model 1112. The simulation model 1112 may include functional, behavioral, and/or timing simulations. A register transfer level (RTL) design 1115 can then be created or synthesized from the simulation model 1112. The RTL design 1115 is an abstraction of the behavior of the integrated circuit that models the flow of digital signals between hardware registers, including the associated logic performed using the modeled digital signals. In addition to an RTL design 1115, lower-level designs at the logic level or transistor level may also be created, designed, or synthesized. Thus, the particular details of the initial design and simulation may vary.

The RTL design 1115 or equivalent may be further synthesized by the design facility into a hardware model 1120, which may be in a hardware description language (HDL), or some other representation of physical design data. The HDL may be further simulated or tested to verify the IP core design. The IP core design can be stored for delivery to a 3rd party fabrication facility 1165 using non-volatile memory 1140 (e.g., hard disk, flash memory, or any non-volatile storage medium). Alternatively, the IP core design may be transmitted (e.g., via the Internet) over a wired connection 1150 or wireless connection 1160. The fabrication facility 1165 may then fabricate an integrated circuit that is based at least in part on the IP core design. The fabricated integrated circuit can be configured to perform operations in accordance with at least one embodiment described herein.

Figure 11B:
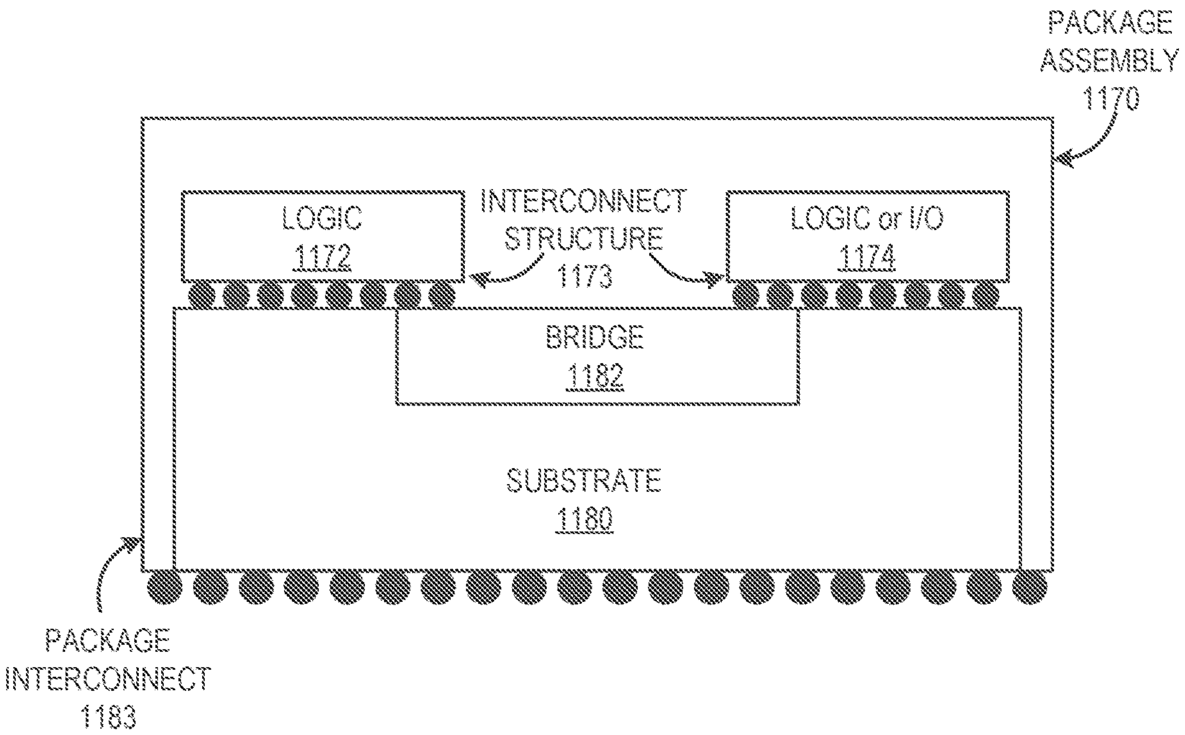
FIG. 11B illustrates a cross-section side view of an integrated circuit package assembly 1170, according to some embodiments described herein.
Figure 11C:
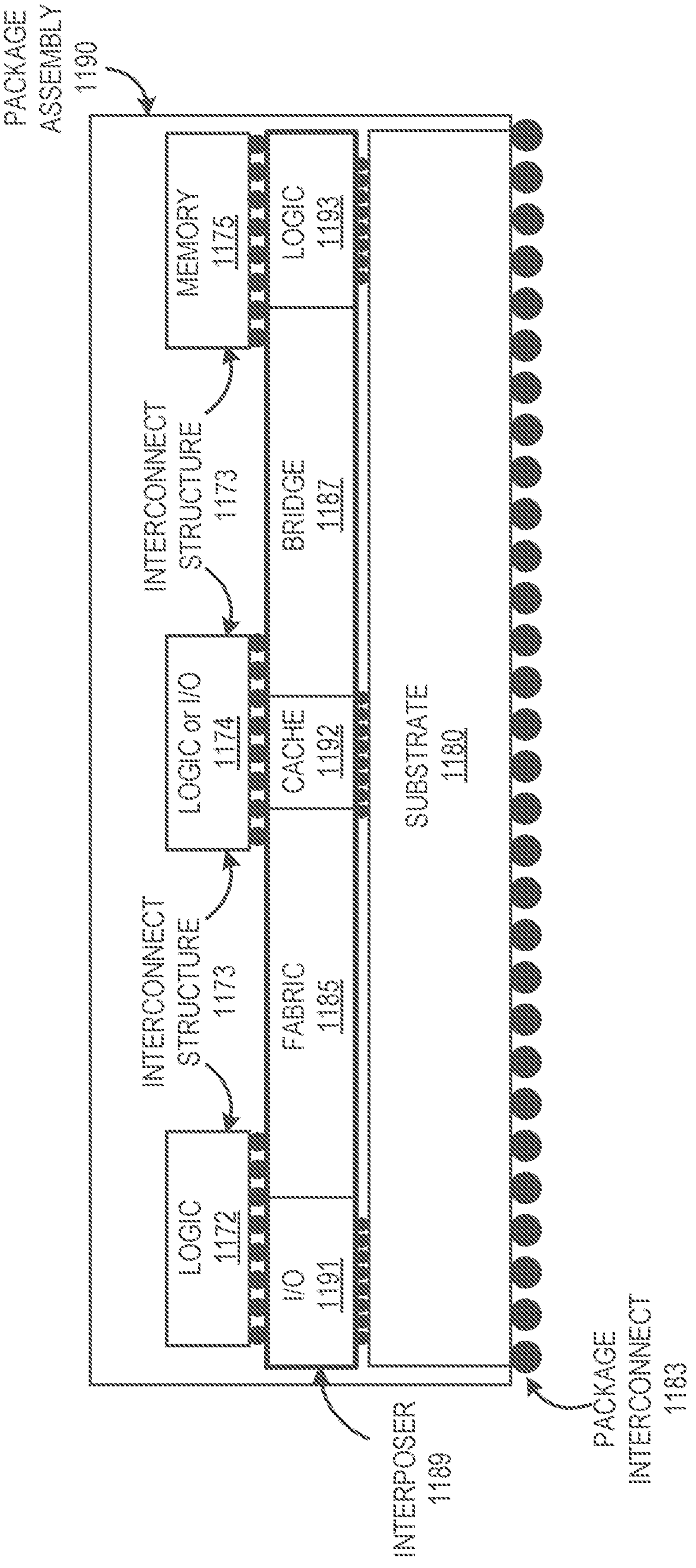
FIG. 11C illustrates a package assembly that includes multiple units of hardware logic chiplets connected to a substrate.

FIG. 11B illustrates a cross-section side view of an integrated circuit package assembly 1170, according to some embodiments described herein. The integrated circuit package assembly 1170 illustrates an implementation of one or more processor or accelerator devices as described herein. The package assembly 1170 includes multiple units of hardware logic 1172, 1174 connected to a substrate 1180. The logic 1172, 1174 may be implemented at least partly in configurable logic or fixed-functionality logic hardware, and can include one or more portions of any of the processor core(s), graphics processor(s), or other accelerator devices described herein. Each unit of logic 1172, 1174 can be implemented within a semiconductor die and coupled with the substrate 1180 via an interconnect structure 1173. The interconnect structure 1173 may be configured to route electrical signals between the logic 1172, 1174 and the substrate 1180, and can include interconnects such as, but not limited to bumps or pillars. In some embodiments, the interconnect structure 1173 may be configured to route electrical signals such as, for example, input/output (I/O) signals and/or power or ground signals associated with the operation of the logic 1172, 1174. In some embodiments, the substrate 1180 is an epoxy-based laminate substrate. The substrate 1180 may include other suitable types of substrates in other embodiments. The package assembly 1170 can be connected to other electrical devices via a package interconnect 1183. The package interconnect 1183 may be coupled to a surface of the substrate 1180 to route electrical signals to other electrical devices, such as a motherboard, other chipset, or multi-chip module.

In some embodiments, the units of logic 1172, 1174 are electrically coupled with a bridge 1182 that is configured to route electrical signals between the logic 1172, 1174. The bridge 1182 may be a dense interconnect structure that provides a route for electrical signals. The bridge 1182 may include a bridge substrate composed of glass or a suitable semiconductor material. Electrical routing features can be formed on the bridge substrate to provide a chip-to-chip connection between the logic 1172, 1174.

Although two units of logic 1172, 1174 and a bridge 1182 are illustrated, embodiments described herein may include more or fewer logic units on one or more dies. The one or more dies may be connected by zero or more bridges, as the bridge 1182 may be excluded when the logic is included on a single die. Alternatively, multiple dies or units of logic can be connected by one or more bridges. Additionally, multiple logic units, dies, and bridges can be connected together in other possible configurations, including three-dimensional configurations.

FIG. 11C illustrates a package assembly 1190 that includes multiple units of hardware logic chiplets connected to a substrate 1180. A graphics processing unit, parallel processor, and/or compute accelerator as described herein can be composed from diverse silicon chiplets that are separately manufactured. A diverse set of chiplets with different IP core logic can be assembled into a single device. Additionally, the chiplets can be integrated into a base die or base chiplet using active interposer technology. The concepts described herein enable the interconnection and communication between the different forms of IP within the GPU. IP cores can be manufactured using different process technologies and composed during manufacturing, which avoids the complexity of converging multiple IPs, especially on a large SoC with several flavors IPs, to the same manufacturing process. Enabling the use of multiple process technologies improves the time to market and provides a cost-effective way to create multiple product SKUs. Additionally, the disaggregated IPs are more amenable to being power gated independently, components that are not in use on a given workload can be powered off, reducing overall power consumption.

In various embodiments a package assembly 1190 can include components and chiplets that are interconnected by a fabric 1185 and/or one or more bridges 1187. The chiplets within the package assembly 1190 may have a 2.5D arrangement using Chip-on-Wafer-on-Substrate stacking in which multiple dies are stacked side-by-side on a silicon interposer 1189 that couples the chiplets with the substrate 1180. The substrate 1180 includes electrical connections to the package interconnect 1183. In one embodiment the silicon interposer 1189 is a passive interposer that includes through-silicon vias (TSVs) to electrically couple chiplets within the package assembly 1190 to the substrate 1180. In one embodiment, silicon interposer 1189 is an active interposer that includes embedded logic in addition to TSVs. In such embodiment, the chiplets within the package assembly 1190 are arranged using 3D face to face die stacking on top of the active interposer 1189. The active interposer 1189 can include hardware logic for I/O 1191, cache memory 1192, and other hardware logic 1193, in addition to interconnect fabric 1185 and a silicon bridge 1187. The fabric 1185 enables communication between the various logic chiplets 1172, 1174 and the logic 1191, 1193 within the active interposer 1189. The fabric 1185 may be an NoC interconnect or another form of packet switched fabric that switches data packets between components of the package assembly. For complex assemblies, the fabric 1185 may be a dedicated chiplet enables communication between the various hardware logic of the package assembly 1190.

Bridge structures 1187 within the active interposer 1189 may be used to facilitate a point-to-point interconnect between, for example, logic or I/O chiplets 1174 and memory chiplets 1175. In some implementations, bridge structures 1187 may also be embedded within the substrate 1180. The hardware logic chiplets can include special purpose hardware logic chiplets 1172, logic or I/O chiplets 1174, and/or memory chiplets 1175. The hardware logic chiplets 1172 and logic or I/O chiplets 1174 may be implemented at least partly in configurable logic or fixed-functionality logic hardware and can include one or more portions of any of the processor core(s), graphics processor(s), parallel processors, or other accelerator devices described herein. The memory chiplets 1175 can be DRAM (e.g., GDDR, HBM) memory or cache (SRAM) memory. Cache memory 1192 within the active interposer 1189 (or substrate 1180) can act as a global cache for the package assembly 1190, part of a distributed global cache, or as a dedicated cache for the fabric 1185.

Each chiplet can be fabricated as separate semiconductor die and coupled with a base die that is embedded within or coupled with the substrate 1180. The coupling with the substrate 1180 can be performed via an interconnect structure 1173. The interconnect structure 1173 may be configured to route electrical signals between the various chiplets and logic within the substrate 1180. The interconnect structure 1173 can include interconnects such as, but not limited to bumps or pillars. In some embodiments, the interconnect structure 1173 may be configured to route electrical signals such as, for example, input/output (I/O) signals and/or power or ground signals associated with the operation of the logic, I/O, and memory chiplets. In one embodiment, an additional interconnect structure couples the active interposer 1189 with the substrate 1180.

In some embodiments, the substrate 1180 is an epoxy-based laminate substrate. The substrate 1180 may include other suitable types of substrates in other embodiments. The package assembly 1190 can be connected to other electrical devices via a package interconnect 1183. The package interconnect 1183 may be coupled to a surface of the substrate 1180 to route electrical signals to other electrical devices, such as a motherboard, other chipset, or multi-chip module.

In some embodiments, a logic or I/O chiplet 1174 and a memory chiplet 1175 can be electrically coupled via a bridge 1187 that is configured to route electrical signals between the logic or I/O chiplet 1174 and a memory chiplet 1175. The bridge 1187 may be a dense interconnect structure that provides a route for electrical signals. The bridge 1187 may include a bridge substrate composed of glass or a suitable semiconductor material. Electrical routing features can be formed on the bridge substrate to provide a chip-to-chip connection between the logic or I/O chiplet 1174 and a memory chiplet 1175. The bridge 1187 may also be referred to as a silicon bridge or an interconnect bridge. For example, the bridge 1187, in some embodiments, is an Embedded Multi-die Interconnect Bridge (EMIB). In some embodiments, the bridge 1187 may simply be a direct connection from one chiplet to another chiplet.

Figure 11D:
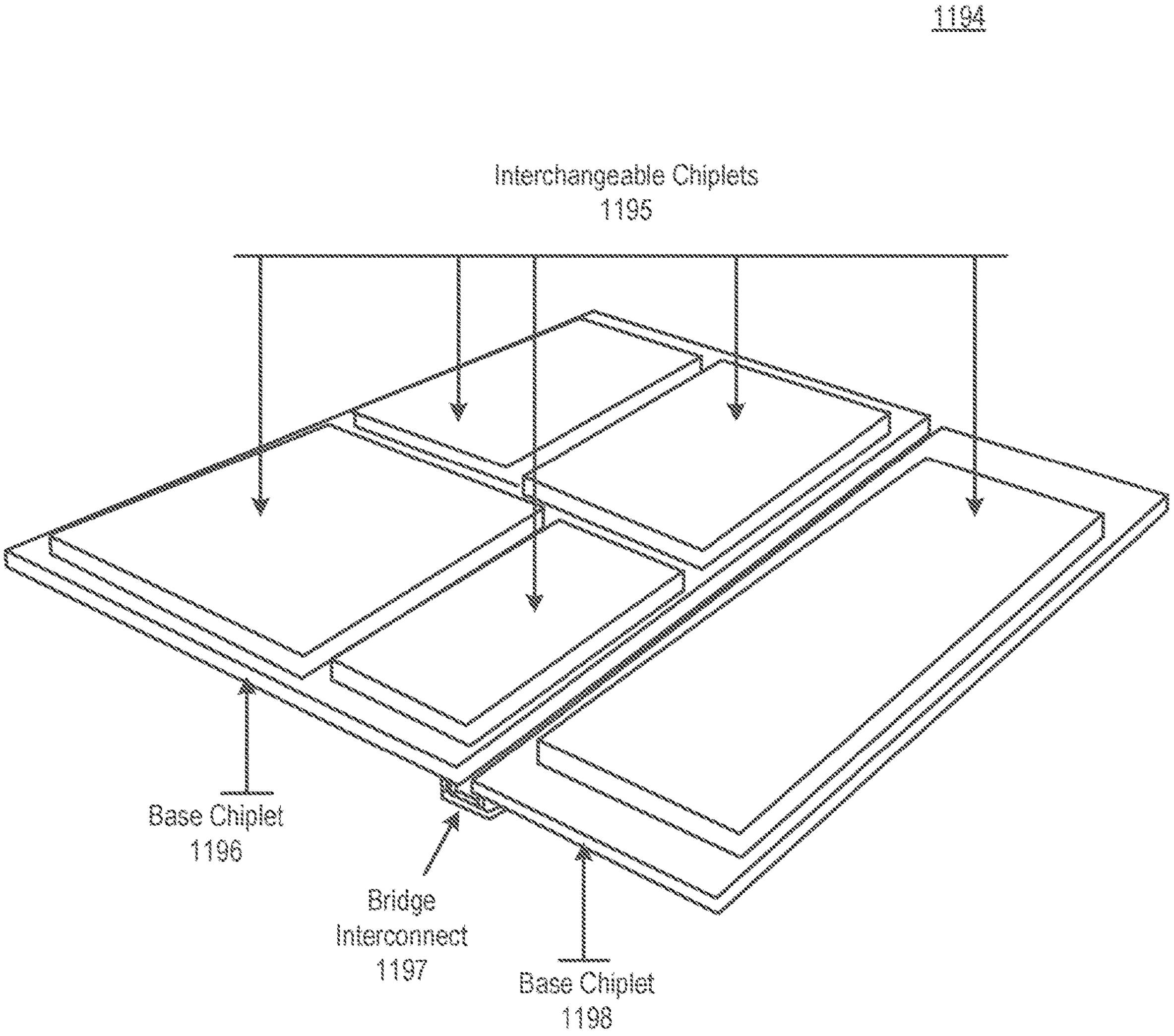
FIG. 11D illustrates a package assembly including interchangeable chiplets, according to an embodiment.

FIG. 11D illustrates a package assembly 1194 including interchangeable chiplets 1195, according to an embodiment. The interchangeable chiplets 1195 can be assembled into standardized slots on one or more base chiplets 1196, 1198. The base chiplets 1196, 1198 can be coupled via a bridge interconnect 1197, which can be similar to the other bridge interconnects described herein and may be, for example, an EMIB. Memory chiplets can also be connected to logic or I/O chiplets via a bridge interconnect. I/O and logic chiplets can communicate via an interconnect fabric. The base chiplets can each support one or more slots in a standardized format for one of logic or I/O or memory/cache.

In one embodiment, SRAM and power delivery circuits can be fabricated into one or more of the base chiplets 1196, 1198, which can be fabricated using a different process technology relative to the interchangeable chiplets 1195 that are stacked on top of the base chiplets. For example, the base chiplets 1196, 1198 can be fabricated using a larger process technology, while the interchangeable chiplets can be manufactured using a smaller process technology. One or more of the interchangeable chiplets 1195 may be memory (e.g., DRAM) chiplets. Different memory densities can be selected for the package assembly 1194 based on the power, and/or performance targeted for the product that uses the package assembly 1194. Additionally, logic chiplets with a different number of type of functional units can be selected at time of assembly based on the power, and/or performance targeted for the product. Additionally, chiplets containing IP logic cores of differing types can be inserted into the interchangeable chiplet slots, enabling hybrid processor designs that can mix and match different technology IP blocks.

Exemplary System on a Chip Integrated Circuit

Figure 12:
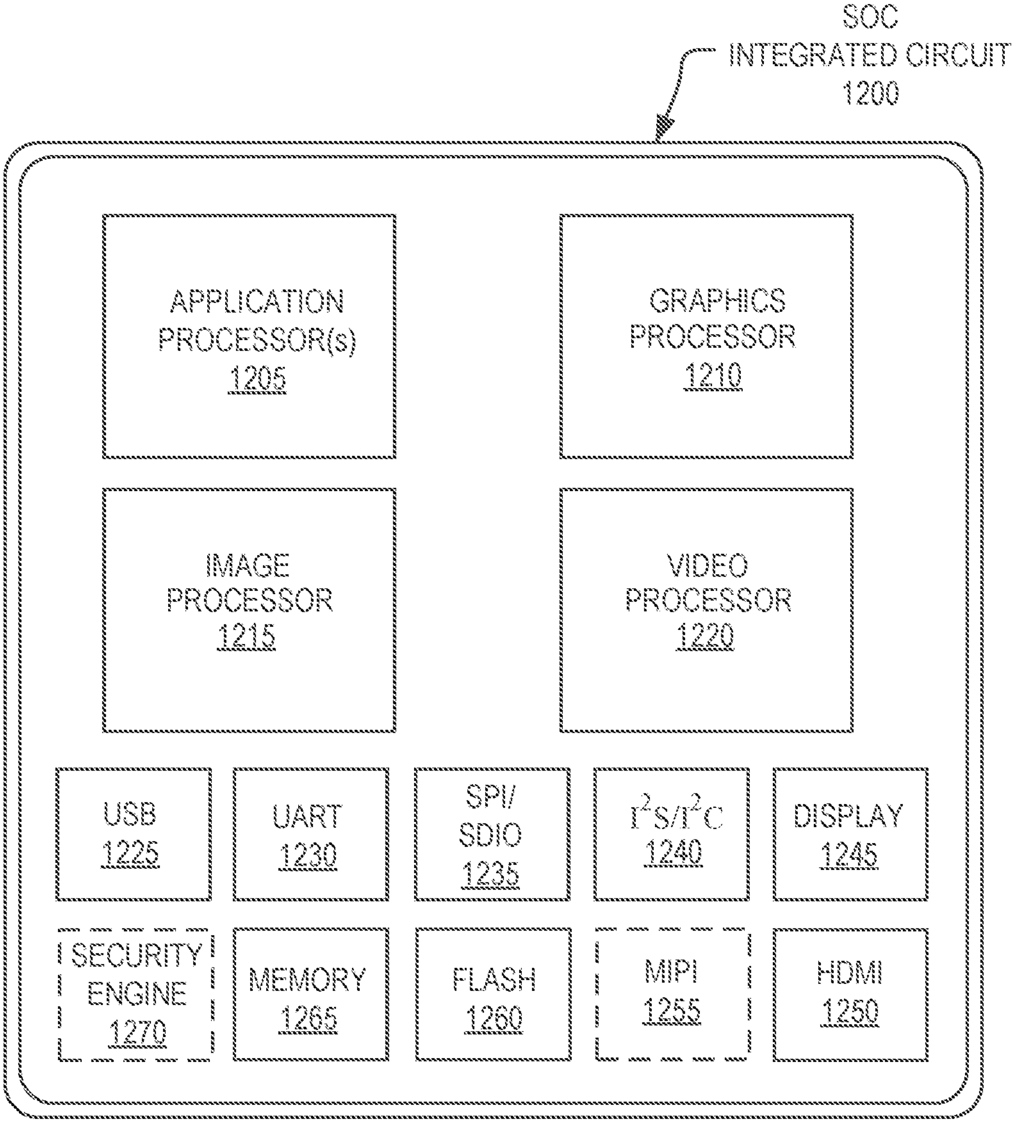
FIG. 12 is a block diagram illustrating an exemplary system on a chip integrated circuit that may be fabricated using one or more IP cores, according to an embodiment.
Figure 13A:
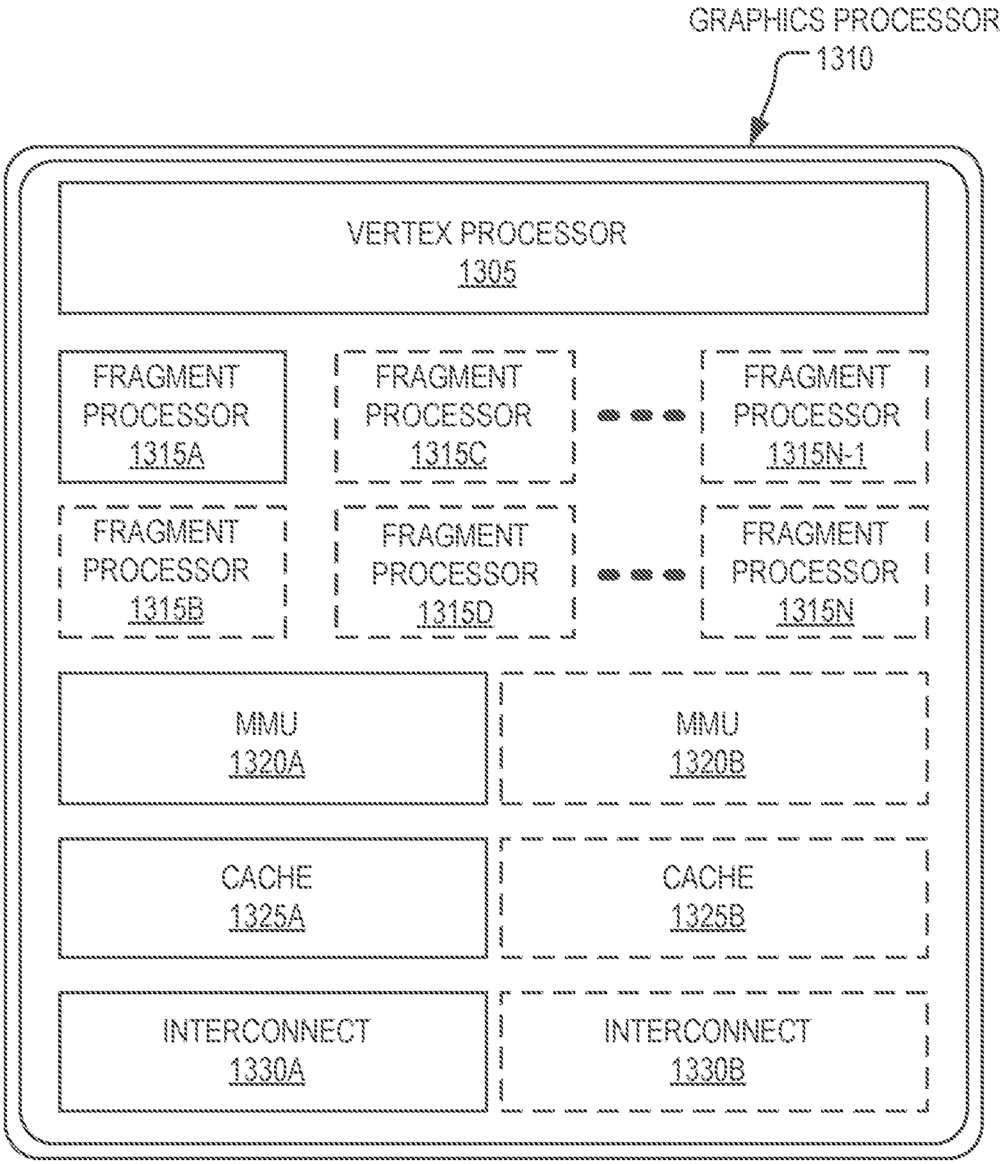
FIG. 13A illustrates an exemplary graphics processor of a system on a chip integrated circuit that may be fabricated using one or more IP cores, according to an embodiment.
Figure 13B:
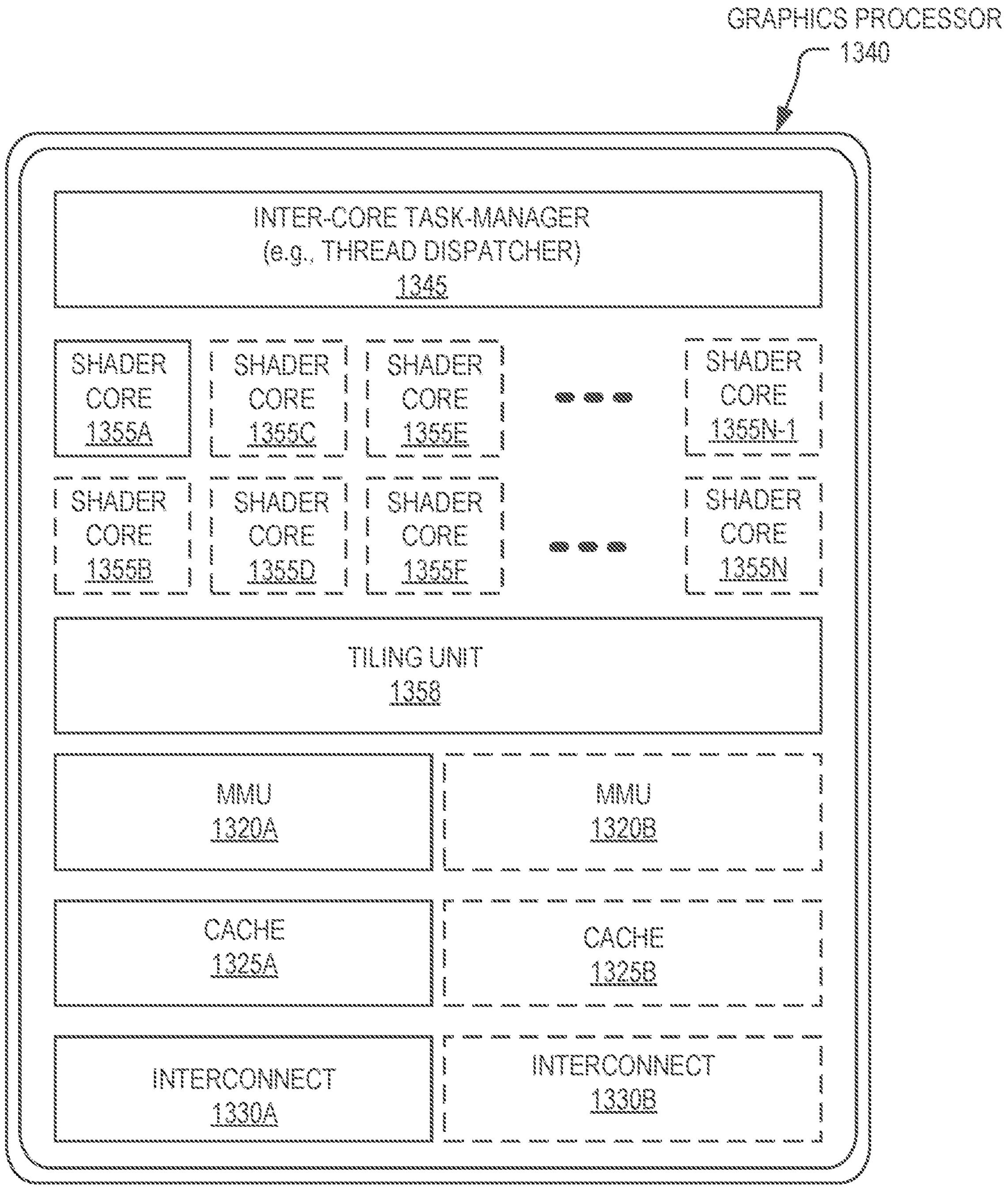
FIG. 13B illustrates an additional exemplary graphics processor 1340 of a system on a chip integrated circuit that may be fabricated using one or more IP cores, according to an embodiment.

FIGS. 12-13B illustrate exemplary integrated circuits and associated graphics processors that may be fabricated using one or more IP cores, according to various embodiments described herein. In addition to what is illustrated, other logic and circuits may be included, including additional graphics processors/cores, peripheral interface controllers, or general-purpose processor cores.

FIG. 12 is a block diagram illustrating an exemplary system on a chip integrated circuit 1200 that may be fabricated using one or more IP cores, according to an embodiment. Exemplary integrated circuit 1200 includes one or more application processor(s) 1205 (e.g., CPUs), at least one graphics processor 1210, and may additionally include an image processor 1215 and/or a video processor 1220, any of which may be a modular IP core from the same or multiple different design facilities. Integrated circuit 1200 includes peripheral or bus logic including a USB controller 1225, UART controller 1230, an SPI/SDIO controller 1235, and an I2S/I2C controller 1240. Additionally, the integrated circuit can include a display device 1245 coupled to one or more of a high-definition multimedia interface (HDMI) controller 1250 and a mobile industry processor interface (MIPI) display interface 1255. Storage may be provided by a flash memory subsystem 1260 including flash memory and a flash memory controller. Memory interface may be provided via a memory controller 1265 for access to SDRAM or SRAM memory devices. Some integrated circuits additionally include an embedded security engine 1270.

FIGS. 13A-13B are block diagrams illustrating exemplary graphics processors for use within an SoC, according to embodiments described herein. FIG. 13A illustrates an exemplary graphics processor 1310 of a system on a chip integrated circuit that may be fabricated using one or more IP cores, according to an embodiment. FIG. 13B illustrates an additional exemplary graphics processor 1340 of a system on a chip integrated circuit that may be fabricated using one or more IP cores, according to an embodiment. Graphics processor 1310 of FIG. 13A is an example of a low power graphics processor core. Graphics processor 1340 of FIG. 13B is an example of a higher performance graphics processor core. Each of graphics processor 1310 and graphics processor 1340 can be variants of the graphics processor 1210 of FIG. 12.

As shown in FIG. 13A, graphics processor 1310 includes a vertex processor 1305 and one or more fragment processor(s) 1315A-1315N (e.g., 1315A, 1315B, 1315C, 1315D, through 1315N-1, and 1315N). Graphics processor 1310 can execute different shader programs via separate logic, such that the vertex processor 1305 is optimized to execute operations for vertex shader programs, while the one or more fragment processor(s) 1315A-1315N execute fragment (e.g., pixel) shading operations for fragment or pixel shader programs. The vertex processor 1305 performs the vertex processing stage of the 3D graphics pipeline and generates primitives and vertex data. The fragment processor(s) 1315A-1315N use the primitive and vertex data generated by the vertex processor 1305 to produce a framebuffer that is displayed on a display device. In one embodiment, the fragment processor(s) 1315A-1315N are optimized to execute fragment shader programs as provided for in the OpenGL API, which may be used to perform similar operations as a pixel shader program as provided for in the Direct 3D API.

Graphics processor 1310 additionally includes one or more memory management units (MMUs) 1320A-1320B, cache(s) 1325A-1325B, and circuit interconnect(s) 1330A-1330B. The one or more MMU(s) 1320A-1320B provide for virtual to physical address mapping for the graphics processor 1310, including for the vertex processor 1305 and/or fragment processor(s) 1315A-1315N, which may reference vertex or image/texture data stored in memory, in addition to vertex or image/texture data stored in the one or more cache(s) 1325A-1325B. In one embodiment the one or more MMU(s) 1320A-1320B may be synchronized with other MMUs within the system, including one or more MMUs associated with the one or more application processor(s) 1205, image processor 1215, and/or video processor 1220 of FIG. 12, such that each processor 1205-1220 can participate in a shared or unified virtual memory system. The one or more circuit interconnect(s) 1330A-1330B enable graphics processor 1310 to interface with other IP cores within the SoC, either via an internal bus of the SoC or via a direct connection, according to embodiments.

As shown FIG. 13B, graphics processor 1340 includes the one or more MMU(s) 1320A-1320B, cache(s) 1325A-1325B, and circuit interconnect(s) 1330A-1330B of the graphics processor 1310 of FIG. 13A. Graphics processor 1340 includes one or more shader core(s) 1355A-1355N (e.g., 1355A, 1355B, 1355C, 1355D, 1355E, 1355F, through 1355N-1, and 1355N), which provides for a unified shader core architecture in which a single core or type or core can execute all types of programmable shader code, including shader program code to implement vertex shaders, fragment shaders, and/or compute shaders. The unified shader core architecture is also configurable to execute direct compiled high-level GPGPU programs (e.g., CUDA). The exact number of shader cores present can vary among embodiments and implementations. Additionally, graphics processor 1340 includes an inter-core task manager 1345, which acts as a thread dispatcher to dispatch execution threads to one or more shader cores 1355A-1355N and a tiling unit 1358 to accelerate tiling operations for tile-based rendering, in which rendering operations for a scene are subdivided in image space, for example to exploit local spatial coherence within a scene or to optimize use of internal caches.

Figure 14:
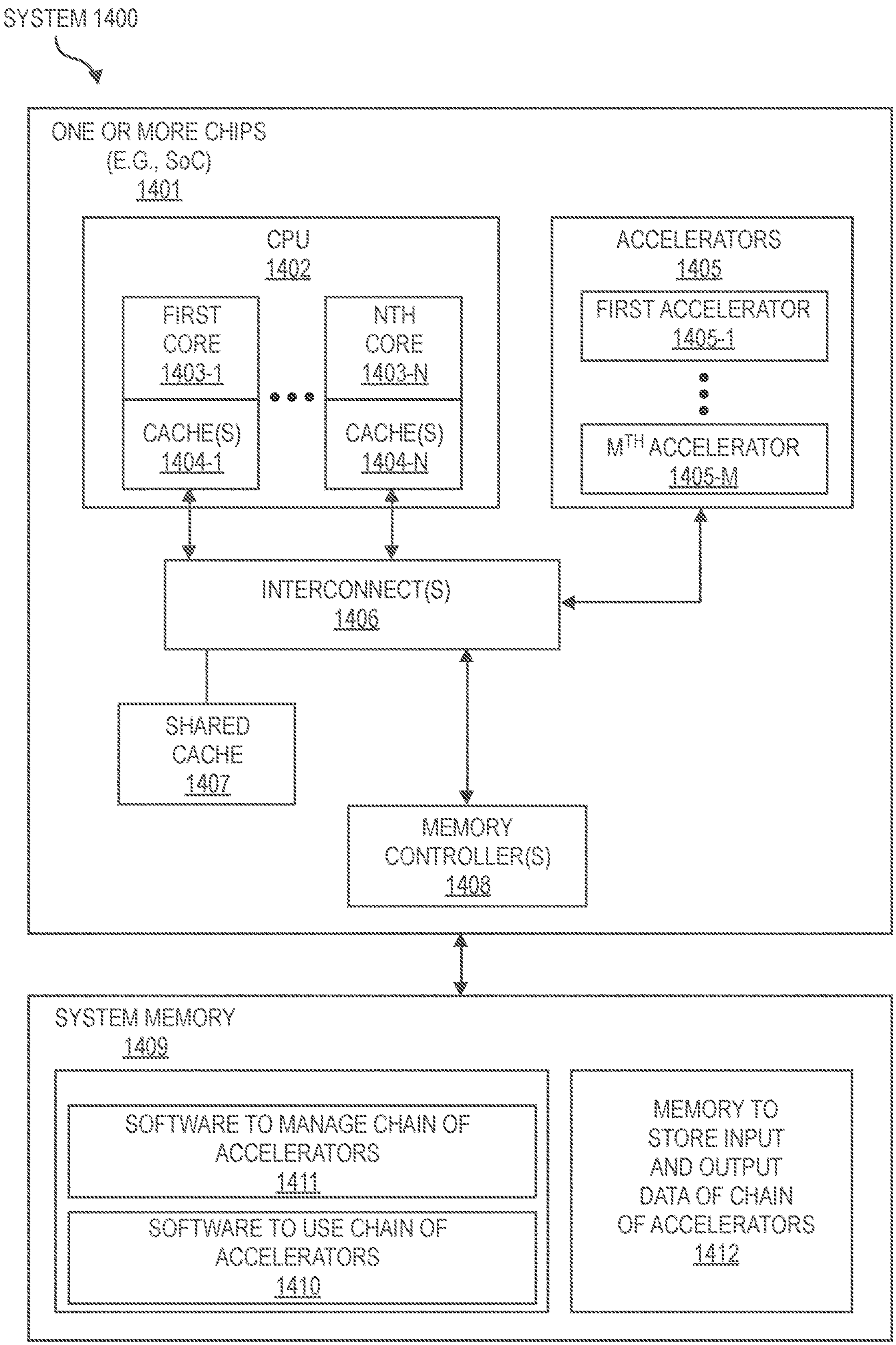
FIG. 14 is a block diagram of an embodiment of a system in which a chain of two or more accelerators and/or a chained accelerator operation as described elsewhere herein may be implemented.

FIG. 14 is a block diagram of an embodiment of a system 1400 in which a chain of two or more accelerators and/or a chained accelerator operation as described elsewhere herein may be implemented. The system may represent a computer system or other electronic device. Examples of suitable computer systems include, but are not limited to, servers, supercomputers, workstations, desktop computers, laptop computers, notebook computers, smartphones, network devices, and the like.

The system includes one or more chips 1401 (e.g., semiconductor devices) and a system memory 1409. In one example, the one or more chips are a single chip (e.g., a single system-on-chip (SoC)). In another example, the one or more chips are a plurality of chips (e.g., a plurality of SoC) coupled together (e.g., in a multi-chip package or coupled to a circuit board).

The one or more chips include a central processing unit (CPU) 1402. The CPU includes a first core 1403-1 through an Nth-core 1404-N, where the number of cores (N) may be range from 2 to about 256, or even more. Each core may have a set of one or more corresponding caches 1404-1, 1404-N at one or more levels (e.g., a level 1 (L1) data cache, an L1 instruction cache, a unified level 2 (L2) cache, optionally a level 4 (L3) cache). The cache levels may differ in their relative closeness to the cores. Since the caches are closer to the cores than the system memory data can be accessed from the caches faster, and with less power, than from the system memory.

The one or more chips also include a set of two or more accelerators 1405, including a first accelerator 1405-1 through an Mth-accelerator 1405-M, where the number of accelerators (M) may range from 2 to 20, or even more. As used herein, accelerators broadly represent hardware devices, circuitry, or SoC-components that may be used to perform one or more functions, workloads, or operations. The accelerators are generally able to perform the functions, workloads, or operations better in at least some way (e.g., with higher performance and/or greater energy efficiency) than the CPU. As will be described further below, two or more of the accelerators (e.g., the whole accelerators or physical or virtual accelerator resources thereof) may be chained together to form a chain of accelerators and/or may be used to perform a chained accelerator operation (e.g., a Directed Acyclic Graph (DAG)) In some embodiments, each of the accelerators is implemented in hardware (e.g., circuitry) potentially combined with some firmware and/or software.

A wide variety of different types of accelerators are suitable for the embodiments disclosed herein. Accelerators can generally be designed to perform almost any function, workload, or operation that can be calculated in software running on a general-purpose CPU. Specific examples of suitable accelerators for the embodiments disclosed herein include, but are not limited to, graphics processing units (GPUs) or other graphics accelerators (e.g., to accelerate processing of graphics data and/or general-purpose graphics processing), digital signal processors (DSPs) (e.g., to accelerate processing of digital signals), vision processing units (VPUs) and/or image processing units (IPUs) (e.g., to accelerate image and/or video processing), a matrix accelerator or tensor processing units (e.g., to accelerate matrix (e.g., tile) operations and/or machine learning), artificial intelligence (AI) accelerators (e.g., to accelerate artificial intelligence and/or machine learning), data analytics accelerators (e.g., to accelerate data analysis, artificial intelligence, and/or machine learning), cryptographic accelerators (e.g., to accelerate encryption, decryption, hashing, or other cryptographic operations), data compression/decompression accelerators (e.g., to accelerate compression and/or decompression), storage accelerators (e.g., to accelerate data storage processing), network processors (e.g., to accelerate network protocol processing), physics processing unit (e.g., to accelerate physics simulations), web accelerators (e.g., to accelerate Internet operations), other types of accelerators implemented as Field Programmable Gate Arrays (FPGAs) configured as an accelerator to perform a particular function, workload, or operation, other types of accelerators implemented as Application Specific Integrated Circuits (ASICs) configured as an accelerator to perform a particular function, workload, or operation, or other fixed-function devices or specialized hardware, and various combinations thereof. Any two, three, four, or more of such accelerators may be included in a chain of accelerators.

Referring again to FIG. 14, the one or more chips also include a shared cache 1407 (e.g., an L3 cache, a level 4 (L4) cache, a lowest-level cache), one or more memory controllers 1408, and one or more interconnects 1406 (e.g., one or more mesh or fabric). The one or more interconnects may couple the CPU, the accelerators, the shared cache, and the memory controllers with one another and with the system memory 1409 to allow them to communicate and interact with one another (e.g., the CPU may send commands to the accelerators, the accelerators may access the shared cache and the system memory).

The system memory 1409 may be used to store software and data for the system. The software may include first software 1410 to use chains of accelerators and/or chained accelerator operations (e.g., perform a Directed Acyclic Graph (DAG)). The first software may be and/or may be included within a wide variety of different types of software that can benefit from using accelerators (e.g., user-level applications, graphics processing, machine-learning applications, big data analytics, data intensive workloads, data mining, supercomputing, etc.). The system memory may also store second software 1411 to manage (e.g., allocate, configure, chain together, virtualize accelerators, dynamically reallocate, unchain) chains of accelerators. The second software to manage the chains of accelerators may be and/or may be included within (e.g., as one or more modules or software components) privileged system software, such as, for example, an operating system (OS), a virtual machine manager (VMM) or hypervisor, a guest operating system (guest OS) running under a VMM or hypervisor, a host VMM or host hypervisor, a guest VMM or guest hypervisor, a guests guest OS, runtime software, a driver, or the like. In some embodiments, as will be discussed further below, the privileged system software may be virtualization-capable privileged system software (e.g., a VMM or hypervisor) capable of virtualizing one or more accelerators for use in a chain of accelerators. The system memory may also optionally include memory space 1412 to store data (e.g., input data and/or output data) for the chains of accelerators.

Figure 15:
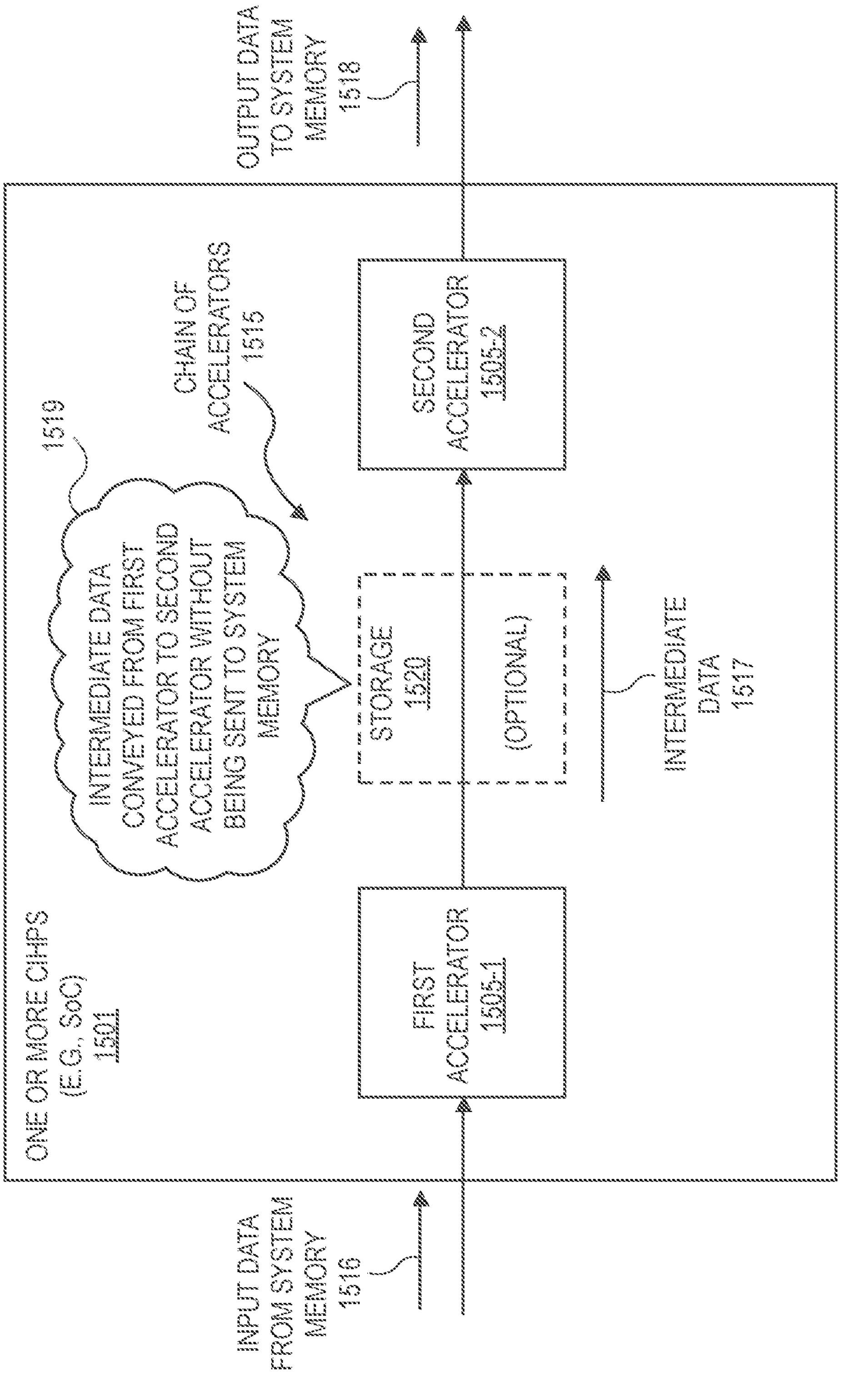
FIG. 15 is a block diagram of an embodiment of a chain of accelerators.

FIG. 15 is a block diagram of an embodiment of a chain of accelerators 1515. The chain of accelerators is included on one or more chips 1501 (e.g., one or more SoC), as previously described. The one or more chips may be deployed in systems, such as the system 1400, or other systems disclosed herein.

In this example, the chain of accelerators is a simple chain of accelerators that includes a first accelerator 1505-1 and a second accelerator 1505-2, although in other embodiments there may be three, four, five, or more accelerators. In some embodiments, the first and second accelerators are different types of accelerators. As used herein, the term "chain of accelerators" broadly means two or more accelerators that are chained, linked, joined, connected, configured, or otherwise coupled to work together (e.g., to perform a chained accelerator operation). The term "chain of accelerators" may optionally include one or more buffers, scratchpads, or other storage chained, linked, joined, connected, configured, or otherwise coupled between two or more of the accelerators in the chain of accelerators. The chain of accelerators may be coupled as a series, cascade, or pipeline of accelerators where at least one port, interface, or other output (e.g., to output or provide at least one output data) of at least one preceding and/or producing accelerator in the chain is coupled or otherwise in communication with at least one port, interface, or other input (e.g., to input or provide at least one input data) of at least one subsequent and/or consuming accelerator in the chain. In some embodiments, the chain of accelerators may also optionally include part of a CPU (e.g., a core, a hardware thread) as part of the chain. As one example, the part of the CPU may be used to perform general-purpose processing that is more suited for the CPU than an accelerator. As another example, the part of the CPU may perform a function or operation of an accelerator that is either not included in the SoC or is unavailable for the chained accelerator operation.

In the illustrated example, the first accelerator 1505-1 is the initial/preceding/producing accelerator in the chain of accelerators. The first accelerator may have support for a chained accelerator operation. For example, the first accelerator may have firmware, microcode, circuitry, other logic, or a combination thereof, to recognize an instruction for the chained accelerator operation, and to perform operations of the chained accelerator operation and/or operations corresponding to the instruction). The first accelerator may be controlled as part of the chained accelerator operation and/or by the instruction to receive input data 1516 from system memory (e.g., from one or more source memory locations), process the input data to produce intermediate data 1517, and output the intermediate data via an output (e.g., one or more ports) of the first accelerator.

The second accelerator may also have support for the chained accelerator operation (e.g., have firmware, microcode, circuitry, other logic, or a combination thereof, to recognize an instruction for the chained accelerator operation, and to perform operations of the chained accelerator operation and/or operations corresponding to the instruction). The second accelerator may be controlled as part of the chained accelerator operation to receive the intermediate data 1517 via an input (e.g., one or more ports) of the second accelerator, process the intermediate data to produce an output data 1518, and output or store the output data to the system memory (e.g., to one or more destination memory locations) via an output (e.g., one or more ports) of the second accelerator. Without limitation, the output data may either represent partial results or intermediate data for further processing or final data.

The chain of accelerators 1515 may be useful in many cases where a workload or processing can be performed by using functions, workloads, operations, or capabilities of two or more accelerators cooperating or working together. As one illustrative example, compressed matrix data in system memory may be received and decompressed by a data decompression accelerator, and then the decompressed matrix data may be processed by a tensor processing unit. Without limitation, using accelerators for such processing may be better in at least some way (e.g., higher performance and/or greater energy efficiency) than if the processing was done by the CPU and/or it may free the CPU for other processing. As another example, three, four, or more accelerators may be formed into chains ranging from relatively simple chains to complex chains of accelerators to implement a wide variety of different types of Directed Acyclic Graphs (DAGs). The DAG may include accelerators connected to receive one or more inputs (e.g., from one or more other accelerators) and provide one or more outputs (e.g., to one or more other accelerators) in a way that there are no loops or cycles backward and data flow is only forward in the same direction. The DAG may be a one-dimensional (1D) DAG, a two-dimensional (2D) DAG, or a higher-dimensional DAG.

Referring again to FIG. 15, in some embodiments, the chain of accelerators may include a buffer, scratchpad, or other storage 1520. The storage is optional (as designated by the dashed lines). The storage is chained, linked, joined, connected, configured, or otherwise coupled between the first and second accelerators. For example, an output (e.g., a port) of the first accelerator may be coupled to provide the intermediate data to the storage, and an input (e.g., a port) of the second accelerator may be coupled to receive the intermediate data from the storage. The storage may be used to store the intermediate data temporarily until it is consumed by the second accelerator. Advantageously, such use of the storage may help to buffer, smooth out, or account for a difference in the rate of production burstiness of the intermediate data by the first accelerator and the rate of consumption burstiness of the intermediate data by the second accelerator. Alternatively, in another embodiment, the storage may optionally be omitted, and the intermediate data may be provided directly from the first accelerator to the second accelerator. For example, this may be appropriate if the rates of production and consumption of the intermediate data are sufficiently matched or otherwise compatible (e.g., the first and second accelerators may be specifically designed to have matching or compatible bandwidths and the burstiness is sufficiently low) that there is no need for the storage to buffer or store the intermediate data. This may also be appropriate if the rate of consumption is sufficiently higher than the rate of production so that it can always consume whatever intermediate data is produced.

As shown by callout 1519, whether the storage is included or not, the intermediate data may be transmitted, conveyed, or otherwise provided from the first accelerator to the second accelerator without the intermediate data being intermittently sent to system memory. Another possible approach would be to transmit the intermediate data from the first accelerator to system memory, and then bring it back from the system memory to the second accelerator. However, such an approach may tend to increase latency, increase the amount of data flow on interconnects, increased power consumption, and the like. Instead, as shown in the illustration, only the input data 1516 and the output data 1518 are exchanged with the system memory, while the intermediate data 1517 is not exchanged with the system memory, but instead may be kept on the one or more chips more local, proximate, or close to one or more of the first and second accelerators than system memory. In some embodiments, the storage 1520 may be more local, proximate, or close to at least one or both of the first and second accelerators than system memory. Without limitation, this may tend to help to improve performance, reduce power consumption, reduce data traffic on interconnects.

In some embodiments, intermediate data may be exchanged or communicated between the accelerators of the chain of accelerators without software needing to manage the flow of the intermediate data, other than the software potentially initially setting up or configuring the chain of accelerators or the chained accelerator operation. Another possible approach would be for software running on a CPU to manage the flow of the intermediate data in accelerators that are not configured as a chain of accelerators (e.g., for the software to act as glue logic to manage producer/consumer synchronization, to process data to the correct format, etc.) For example, the software may control the data flow so that both: (1) the software sends first work to the first accelerator to have it read input data from memory, process the input data, and write intermediate data back to system memory; and (2) the software sends first work to the second accelerator to have it read the intermediate data from memory, process the intermediate data, and then write output data to system memory. In addition to the drawbacks previously mentioned of exchanging the intermediate data with system memory, this has the additional drawback of further software overhead in managing the data flow of the intermediate data. In other cases, the software may similarly control the data flow but via buffers that aren't in system memory.

Figure 16:
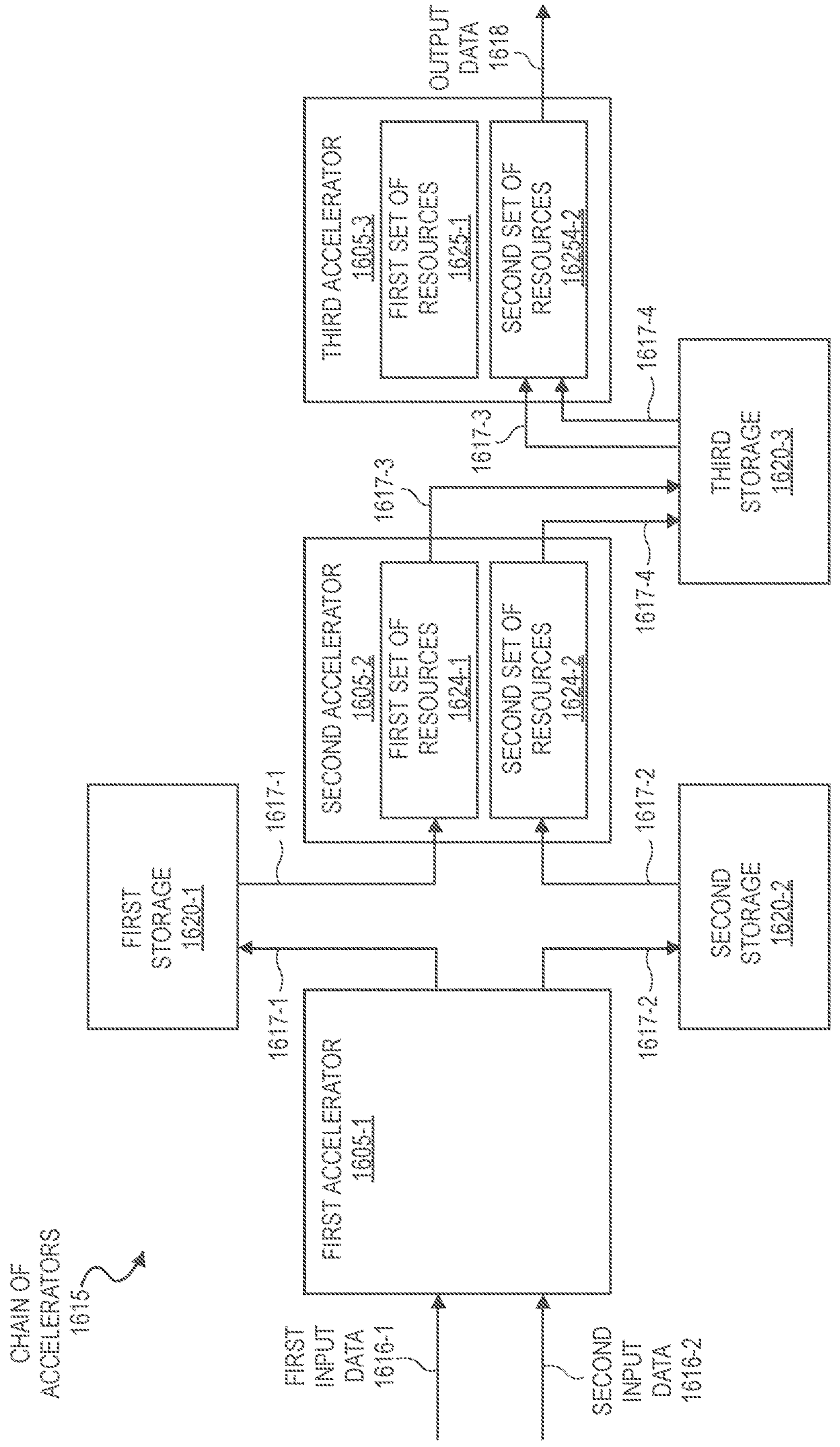
FIG. 16 is a block diagram of a detailed example embodiment of a chain of accelerators.

FIG. 16 is a block diagram of a more detailed example embodiment of a chain of accelerators 1615. The chain of accelerators is included on one or more chips (not shown), as previously described. The one or more chips may be deployed in the system 1400 or other systems disclosed herein.

The chain of accelerators includes a first accelerator 1605-1, a second accelerator 1605-2, and a third accelerator 1605-3 that are chained or otherwise coupled to work together. The first, second, and third accelerators may have support for a chained accelerator operation and may be controlled as part of the chained accelerator operation to perform operations. As chained, the first accelerator precedes the second accelerator, and the second accelerator precedes the third accelerator. The chain of accelerators also includes a first storage 1620-1 and a second storage 1620-2 that are chained or otherwise coupled between the first and second accelerators, a third storage 1620-3 that is chained or otherwise coupled between the second and third accelerators.

The first accelerator may receive first input data 1616-1 from system memory (e.g., a first source memory location) and second input data 1616-2 from system memory (e.g., a second source memory location). The first accelerator may process the first and second input data to produce first intermediate data 1617-1 and second intermediate data 1617-2. The first intermediate data may be stored in the first storage 1620-1. The second intermediate data 1617-2 may be stored in the second storage 1620-2. The first and second accelerators are chained so that the first intermediate data 1617-1 may thereafter be provided from the first storage to the second accelerator 1605-2, and the second intermediate 1617-2 data may be provided from the second storage to the second accelerator.

The second accelerator has a first set of accelerator resources 1624-1 and a second set of accelerator resources 1624-2. The first intermediate data 1617-1 may be provided to the first set of accelerator resources 1624-1. The second intermediate data 1617-2 may be provided to the second set of accelerator resources 1624-2. The first set of accelerator resources may process the first intermediate data to generate third intermediate data 1617-3. The second set of accelerator resources may process the second intermediate data to generate fourth intermediate data 1617-4. The third and fourth intermediate data may both be stored in the third storage 1620-3. The second and third accelerators are chained so that the third and fourth intermediate results may thereafter be provided from the third storage to the third accelerator.

The third accelerator has a first set of accelerator resources 1625-1 and a second set of accelerator resources 1625-2. The third and fourth intermediate data may both be provided to the second set of accelerator resources 1625-2 of the third accelerator. In this example chain, the first set of accelerator resources of the third accelerator is not used as part of the chain of accelerators. The second set of accelerator resources of the third accelerator may process the third and fourth intermediate data to generate and provide output data 1618 to system memory (e.g., a destination memory location).

As previously described, in some embodiments, the first, second, and third intermediate data may be exchanged between the first, second, and third accelerators as described without being sent to the system memory. In some embodiments, the first, second, and third intermediate data may be exchanged between the first, second, and third accelerators, without software needing to manage the data flow of the intermediate data, other than the software potentially performing an initial setup to chain the accelerators.

The first, second, and third storage may be of the same or different types and may include any of the types of storage described elsewhere herein. The first and/or the second storage may be more local or proximate to the first and/or second accelerators than system memory, and for some types of storage more local or proximate to the first and/or second accelerators than a shared cache, lowest-level cache, or I/O cache. Similarly, the third storage may be more local or proximate to the second and/or third accelerators than system memory, and for some types of storage more local or proximate to the second and/or third accelerators than a shared cache, lowest-level cache, or I/O cache.

The sets of accelerator resources 1625-1, 1625-2, 1625-1, 1625-2 may represent sets of physical accelerator resources and/or sets of virtual accelerator resources. For example, the sets of physical accelerator resources may represent the same replicated circuitry or accelerator engines within the accelerator (e.g., first and second tensor engines or resources within a tensor processing unit, first and second DSP engines or resources within a DSP, and so on for other types of accelerators) or different circuitry or accelerator engines within the accelerator (e.g., an encryption engine or resources and a decryption engine or resources within a cryptographic accelerator, a data compression engine or resources and a data decompression engine or resources within a data compression/decompression accelerator). The sets of virtual accelerator resources may represent different virtualized portions of the accelerator (e.g., virtual accelerator engines, virtual accelerator slices, etc.). Virtual accelerator resources will be discussed in more detail further below.

It is to be appreciated that this is just one illustrative example embodiment of a chain of accelerators. Many variations and alternatives to this chain of accelerators are contemplated and will be apparent to those skilled in the art and having the benefit of the present disclosure. For example, other chains of accelerators may have fewer or more accelerators. As another example, any one or more of the first, second, or third storage may optionally be omitted such that the intermediate results of a preceding/producer accelerator are provided directly to a subsequent/consuming accelerator. Also, input data from system memory may be provided not only to the first/initial accelerator but may also optionally be provided to an intermediate accelerator (e.g., the second and/or third accelerator). Similarly, output data may be taken not only from the third/last accelerator but may also be taken from an intermediate accelerator (e.g., the first or second accelerator). Also, intermediate data may optionally be exchanged between sets of physical or virtual accelerator resources within the same accelerator. In general, accelerators may be chained together in a wide variety of different ways to build or implement a wide variety of different types of one-dimensional (1D), two-dimensional (2D), or higher-dimensional Directed Acyclic Graphs (DAGs).

Figure 17:
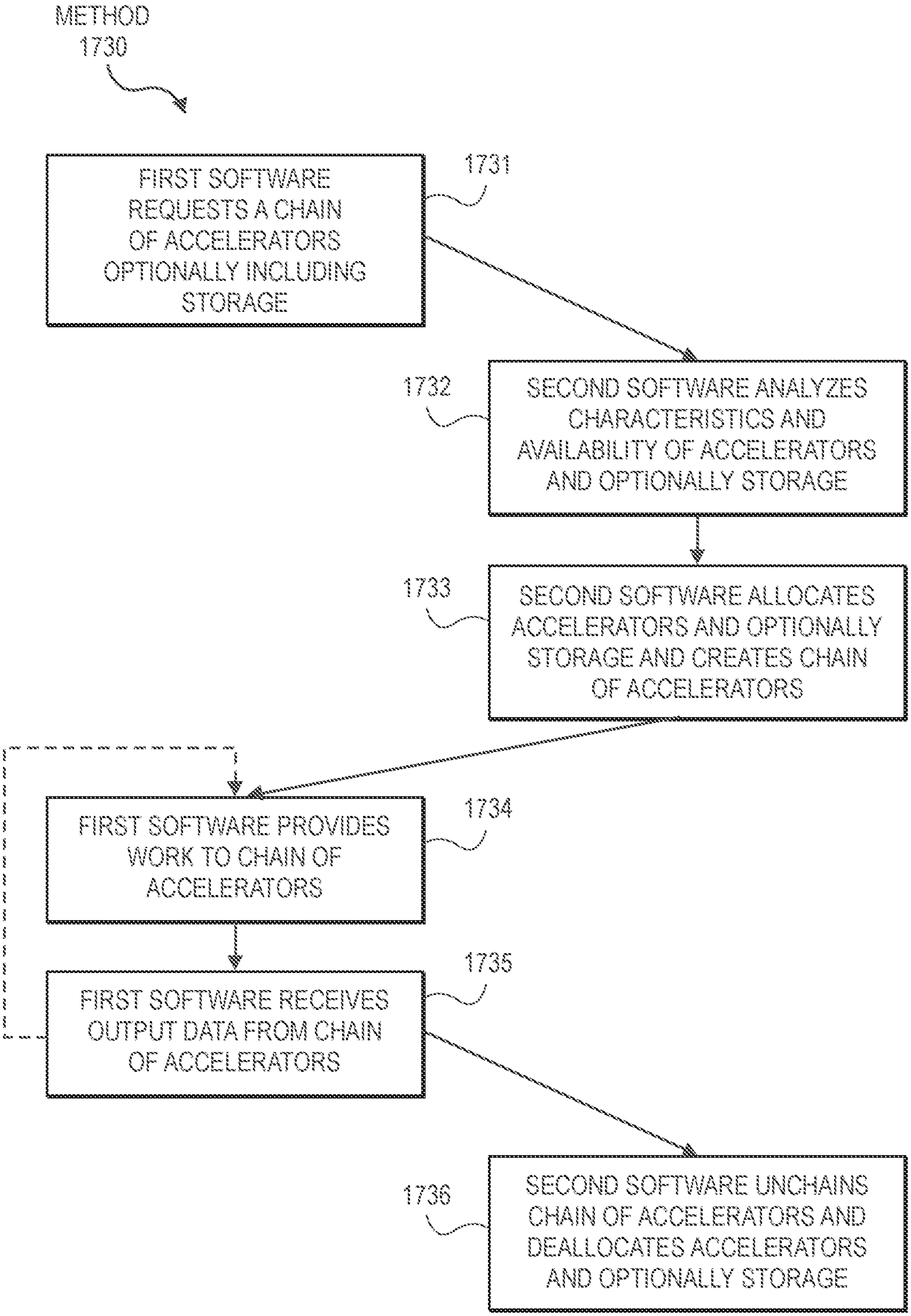
FIG. 17 is a block flow diagram of an embodiment of a method of creating, using, and tearing down a chain of accelerators.

FIG. 17 is a block flow diagram of an embodiment of a method 1730 of requesting a chain of accelerators, creating the chain of accelerators, using the chain of accelerators, and tearing down the chain of accelerators. In some embodiments, the method may be performed by the system 1400. The description and optional details described herein for the system 1400 also optionally apply to the method 1730. Alternatively, the method 1730 may be performed by and/or within a similar or different system, such as other systems disclosed herein.

The method may be performed partly by a first software wanting to use the chain of accelerators (e.g., software 1410), and partly by a second software used to manage the chain of accelerators (e.g., software 1411). The left-hand side of the page shows a sub-method that may be performed by the first software wanting to use the chain of accelerators, and the right-hand side of the page shows a sub-method that may be performed by the second software used to manage the chain of accelerators. Embodiments pertain to either one of these sub-methods by itself potentially reciting interactions or context of the other method.

At block 1731, the first software may request a chain of accelerators. In some embodiments, the first software may be software running on a CPU. In other embodiments, the first software may be software running on a GPU or other type of accelerator. For example, the first software may request a set of physical or virtual accelerator resources and optionally one or more storage to store intermediate results for the chain of accelerators. The first software may be generally aware of the acceleration and storage resources available (e.g., may be aware of a pool of physical or virtual accelerator resources and storage options available on the platform) so that it can better utilize chains of accelerators.

The first software may request the chain of accelerators in different ways, such as, for example, by performing one or more calls (e.g., API calls) or sending one or more messages to the second software (e.g., a VMM, OS, driver, library, runtime software). In some embodiments, there may be a single request for both accelerator resources and storage. For example, an allocation request "allocate_accelerator_chain ({A1, A2, A3}, {S1, S2}, {B1, B2})" may be used to request allocation of first accelerator resources (A1), second accelerator resources (A2), third accelerator resources (A3), a first storage (S1) between A1 and A2 of B1 bytes, and a second storage (S2) between A2 and A3 of B2 bytes.

In other embodiments, there may be separate requests for accelerator resources and storage. For example, a first allocation request "allocate accelerators (A1, A2, A3)" may be used to request allocation of A1, A2, and A3, and a second allocation request "allocate storage ({A1, A2, A3}, {S1, S2}, {B1, B2})" may be used to request allocation of S1 of B1 bytes between A1 and A2 and S2 of B2 bytes between A2 and A3. Alternatively, instead of the second allocation request requesting allocation of both S1 and S2, the second allocation request may be split into two separate allocation requests. For example, one of these two allocation requests "allocate storage ({A1, A2}, S1, B1)" may be used to request allocation of S1 of B1 bytes between A1 and A2, and another of these two allocation request "allocate storage ({A2, A3}, S2, B2)" may be used to request allocation of S2 of B2 bytes between A2 and A3. As another option, there may optionally be separate requests for each of the accelerators (e.g., one allocation request for A1, another for A2, and a third for A3). As one example, "allocate_accelerator (A1, 3, 1), "allocate_accelerator (A2, 3, 2), "allocate_accelerator (A3, 3, 3) may respectively be used to allocate three accelerators A1, A2, and A3, indicate that a chain of three accelerators is being allocated, and indicate the respective positions 1, 2, 3, of A1, A2, and A3 in the chain of accelerators. These are just a few examples and other approaches will be apparent to those skilled in the art and having the benefit of the present disclosure.

In the examples above, the number of bytes has optionally been specified. Alternatively, the buffer or storage space may instead be allocated at various different granularities (e.g., 8-bytes, 64-bytes, or larger granularities). Also, in other embodiments, the number of bytes to allocate for the storage may optionally not be specified but may be determined based on other factors. For example, in some embodiments, the second software may determine appropriate sizes for the storage based on predetermined information about the bandwidth of the accelerators in the chain (e.g., data production and/or data consumption rates). For example, a first accelerator may produce a chunk of B1 bytes at a time and a second accelerator may consume a chunk of B2 bytes at a time, and the amount of storage space may be allocated based on B1 and B2. As one example, the storage may be allocated as a multiple of the size of a chunk of data produced or consumed by one of the accelerators (e.g., the larger of B1 and B2). In another example, the storage may be allocated as a least common multiple of B1 and B2. The storage may also be allocated based on (e.g., to take into account) other factors, such as, for example, latency to access the storage (e.g., buffer hardware) for example as described by Little's Law, the burstiness of data production, the burstiness of data consumption, and the like.

Referring again to FIG. 17, at block 1732, the second software may analyze the availability and characteristics of the accelerator resources and storage requested. If an accelerator or storage is not available, then the second software may optionally attempt to identify a suitable replacement. The accelerators and storage may advertise, expose, or otherwise make certain characteristics available to the second software. Example characteristics include various characteristics related to whether an accelerator resource or storage can be included in the chain of accelerators (e.g., based on capabilities or compatibility) and optionally whether an accelerator or storage are an optimal, good, or at least suitable fit for the chain of accelerators. Specific examples of the characteristics may include location characteristics, bandwidth characteristics, input/output characteristics, storage support characteristics, communication characteristics, features supported, and the like, and subsets and supersets thereof. The characteristics of the available accelerator resources and storage may be analyzed to determine whether they are capable of being chained into the chain of accelerators. In some cases, the characteristics of the available resources may also be analyzed to determine accelerator resources and storage that will make an optimal, good, or at least suitable chain of accelerators.

Figure 18:
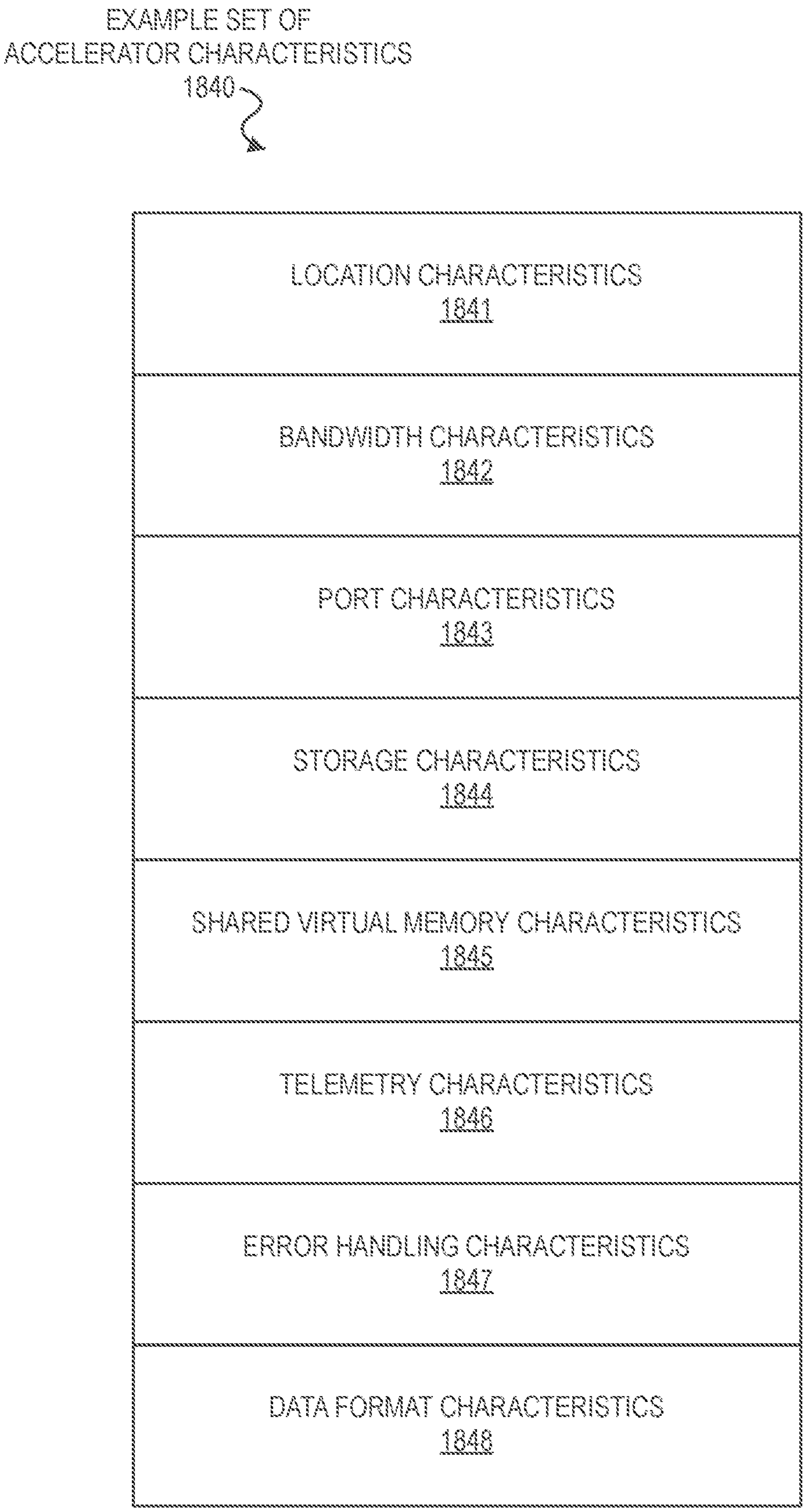
FIG. 18 is a block diagram of detailed example embodiment of a set of characteristics of accelerators.

To further illustrate certain concepts, FIG. 18 is a block diagram of one specific example embodiment of a set of characteristics of accelerators 1840. Other embodiments may have subsets and/or supersets of these characteristics. The set of characteristics may be included in a record, table, data structure, or the like, and may be referenced and analyzed by the second software used to manage chains of accelerators.

Location characteristics 1841 may provide location characteristics of the accelerator. For example, this may indicate which SoC the accelerator is on, which accelerator complex the accelerator is in, what part of the SoC the accelerator is in, and so on. The second software may optionally analyze the location characteristics to attempt to identify and chain accelerators that are local or proximate to one another, and that are local or proximate to storage to be used to store intermediate results, in order to help keep data local to improve performance and reduce power consumption. It is also possible to chain accelerators that are not local (e.g., that are spread across the platform) if there are other reasons to do so.

Bandwidth characteristics 1842 may provide bandwidth (e.g., processing capacity and/or throughput) characteristics of the accelerator. For example, these may include an expected or design bandwidth, a minimum bandwidth, and a maximum bandwidth may be provided. In some cases, the bandwidth characteristics may optionally indicate bandwidth configurability options (e.g., indicate that an accelerator supports a configurable bandwidth or multiple different bandwidths). The second software may analyze the bandwidth characteristics to select and allocate producer and consumer accelerators that are generally matched, balanced, or at least sufficiently compatible in bandwidth with one another in order to help achieve a balanced data flow through the chain of accelerators and high accelerator utilization. This may help to reduce issues such as starvation and backpressure. Such balancing may be achieved using static or dedicated allocation of hardware resources that are selected to be suitably balanced in bandwidth. Such balancing may alternatively be achieved through a virtualization mechanism.

Port characteristics 1843 may provide characteristics of the accelerators data ports. For example, this may describe the input and output ports, their types, and their bandwidth. The software may use such port characteristics to select and allocate producer and consumer ports that are generally matched, balanced, or at least sufficiently compatible in type and bandwidth with one another in order to help achieve a balanced data flow. Ports will be discussed in more detail further below.

Storage characteristics 1844 may provide characteristics of the types of storage supported by the accelerator. As one example, the storage characteristics may indicate that the accelerator supports a dedicated local storage, a shared local storage, a sequestered portion of a lowest-level cache, but not a sequestered portion of an I/O cache. The second software may use such characteristics to select a storage that is supported by both a preceding accelerator and a subsequent accelerator to be chained between them.

Shared virtual memory (SVM) characteristics 1845 may provide characteristics related to shared virtual memory. As one example, the characteristics may indicate whether the accelerator is SVM capable and optionally what SVM configuration operations it supports. SVM is a memory model that enables I/O devices to operate in a shared virtual address space with a CPU. If supported, SVM may be used for communication with software for consumption or production of data from memory. Certain types of storage used to hold intermediate data for inter-accelerator communication may also be addressed using system memory and may need SVM support to be used. The second software may analyze the SVM characteristics to identify accelerator resources that are compatible and can communicate with one another in the way intended.

Telemetry characteristics 1846 may provide characteristics related to telemetry characteristics of the accelerator. As one example, the characteristics may indicate whether the accelerator has telemetry support and optionally what telemetry features it supports. In some embodiments, the second software may optionally use such characteristics to dynamically at runtime monitor the accelerator or storage such as to detect utilization, underutilization, overutilization, etc. In some embodiments, as will be discussed further below, the software may use such telemetry data to dynamically at runtime adjust resources of a chain of accelerators (e.g., allocate additional resources or deallocate resources), balance resources between multiple chains of accelerators, or otherwise reconfigure one or more chains of accelerators.

Error handling characteristics 1847 may provide characteristics related to error handling. As one example, the characteristics may indicate whether the accelerator supports error handling and optionally what error handling features/mechanisms are supported. Errors may be encountered by accelerators when data processing, reading data, writing data, translating virtual addresses, and so on. If appropriate error handling features/mechanisms are supported, then such errors can potentially be handled without hanging or producing corrupt data. In some embodiments, the second software may use such error handling characteristics to preferentially select and chain accelerator resources with error handling capabilities, over accelerator resources without error handling capabilities.

Data format characteristics 1848 may provide characteristics related to accelerator input and/or output data formats supported by the accelerator. Different accelerators may support different accelerator input data formats and/or accelerator output data formats. Examples of such data formats include, but are not limited to, the size of integer data elements (e.g., 8-bit, 16-bit, 32-bit, 64-bit), the size of floating-point data elements (e.g., 8-bit, 16-bit half precision, 16-bit BF16, 32-bit single-precision, 64-bit double precision), and compound structures like strings, arrays, tensors, etc. These data format characteristics may be used to determine whether producer and consumer accelerators support compatible data formats to allow them to exchange intermediate data with one another (e.g., whether a consumer accelerator supports and accelerator input data format that matches or is otherwise compatible with an accelerator output data format of the producer accelerator).

Many variations on the accelerator characteristics and the analysis by the second software are possible. For example, bandwidth characteristics need not be provided or analyzed if the accelerator resources are natively designed to be matching or compatible and/or if large enough storage is provided. As another example, storage characteristics need not be provided or analyzed if the storage are natively designed to be compatible and supported by the accelerators. Likewise, SVM characteristics need not be provided or analyzed if the accelerators are natively designed to be sufficiently support SVM. Location characteristics need not be provided or analyzed if the accelerators are all known in advance to be sufficiently local. Also, the telemetry and error handling characteristics and their analysis is optional not required. Other variations will be apparent to those skilled in the art and having the benefit of the present disclosure.

Referring again to FIG. 17, at block 1733, the second software may select and allocate accelerator resources and optionally storage based on the analysis of the characteristics. In some cases, the accelerator resources (e.g., an entire accelerator or only a subset of physical accelerator resources of an accelerator) may be allocated in a dedicated and static manner. In other cases, the accelerator resources (e.g., a virtual accelerator, virtual register slice, other virtual accelerator resources) may be allocated in a virtualized manner. The second software may also configure or otherwise create the chain of accelerators. In some embodiments, the chain of accelerators may be allocated and created through a general purpose framework that is not limited to any specific type of accelerators (e.g., that works for any one of multiple different types of accelerators) or any specific type of communication protocols or links used to exchange data with the accelerators (e.g., that works for multiple different types of communication protocols and links).

By way of example, the second software may keep track of allocated chains with a table, record, or other data structure, in hardware, firmware, software, or a combination thereof. Each chain may have associated with it one or more process identifier (e.g., one or more process address space identifiers (PASIDs) corresponding to the first software), which may allow the second software to record and know which first software allocated the chain of accelerators. Each chain may also have associated with it in the data structure the number of accelerators in the chain, and for each accelerator in the chain, the number and location of the inputs and outputs. For example, the data structure may record that an accelerator takes one input from system memory and another input from a specific storage. The second software may provide some of this information during the allocation process. For example, when attempting to allocate resources for a specific operation in a chain, the second software may send a request to an accelerator capable of performing that operation, asking it to allocate resources for the chain. If the accelerator is able to do so, it may record in a data structure that it has reserved some portion of its resources for the chain (e.g., as opposed to a non-chained operation), which operation it is specifically going to perform for the chain (e.g., decompression), where the input data for the operation will come from, and where the output data for the operation should go. In some embodiments, additional information may optionally be recorded in the data structure about the input and/or output storage, such as the size of each input or output data item. Similarly, each storage allocated for a chain may optionally store information about the chain (e.g., in hardware, in a data structure). This may include the chain, the amount of storage allocation, which accelerator is producing data into that storage, and which accelerator is consuming the data from that storage. These are just a few illustrative examples. Other approaches for allocating and recording resources for a chain of accelerators are also contemplated.

The chained accelerator operation on the chain of accelerators generally will not begin until and unless all accelerators and storage (or suitable replacements chosen by the second software) can be suitably selected and allocated. On failure, the request from the first software may not cause allocation of any accelerators or any storage (e.g., any that have already been allocated may be deallocated), and the first software may either retry, change the request (e.g., request a smaller chain of accelerators if one is not available, request a lesser bandwidth if enough storage is not available and the second software may optionally provide information about why the initial allocation didn't succeed), fallback to performing the processing on individual unchained accelerators, or perform the processing on the CPU.

At block 1734, the first software may provide work to the chain of accelerators. By way of example, this may be done by the first software issuing or otherwise providing one or more instructions to the chain of accelerators. As one example, the first software may store an instruction in one or more memory-mapped input/output (MMIO) device registers of either the initial accelerator in the chain of accelerators or in those of all the accelerators in the chain. As another example, the first software may store an instruction in a Scalable Input/Output Virtualization (SIOV) Assignable Device Interface (ADI) of either the initial accelerator in the chain of accelerators or in those of all the accelerators in the chain. Other examples of instructions may include API commands or other commands, work descriptors, or other formatted or structured data able to specify the work that individual accelerators or the chain of accelerators are to do in order to achieve the chained accelerator operation. For example, they may specify an operation (e.g., an opcode), an amount of data, one or more sources where data is to be read from (e.g., in system memory for the initial accelerator or storage for subsequent accelerators), one or more destinations where data is to be stored to (e.g., storage for all but the last accelerator or system memory for the last accelerator), one or more operation modifiers, one or more port semantics, a chain of accelerators identifier, and the like, and various subsets and supersets thereof. The instruction(s) may either be at accelerator-level or chain-level. Some of the specification may be in the instruction itself and some of the specification may be indicated by pointers or another parameter passing mechanisms. The one or more instruction may cause or result in the chain of accelerators working together to perform the chained accelerator operation. The work may be provided either as a batch job or as a continuing or streaming operation. In the latter case, the first software may provide multiple such instructions to be executed in sequence to continuously use the chain of accelerators in a streaming manner.

At block 1735, the first software may receive the output data from the chain of accelerators. In this example, this represents the first software being done with the chain of accelerators. In some cases, the first software may send a message, use an API command, use an instruction, or otherwise communicate with the second software to let the second software know that the first software is done with the chain of accelerators. As another option, there may be an end of stream marker. As yet another option, the second software may optionally impose limits on utilization of the chain by the first accelerator (e.g., a certain amount of time, a certain amount of data processed, a certain number of job descriptors). In other embodiments, as shown by the dashed line from block 1735 to block 1734, the method may optionally return to block 1734 one or more times to allow the first software to submit additional work to the chain of accelerators. At block 1736, when the batch work or streaming operation has completed, the second software may unchain or tear down the chain of accelerators and deallocate the accelerator resources and the storage.

In some embodiments accelerators or accelerator resources may be allocated and chained as virtual accelerators or virtual accelerator resources (e.g., a virtual accelerator slice). In some embodiments, software may leverage or utilize certain virtualization features described in SIOV (Scalable I/O Virtualization) and extend them to chaining of accelerators. Further details of SIOV, if desired, can be found in Scalable I/O Virtualization Revision 1.0 Version 1.2 Feb. 2022. Further details of SR-IOV (Single Root I/O Virtualization), if desired, can be found in the PCI Express Base Specification, Revision 4.0, Version 1.0. In other embodiments, software may leverage or utilize virtualization features of a derivative of SIOV, a replacement for SIOV, an alternative to SIOV, or the like, and extend them to chaining of accelerators. Other virtualization approaches are also suitable. One example is Multi-Device Function (MDF). In MDF a single hardware device is exposed as multiple physical functions, as opposed to one physical function being exposed as multiple virtual functions in SIOV. Further details of MDF, if desired, are also found in the PCIe specification.

To further illustrate certain concepts, further details will be provided for an SRIOV implementation, although the scope of the invention is not so limited. SIOV generally provides a way to virtualize a device (e.g., an accelerator) to provide software composable and scalable I/O virtualization that allows software to utilize at least a portion of a device. SIOV allows physical accelerators to be virtualized as VDEVs which may tend to offer advantages such as higher device utilization. SIOV may allow different software (e.g., multiple Process Address Space Identifiers (PASIDs)) to share the same device (e.g., an accelerator). SIOV provides mechanisms that software (e.g., running on a CPU core) can use to configure a virtual device (VDEV) to allow usage by software. The VDEV may represent an abstraction through which at least part of a physical device (e.g., an accelerator) is exposed to software (e.g., guest software, a virtual machine). An accelerator may have one or more VDEVs. The devices in SIOV may advertise VDEVs that have certain characteristics, including characteristics related to chaining of accelerators, as described elsewhere herein (e.g., like those described for FIG. 18). As used herein, a VDEV represents an example embodiment of a set of virtual accelerator resources (e.g., a virtual accelerator or virtual accelerator slice)

SIOV describes an Assignable Device Interface (ADI). The ADI pertains to the granularity at which the device (e.g., the accelerator) may be virtualized and shared. The ADI refers to the set of device (e.g., accelerator) resources that are allocated, configured and organized as a unit for device sharing. These device resources may include, but are not limited to, resources associated with work submission, execution, and completion operations (e.g., command/status registers, on-device queues, references to in-memory queues, local memory on the device, accelerator circuitry). Each ADI instance on the device may encompass the set of resources on the device that are allocated by software to utilize an associated VDEV. As used herein, an ADI may represent an example embodiment of an interface (e.g., a work or job submission interface) for a set of virtual accelerator resources (e.g., a virtual accelerator slice or engine or other a virtual accelerator) that is used to communicate with the virtual accelerator resources.

Software wanting to use a VDEV may submit an instruction (e.g., a work descriptor) to the associated ADI. This may be done through memory-mapped access to the ADI. In a chain of VDEVs, in some cases, the instruction may be submitted to an ADI associated with each VDEV in the chain. In other cases, the instruction may be submitted to an ADI associated with the initial VDEV in the chain, and that VDEV may pass or communicate the instruction to ADI(s) of one or more subsequent VDEV(s) and accompanying instruction/result management may be performed. The VDEV may be linked or included in chains of accelerators using the same or similar approaches as described elsewhere herein for linking or including physical accelerator resources in a chain of accelerators. Also, VDEVs may also be linked or included in a chain (i.e., intermixed) with other sets of accelerator resources (e.g., physical accelerator resources).

In some embodiments, over-subscription of a set of accelerator resources may optionally be used. Software managing the chain of accelerators may optionally choose to allocate the same set of accelerator resources to multiple software requesters. In such embodiments, the software managing the chain of accelerators may employ techniques to manage the potential for unstable dataflow behavior in case certain VDEVs may be oversubscribed and busy and cause starvation and/or back-pressure in a cascading manner to other parts of the chain of accelerators.

Figure 19A:
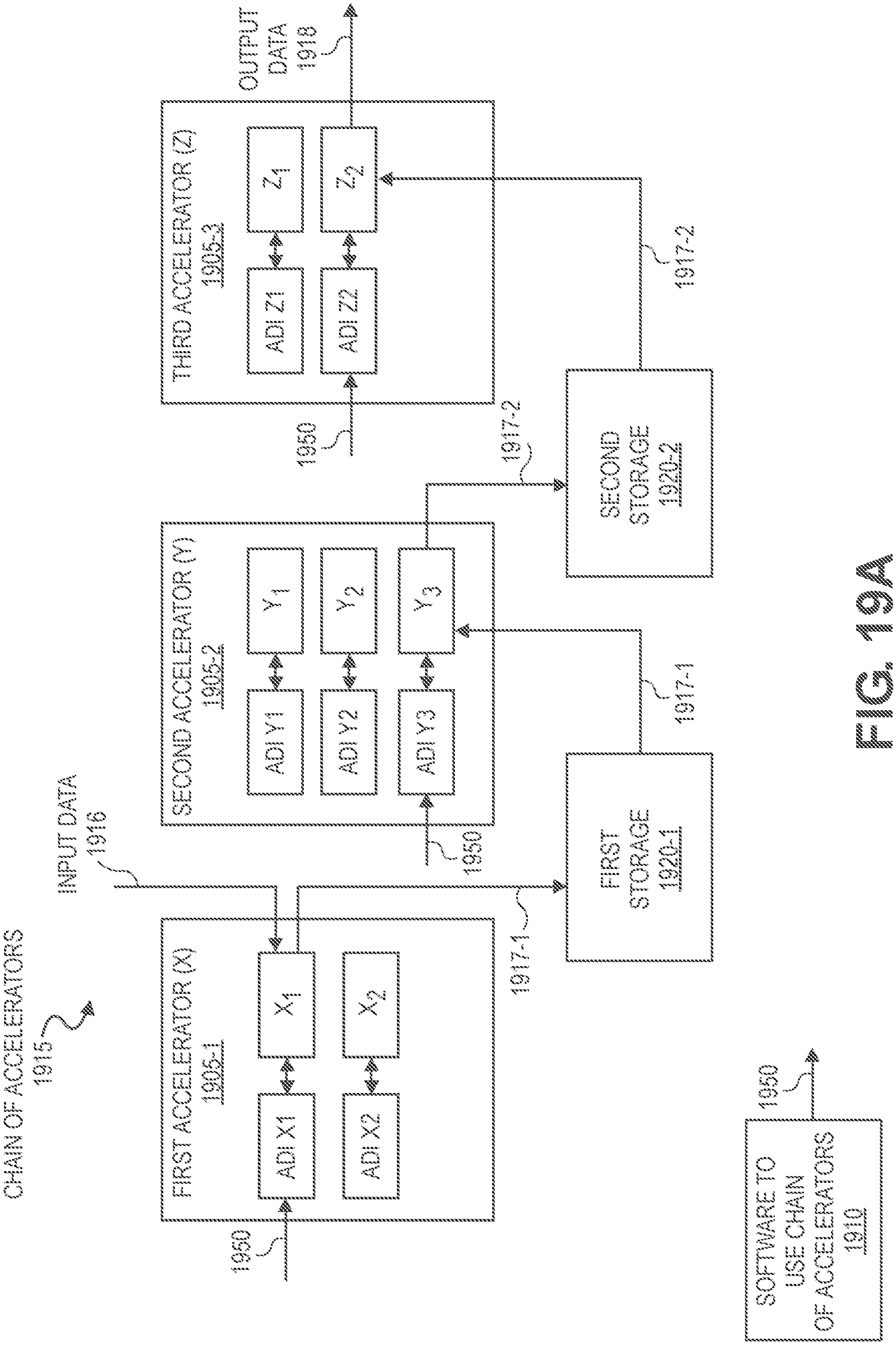
FIG. 19A is a block diagram of a first detailed example embodiment of a chain of accelerators having chained virtual accelerator resources.

FIG. 19A is a block diagram of a more detailed example embodiment of a chain of accelerators 1915 having chained virtual accelerator resources. The chain of accelerators is included on one or more chips (not shown), as previously described. The one or more chips may be deployed in the system 1400 or other systems disclosed herein.

The chain of accelerators includes a first accelerator (X) 1905-1, a second accelerator (Y) 1905-2, and a third accelerator (Z) 1905-3. Each of the first, second, and third accelerators is virtualized to provide sets of virtual accelerator resources, in this specific example SRIOV virtual devices (VDEVs). The first accelerator (X) has a first ADI (ADI X1) and corresponding first VDEV (X1) and a second ADI (ADI X2) and corresponding second VDEV (X2). The second accelerator (Y) has a first ADI (ADI Y1) and corresponding first VDEV (Y1), a second ADI (ADI Y2) and corresponding second VDEV (Y2), and a third ADI (ADI Y3) and corresponding third VDEV (Y3). The second accelerator (Z) has a first ADI (ADI Z1) and corresponding first VDEV (Z1) and a second ADI (ADI Z2) and corresponding second VDEV (Z2).

The chain of accelerators also includes a first storage 1920-1 and a second storage 1920-2. The first and second storage may be of the same or different types and may include any of the types of storage described elsewhere herein.

In the specific illustrated example, X1, the first storage, Y3, the second storage, and Z2 are chained or otherwise coupled to work together. Software 1910 wanting to use the chain of accelerators may issue or otherwise provide one or more instructions 1950 describing, specifying, or otherwise indicating a chained accelerator operation to the chain of accelerators. By way of example, the one or more instructions may be one or more commands, work descriptors, or formatted or structured data specifying or otherwise indicating a chained accelerator operation. For example, such an instruction may be stored in each of ADI X1, ADI Y3, and ADI Z2.

X1 may be controlled as part of the chained accelerator operation to access an input data 1916 from a source memory location in system memory, process the input data, generate first intermediate data 1917-1, and store the first intermediate data in the first storage. Y3 may be controlled as part of the chained accelerator operation to access the first intermediate data 1917-1 from the first storage, process the first intermediate data, generate second intermediate data 1917-2, and store the second intermediate data in the second storage. Z2 may be controlled as part of the chained accelerator operation to access the second intermediate data 1917-2 from the second storage, process the second intermediate data, generate output data 1918, and store the output data to a destination memory location in the system memory. In this example, the chain of accelerators represents a one-dimensional (1D) DAG in which each producer accelerator provides its intermediate data to only one consumer accelerator.

Figure 19B:
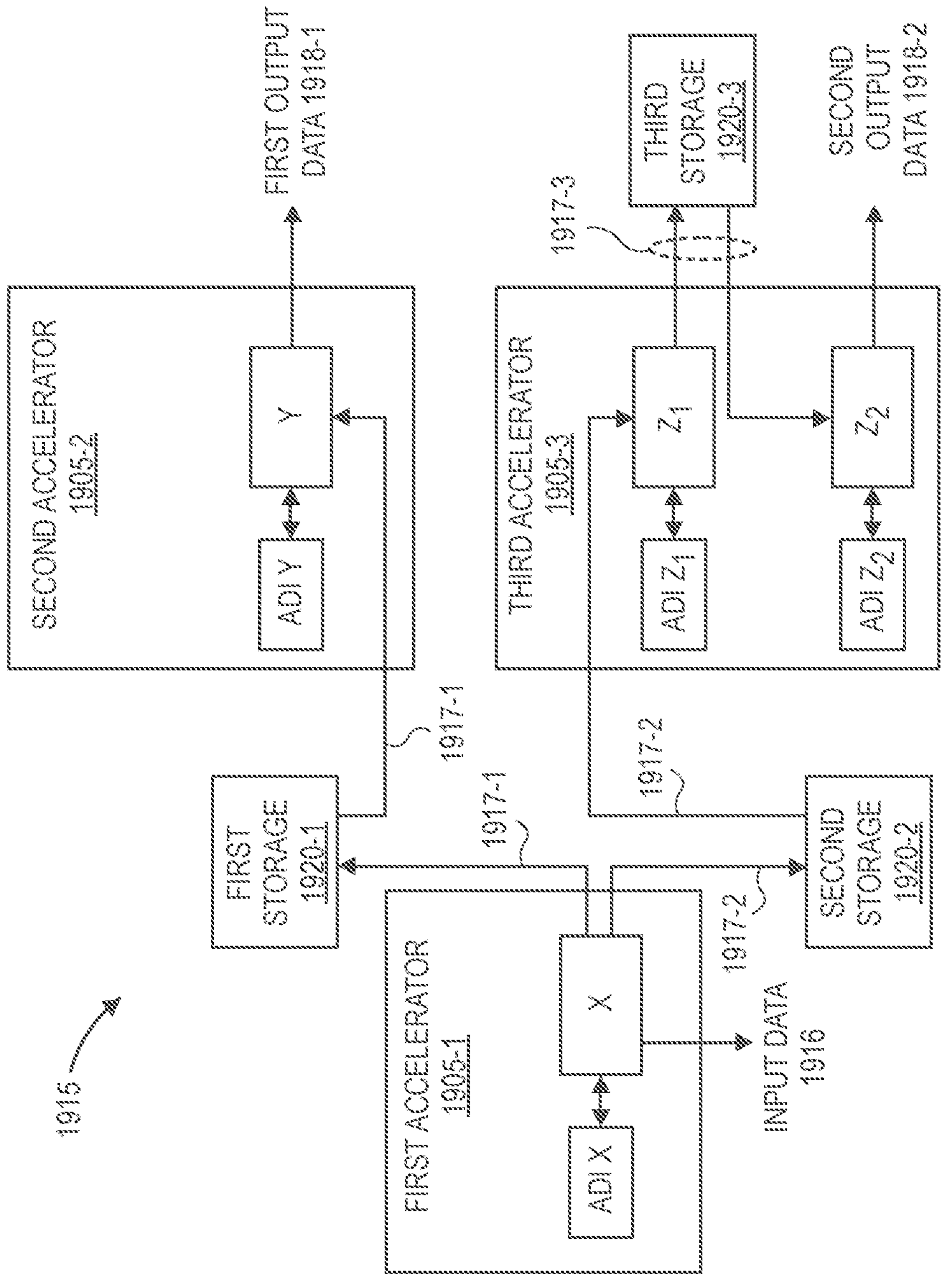
FIG. 19B is a block diagram of a second detailed example embodiment of a chain of accelerators having chained virtual accelerator resources.

FIG. 19B is a block diagram of another more detailed example embodiment of a chain of accelerators 1915 having chained virtual accelerator resources. The chain of accelerators is included on one or more chips (not shown), as previously described. The one or more chips may be deployed in the system 1400 or other systems disclosed herein.

The chain of accelerators includes a first accelerator 1905-1, a second accelerator 1905-2, and a third accelerator 1905-3. Each of the first, second, and third accelerators is virtualized to provide sets of virtual accelerator resources, in this specific example SRIOV virtual devices (VDEVs). The first accelerator has an ADI (ADI X) and a corresponding VDEV (X). The second accelerator has an ADI (ADI Y) and a corresponding VDEV (Y). The third accelerator has a first ADI (ADI Z1) and corresponding first VDEV (Z1), and a second ADI (ADI Z2) and corresponding second VDEV (Z2). The accelerators may optionally have other ADIs and VDEVs in addition to those shown.

The chain of accelerators also includes a first storage 1920-1, a second storage 1920-2, and a third storage 1920-3. The first and second storage may be of the same or different types and may include any of the types of storage described elsewhere herein.

In the specific illustrated example, X, the first storage, Y, the second storage, Z1, the third storage, and Z2 are all chained or otherwise coupled to work together. X may be controlled as part of a chained accelerator operation to access an input data 1916 from a source memory location in system memory, process the input data, generate first intermediate data 1917-1, generate second intermediate data 1917-2, store the first intermediate data 1917-1 in the first storage 1920-1, and store the second intermediate data 1917-2 in the second storage 1920-2.

Y may be controlled as part of the chained accelerator operation to access the first intermediate data 1917-1 from the first storage, process the first intermediate data, and generate first output data 1918-1, and store the first output data to a first destination storage location in system memory. Z1 may be controlled as part of the chained accelerator operation to access the second intermediate data 1917-2 from the second storage, process the second intermediate data, generate third intermediate data 1917-3, and store the third intermediate data 1917-3 in the third storage 1920-3. Z2 may be controlled as part of the chained accelerator operation to access the third intermediate data 1917-3 from the third storage, process the third intermediate data, generate second output data 1918-2, and store the second output data to a second destination storage location in system memory.

Notice that in this example, the third intermediate data 1917-3 is exchanged between two VDEV (i.e., Z1 and Z2) of the same accelerator. As one illustrative example, there may be inter-PASID data movement in one VDEV. For example, one VDEV can perform data movement from one address space to another, and then allow a single-PASID capable VDEV to perform further computations. Also, notice in this example, that the chain of accelerators represents a two-dimensional (2D) DAG in which the first accelerator provides its intermediate data to both the second and third accelerators. As one illustrative example, the first accelerator may decompress a compressed data that includes both matrix data and metadata, and then the first accelerator may provide the decompressed metadata to the second accelerator and provide the decompressed matrix data to the third accelerator. In other embodiments, another 2D DAG may involve two producer accelerators providing their intermediate data to one common consumer accelerator. As one illustrative example, one producer accelerator may provide matrix data to a consumer accelerator, and another producer accelerator may provide metadata to the same consumer accelerator, and the consumer accelerator may compress the matrix data and the metadata.

As shown in FIGS. 19A-19B, in some embodiments, the intermediate data may be exchanged between the accelerators via the storage without the intermediate data being sent to the system memory, as previously described. In some embodiments, the intermediate data may be exchanged between the accelerators via the storage without software needing to manage the data flow of the intermediate data, other than the software potentially performing an initial setup, configuration, or chaining together of the chain of accelerators. In some embodiments, the storage may be physically more local, proximate, or closer to the accelerators using it than system memory, and for some types of storage physically more local, proximate, or closer to the accelerators using it than a shared cache, lowest-level cache, or I/O cache.

It is to be appreciated that the chains of accelerators shown in FIGS. 19A-B are just illustrative example embodiments of chains of accelerators. Many variations and alternatives to these chains of accelerators are contemplated and will be apparent to those skilled in the art and having the benefit of the present disclosure. For example, the types of variations mentioned for FIG. 16 are also possible here (e.g., fewer or more accelerators, fewer or more storage, fewer or more input and/or output data, and so on). Also, each accelerator may have fewer or more ADI and VDEVs than shown. Further, VDEV may also optionally be intermixed with actual physical accelerators or sets of physical accelerator resources in a chain. In general, accelerators may be chained together in a wide variety of different ways to build or implement a wide variety of different types of 1D, 2D, or higher dimensional Directed Acyclic Graphs (DAGs).

Figure 20:
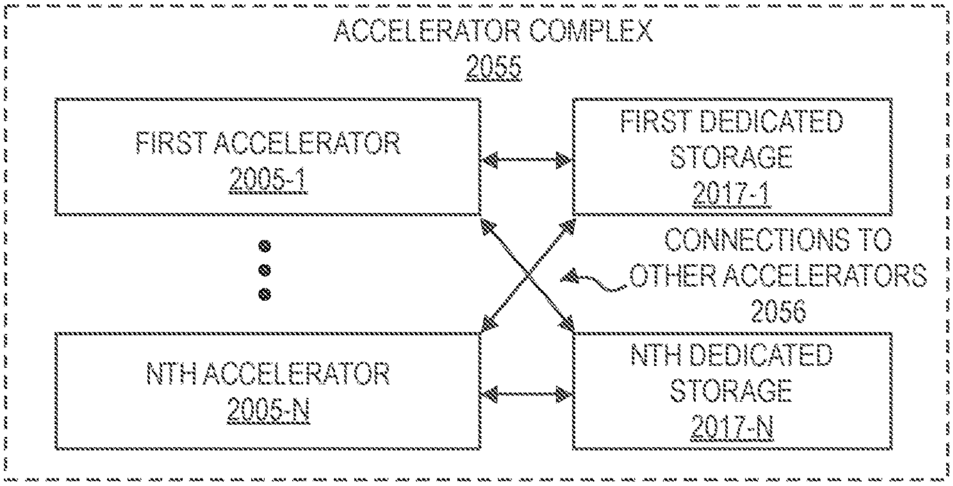
FIG. 20 is a block diagram illustrating a first embodiment of storage that may be included and used in a chain of accelerators.

FIG. 20 is a block diagram illustrating a first embodiment of storage 2020-1, 2020-N that may be included and used in a chain of accelerators. A first accelerator 2005-1 through an Nth accelerator 2005-N are shown. The first accelerator has an associated or corresponding first dedicated storage 2020-1 that is private or dedicated to (e.g., dedicated for use by) the first accelerator. Likewise, the Nth accelerator has an associated or corresponding Nth private or dedicated storage 2020-N that is dedicated to (e.g., dedicated for use by) the Nth accelerator. The first and Nth dedicated storage represent per-accelerator storage. These dedicated storage are dedicated for use by their corresponding accelerator in the sense that they are provisioned for the corresponding accelerator, and the corresponding accelerator may use them for multiple different other accelerators chained to the corresponding accelerator, but those multiple different other accelerators generally will not use the dedicated storage unless they are chained to exchange intermediate data with the corresponding accelerator for the dedicated storage. Also shown are connections or couplings 2056 between the first and Nth dedicated storage and other accelerators to allow the first and Nth dedicated storage to be used by other accelerators besides their corresponding accelerators when used in chains of accelerators.

The first and Nth dedicated storage may physically local, proximate, or close to, or optionally within, their corresponding accelerators. They may be more local, proximate, or close to their corresponding accelerators than they are to system memory, and in some embodiments the CPU, the lowest-level cache, and the I/O cache. As shown, they may each be within an accelerator complex 2055 including the first and Nth accelerators. The accelerator complex may represent a region or area of a SoC or chip that includes the illustrated components, but may not include certain other components, such as the CPU, the lowest-level cache, the I/O cache, the memory controllers, etc. As one example, the accelerator complex may represent a region or area of the chip that only includes accelerators and their storage. Utilizing storage local or proximate to the accelerators may help to reduce latency for the reads and writes, reduce power consumption, and the like, as previously described.

As discussed above, in some cases an accelerator may have two or more sets of accelerator resources (e.g., physical accelerator resources or virtual accelerator resources) that can be allocated to different chained operations. In such cases, the storage 2020-1, 2020-N may each be shared by the two or more sets of accelerator resources of their corresponding accelerator.

Figure 21:
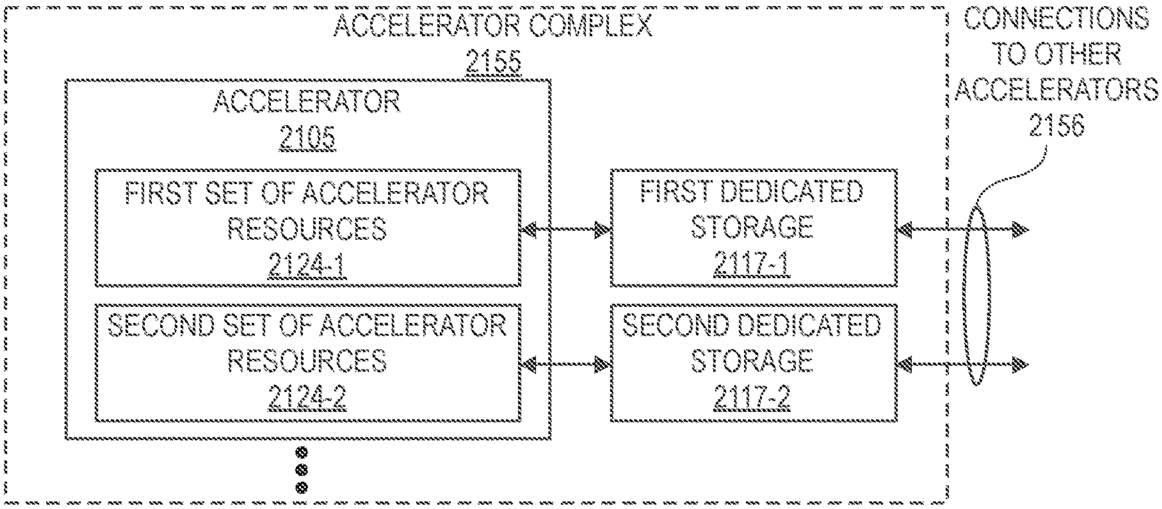
FIG. 21 is a block diagram illustrating a second embodiment of storage that may be included and used in a chain of accelerators.

FIG. 21 is a block diagram illustrating a second embodiment of storage 2120-1, 2120-2 that may be included and used in a chain of accelerators. An accelerator 2105 has a first set of accelerator resources 2124-1 and a second set of accelerator resources 2124-2. These may represent either physical or virtual accelerator resources. The first set of accelerator resources has an associated or corresponding first dedicated storage 2120-1 that is private or dedicated to (e.g., dedicated for use by) the first set of accelerator resources. Likewise, the second set of accelerator resources has an associated or corresponding second private or dedicated storage 2120-2 that is dedicated to (e.g., dedicated for use by) the second set of accelerator resources. Similarly, a different dedicated storage may optionally be provided per set of accelerator resources in the accelerator 2105. These dedicated storage are dedicated for use by their corresponding set of accelerator resources in the sense that they are provisioned for the corresponding set of accelerator resources and the corresponding set of accelerator resources may use them for multiple different other accelerators chained to the corresponding set of accelerator resources, but those multiple different other accelerators generally will not use the dedicated storage unless they are chained to exchange intermediate data with the corresponding set of accelerator resources for the dedicated storage. Also shown are connections or couplings 2156 to allow the first and second dedicated storage to be used by other accelerators besides their corresponding set of accelerator resources when used in chains of accelerators. The first and second dedicated storage may local or proximate to, or optionally within, the accelerator. They may be more local or proximate to the accelerator than they are to system memory, and in some cases to the CPU, the lowest-level cache, and the I/O cache. As shown, they may each be within an accelerator complex 2155.

In FIGS. 20-21, since each accelerator has one or more dedicated storage, it could be possible to use either the storage of a preceding/producer accelerator or the storage of a subsequent/consuming accelerator to buffer or store the intermediate data exchanged between them. One possible approach is to consistently or always use either the storage at the producing accelerator or consistently or always use the storage at the consuming accelerator. Another possible approach is for software managing the chain of accelerators to analyze and select one of the storage at the producing accelerator or the storage at the consuming accelerator (e.g., to achieve an advantage). This may depend on factors such as the particular accelerators, their bandwidths, design decisions, and the like.

Figure 22:
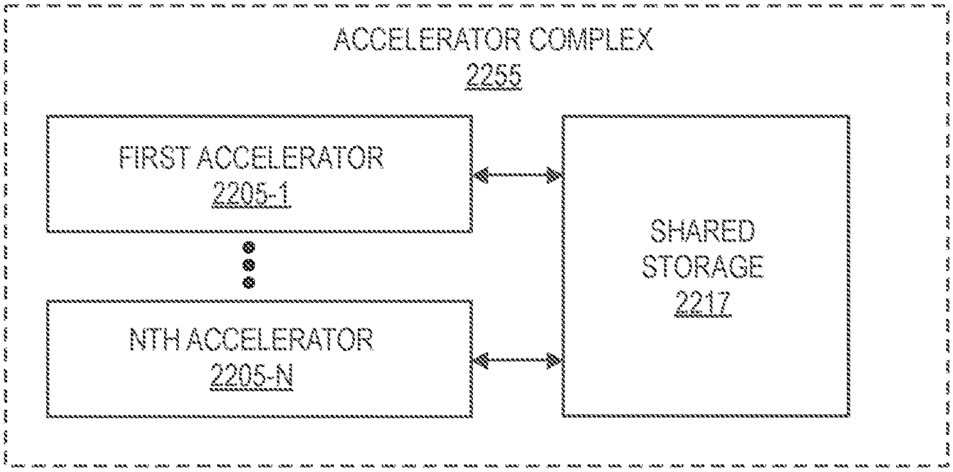
FIG. 22 is a block diagram illustrating a third embodiment of storage that may be included and used in a chain of accelerators.

FIG. 22 is a block diagram illustrating a third embodiment of storage 2220 that may be included and used in a chain of accelerators. A first accelerator 2205-1 through an Nth accelerator 2205-N are shown. The first accelerator and the Nth accelerator are each coupled with and share an associated or corresponding shared storage 2220-N that is to be shared by the first and Nth accelerators, and optionally others. The shared storage need not be shared by all accelerators and there may optionally be provided multiple such shared storage that is shared by different subsets of the accelerators. The shared storage may be more local, proximate, or close to the first and Nth accelerators than to system memory, and in some cases to the CPU, the lowest-level cache, and the I/O cache. As shown, the shared storage may be within an accelerator complex 2255.

The shared storage may represent a memory-like structure and the software that manages the chain of accelerators may keep track of which portions of the shared storage have been allocated versus which are available. This may be done at page or some other granularity. In some cases, hardware and/or software may also track how much space is being used in the storage by each of the accelerators and there may optionally be limits on how much space each accelerator can use. When software requests allocation of space in the shared storage, the hardware and/or software may look for available space of sufficient size. If it fails to find such space, or if this allocation would exceed the space allowed for the corresponding accelerator, then the allocation may optionally fail. Otherwise, the hardware and/or software may record the allocation of the requested amount of space. When an operation is complete, the space may be deallocated, the space may be marked available, and the total storage usage by the accelerator may be correspondingly reduced by the deallocated space.

The storage shown in FIGS. 20-22 may each be used as a buffer or other temporary storage for intermediate data. They may be implemented in SRAM or other suitable types of memory (e.g., types of memory conventionally used for caches, scratchpads, etc.). They may not be cache coherent in the sense of caches and they may not use an autonomous eviction algorithm like those used in caches.

Several different addressing models may optionally be used to address data in the storage. In some embodiments, a "scratchpad address" addressing model may optionally be used. At configuration/allocation time, for a given operation in the chain, the producer and consumer accelerators may record which scratchpad they are respectively writing to or reading from and the starting location in that scratchpad for the respective output or input buffer. To access data, an accelerator addresses a specific location relative to the start address in the scratchpad. For example, to read the Xth byte of input data, it would load "start address+(X−1)".

In other embodiments, a "memory mapped" addressing model may optionally be used. Hardware may reserve a portion of the physical address space in the system memory and map each scratchpad to part of that space. As with the scratchpad address addressing model, for each operation, the producer and consumer may record the starting location in this memory space for the respective output or input buffer and use addresses relative to that. However, in the memory mapped addressing it is not necessary to record which scratchpad is being used, since hardware may automatically route requests to the right memory structure based on physical address. Also, as an optional feature if allowed, system software may directly read/write the buffers from other devices that have permission to that portion of the physical address space. This may allow system software, for example, to pause a chain of operations and migrate the buffers to main memory (or migrate them back) on a context switch by reading the contents and copying them to main memory (e.g., pages in the application virtual address space).

In other embodiments, a "memory map buffer to application virtual address space" addressing model may optionally be used. This is similar to the memory mapped addressing described above, but additionally each page of the buffer may be mapped to the application's virtual address space. Accelerators could address data in the buffer using physical addresses or virtual addresses.

Some accelerators may also have standard internal first-in, first-out (FIFO) queues or buffers at their input and/or output. These are different than and in addition to the storage of FIGS. 20-22. In some cases, these standard queues or buffers are not shared by two or more accelerators (e.g., only the accelerator having these standard queues or buffers are able to access the data stored in them) but no other accelerators. In some cases, these standard queues or buffers are internal to the accelerators and the storage of FIGS. 20-22 may either be internal or external to the accelerators. In some cases, the control circuitry or other logic for these standard queues or buffers are internal to the accelerators and the control circuitry or other logic for the storage of FIGS. 20-22 may be either internal or external to the accelerators. In some cases, these standard queues or buffers are relatively smaller than the storage of FIGS. 20-22. Adding dedicated and shared storage like those of FIGS. 20-22 may offer certain advantages (e.g., keeping intermediate data of an accelerator chain local to the accelerators), but it may also tend to add additional on-chip area and increase power consumption. Other embodiments pertain to utilizing at least a portion of an existing cache for the storage. Such embodiments may help to avoid the additional on-chip area and increase power consumption.

As shown in FIG. 14, chips often have one or more caches. Commonly, they may have one or more of a shared cache (e.g., shared cache 1407), a lowest-level cache, and an input/output (I/O) cache. By default, unless special provisions are made, data written and/or read by an accelerator may potentially be cached in one or more of the caches (e.g., a shared cache, a lowest-level cache, an I/O cache). However, one challenge with using such caches to store the intermediate data produced by a chain of accelerators is that caches typically utilize a cache eviction mechanism to evict data (e.g., a cache line) that has aged and/or is otherwise perceived as not likely to be needed soon. The eviction is typically done automatically by hardware to make room in the cache for other data perceived as being more likely to be needed soon. If precautions are not taken, and if the cache was used to store the intermediate data for a chain of accelerators, then some of the intermediate data could be evicted from the cache before the chain of accelerators has a chance to retrieve and further process it. In other words, there is no guarantee that the intermediate data will remain in the cache long enough for the chain of accelerators to use it.

Another challenge with using such caches to store the intermediate data produced by a chain of accelerators is that certain caches (e.g., commonly shared caches, lowest-level cache, and other large caches) are commonly implemented as distributed caches having physically distributed cache slices or other portions. When such distributed caches are used, the buffer or storage (e.g., a contiguous chunk of memory) and the intermediate data therein may be spread across multiple cache slices, some of which may not be close, as close as other cache slices, or as close as possible, to the accelerator(s) that will use the intermediate data.

Figure 23:
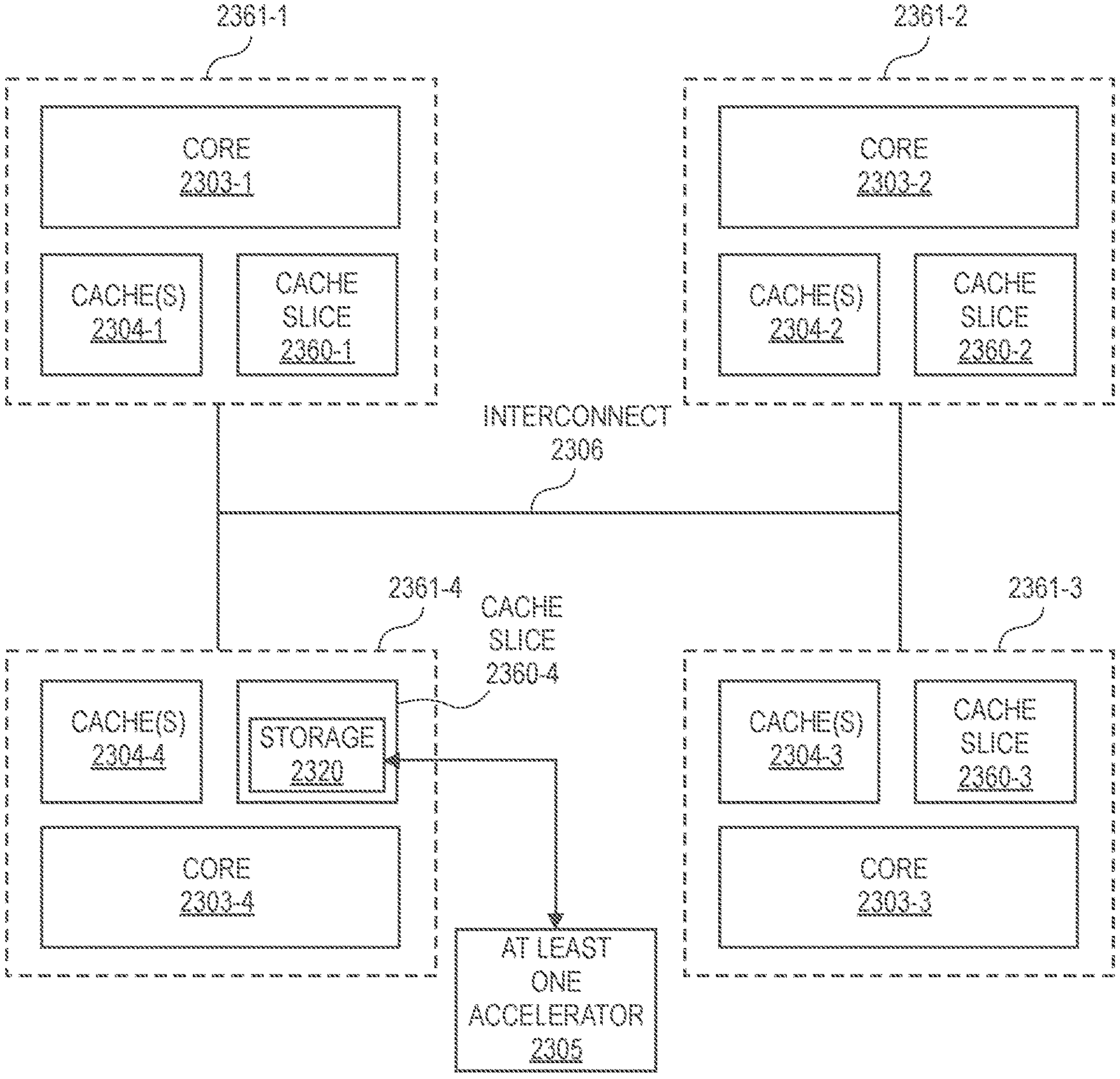
FIG. 23 is a block diagram illustrating a fourth embodiment of storage that may be included and used in a chain of accelerators.

FIG. 23 is a block diagram illustrating a fourth embodiment of storage 2320 that may be included and used in a chain of accelerators. A first core 2303-1, a second core 2303-2, a third core 2303-3, and a fourth core 2303-4 are shown. Other embodiments may include other numbers of cores, as previously described. The first core has one or more dedicated caches 2304-1, the second core has one or more dedicated caches 2304-1, the third core has one or more dedicated caches 2304-3, and the fourth core has one or more dedicated caches 2304-4. Also shown is a distributed shared cache (e.g., an L3 cache, an L4 cache, a lowest-level cache) that includes a first cache slice 2360-1, a second cache slice 2360-2, a third cache slice 2360-3, and a fourth cache slice 2360-4. The cache slices may broadly represent physically distributed cache portions. These components are all coupled with one another by at least one interconnect 2306 (e.g., a ring interconnect, a full mesh, crossbar, etc.).

The first cache slice is local, proximate, or close to the first core, the second cache slice is close to the second core, the third cache slice is close to the third core, and the fourth cache slice is close to the fourth core. For example, the cache slices may be more local, proximate, or close to their associated cores and their dedicated cache(s) than they are to the other cores. In some cases, the first core, its dedicated caches, and the first cache slice may optionally be included in a first area, region, or location 2361-1 of a chip/die, the second core, its dedicated caches, and the second cache slice may optionally be included in a second area, region, or location 2361-2 of a chip/die, the third core, its dedicated caches, and the third cache slice may optionally be included in a third area, region, or location 2361-3 of a chip/die, and the fourth core, its dedicated caches, and the fourth cache slice may optionally be included in a fourth area, region, or location 2361-4 of a chip/die. In some cases, the first through fourth regions may be grouped in a certain larger area, region, or location of the chip/die (e.g., a region of the chip/die having the CPU), although that is not required and in other cases they could be widely dispersed across the chip/die.

Referring again to FIG. 23, the fourth cache slice (in this example) includes a storage 2320 that is used to store intermediate results for a chain of accelerators. At least one accelerator 2305 is coupled with the storage. The storage may either be dedicated to one accelerator or shared by two or more accelerators or optionally all accelerators in an accelerator complex. In some embodiments, the storage may represent a portion of the fourth cache slice or portion that has been reserved, sequestered, carved-out, or logically removed from the shared cache and reconfigured, reused, repurposed, or changed in behavior/function/operation to be the storage (e.g., a buffer) for intermediate data for a chain of accelerators (e.g., instead of being just another part of the cache and used the same way other parts of the cache are used). As one example, the storage may be non-cache coherent, unlike the remainder of the cache. As another example, the cache may apply a cache replacement policy or algorithm to evict cache lines from a remainder of the cache, but not the portion of the cache repurposed for the storage (e.g., the storage may not be changed or affected by a cache replacement policy or algorithm). As another example, a regular load or store instruction executed by a CPU may check the remainder of the cache but may not check the portion of the cache repurposed for the storage. Alternatively, other embodiments may optionally use the shared cache and/or a lowest-level cache without carving out and repurposing the storage, if desired.

In some cases, the fourth cache slice 2360-4 may selected for the storage because it is physically more local, proximate, or closer to the accelerator 2305 (or potentially a pair of accelerators exchanging intermediate data through the storage) than any of the other cache slices of the cache. In some cases, the fourth cache slice may be selected for the storage because it is more local, proximate, or physically closer to the accelerator 2305 (or a pair of accelerators exchanging intermediate data through the storage) than the mean or average distance of the cache slices of the cache from the accelerator. In some cases, the fourth cache slice may be selected for the storage because the shared cache does not include any cache slices more local, proximate, or physically closer to the accelerator 2305 (or a pair of accelerators exchanging intermediate data through the storage) than the fourth cache slice (e.g., or at least not substantially so). In such cases, the software used to manage the chain of accelerators and allocate the fourth slice may be aware (e.g., have information about) the locations of the cache slices and the accelerators and may such information into consideration when selecting a cache slice to host the storage.

Figure 24:
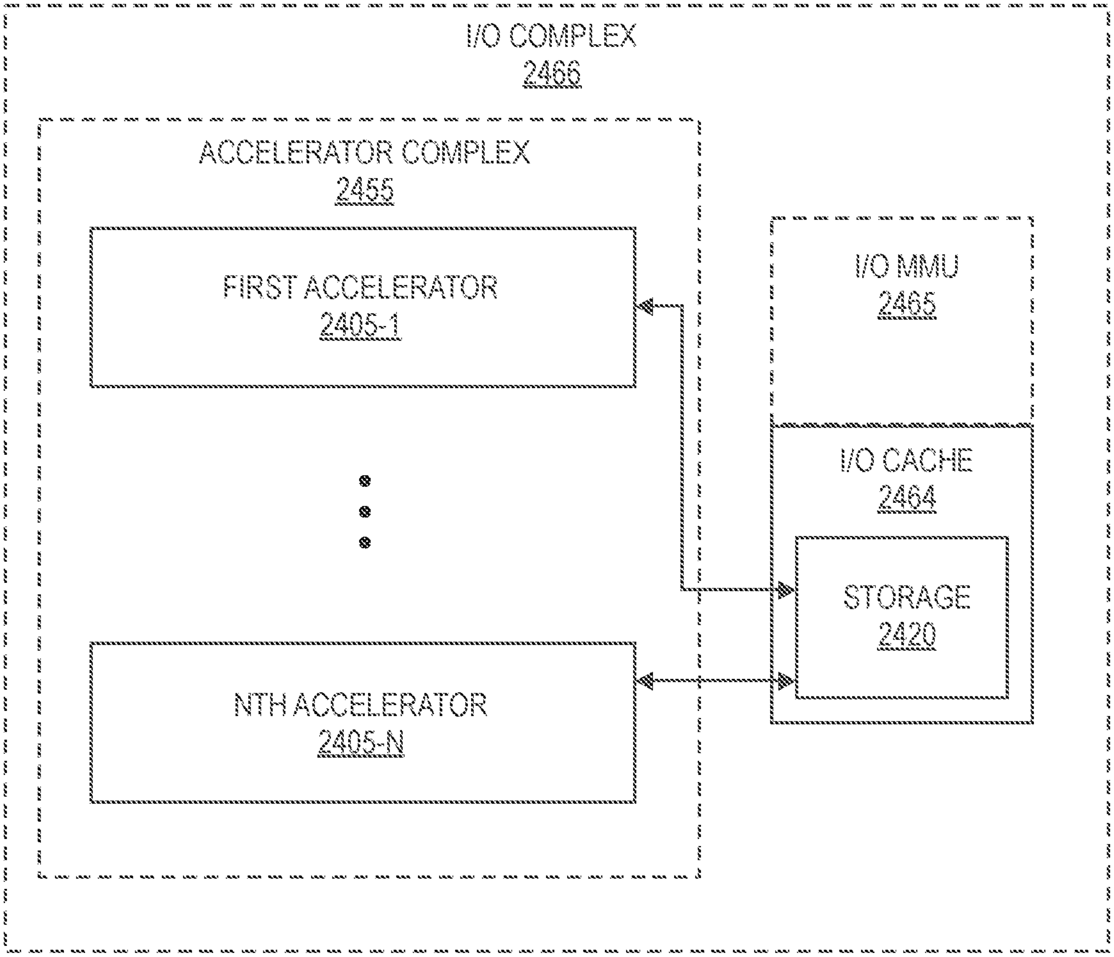
FIG. 24 is a block diagram illustrating a fifth embodiment of storage that may be included and used in a chain of accelerators.

FIG. 24 is a block diagram illustrating a fifth embodiment of storage 2420 that may be included and used in a chain of accelerators. A first accelerator 2405-1 and an Nth accelerator 2405-N are shown. As shown, they may each be within an accelerator complex 2455. Also shown is an I/O cache 2464 and an optional I/O memory management unit (MMU) 2465. As shown, they may be within an I/O complex 2466. In this case the first and Nth accelerators are also optionally within the I/O complex, although that is not required.

The I/O cache includes a storage 2420 to store intermediate results for a chain of accelerators. The first and Nth accelerators are coupled with the storage. In some embodiments, the storage may represent a portion of the I/O cache that has been reserved, sequestered, carved-out, or logically removed from the I/O cache and reconfigured, reused, repurposed, or changed in behavior/function/operation to be the storage to buffer intermediate data for a chain of accelerators (e.g., instead of being just another part of the I/O cache and used the same way other parts of the I/O cache are used). As one example, the storage may be non-cache coherent unlike the remainder of the I/O cache. As another example, the storage may not be changed or affected by a cache replacement policy or algorithm, which is used to evict cache lines from the remainder of the I/O cache. Alternatively, other embodiments may optionally use the I/O cache without carving out and repurposing the storage, if desired.

In some embodiments, the storage 2320 of FIG. 23 and/or the storage 2420 of FIG. 24 may be implemented as a reserved, sequestered, carved out, or logically removed subset of ways of the respective cache. Circuitry or other logic may be included to track which ways are being used conventionally as part of the cache versus which ways have been repurposed and are being used for the storage. As one example, this may be done with a mask (e.g., a bit mask) for example stored in a register (e.g., a control register) where mask elements (e.g., mask bits) respectively correspond to different ways of the cache. Each mask element or bit indicates if the corresponding way has been repurposed or used for the storage or not (e.g., binary zero or another first value may indicate it has and binary one or another second value may indicate it has not). When a conventional request accesses the cache, the cache controller may check the mask and then search only the subset of ways not repurposed and used for the storage as indicated by the mask. Conversely, when a request from an accelerator to access intermediate data of a chain of accelerators accesses the cache, the cache controller may check the mask and then search only the subset of ways not repurposed and used for the storage as indicated by the mask. By way of example, this may be done by applying the mask to the tag lookup logic (e.g., logically ANDing the mask, or the inverse of the mask, to the tag comparators). To deallocate one or more ways privileged software may only change the corresponding mask elements of the mask to a different value. Also, if desired to help ensure correctness, the contents of the ways deallocated may optionally be flushed or invalidated.

In other embodiments, the storage 2320 of FIG. 23 and/or the storage 2420 of FIG. 24 may be implemented as a reserved, sequestered, carved out, or logically removed subset of sets of the respective cache. Circuitry or other logic may be included to track which sets are being used conventionally as part of the cache versus which sets have been repurposed and are being used for the storage. As one example, this may be done with a control register storing one or more values to indicate the number of sets that have been repurposed and are being used for the storage. These sets may either be implicitly at the beginning or at the end of the cache, depending on the specific implementation. The control register may not be used directly on a cache lookup, but rather when the control register is modified, the mapping of address-to-set may be adjusted in the cache. When a conventional request accesses the cache, the cache controller may "skip over" the subset of sets repurposed and used for the storage for buffers, and only search the subset of sets not repurposed and used for the storage. Conversely, when a request from an accelerator to access intermediate data of a chain of accelerators accesses the cache, the cache controller may "skip over" the subset of sets not repurposed and used for the storage for buffers, and only search the subset of sets repurposed and used for the storage. In some cases, an address may be mapped to a set by extracting a subset of the address bits, and the reservation size for the storage may be restricted appropriately (e.g., if half of the sets are reserved, then one fewer address bit can be used for mapping to a set). A different mapping/hashing function may also be used if an arbitrary number of sets can be reserved for the storage. For example, if, out of 1024 sets, 100 of them are reserved for the storage, a hashing function can be used for normal accesses that can map an address to one of 924 sets, skipping the 100 reserved sets. Likewise, a hashing function can be used for accesses to the storage that can map an address to one of 100 sets. To deallocate one or more sets privileged software may only change the value in the control register to trigger a change in the address-to-set mapping. Also, if desired to help ensure correctness, the contents of the entire cache may optionally be flushed or invalidated, since the address-to-set mapping may have changed, and data may reside in an inappropriate location after the change.

Privileged software (e.g., a driver, system software) may track how much cache space (e.g., sets, ways) has been repurposed and used for the storage versus and how much of that has been actually allocated to various running processes. If software requests space in the storage, and that request can be granted based on existing free space, then this may not trigger a reconfiguration of any kind, and the privileged software may just return a pointer to a location (e.g., the start of a buffer) in the storage. Or, if the storage has insufficient space, then the privileged software may interact with hardware to increase the size of the storage. The privileged software may also optionally track use of the storage on a per-process or per-thread basis, and may optionally impose limits on how much a given process can have allocated (e.g., for fairness). These limits may be static or may be configured by the privileged software. The privileged software may also optionally track usage and optionally dynamic resize the storage during runtime if it is beneficial for some reason to change the amount of storage. This will be discussed in more detail further below. This tracking and configuration data may be included in one or more control registers, records in memory (optionally cached for faster access), a dedicated data structure in hardware or in memory, and so on. Circuitry or other logic may also be included to handle the storage (e.g., read from the storage, write to the storage, flush the storage, zero the storage, etc.).

In some embodiments, Intel® Data Direct I/O Technology (Intel® DDIO) and/or Intel® Resource Director Technology (Intel® RDT) I/O may be used in conjunction with creating chains of accelerators. These technologies are useful for allocation of portions of a cache to devices and cores and may be leveraged and extended to allocate storage in a cache for use in an accelerator chain. Conventionally, these technologies do not have features to chain two or more accelerators into a chain of accelerators. But, these technologies may be extended for this, such as, for example, by extending them to consider bandwidth of multiple accelerators, etc. For example, software that manages the chain of accelerators may work with these technologies to implement chain specific aspects (e.g., determine the amount of storage space needed for the chain).

Several different addressing models may optionally be used to address data in such storage repurposed from a cache. In some embodiments, a "scratchpad-like" addressing model may optionally be used. At configuration/allocation time, for a given operation in the chain, the producer and consumer accelerators may record which cache they are respectively writing to or reading from and the starting location in that cache for the respective output or input buffer. In some embodiments, to access data, an accelerator may send a "buffer read/write request" to let the cache know that this is not a conventional access. It may address the specific cache (and slice) hosting the buffer of interest, and a specific location of the buffer (e.g., byte 247 of the buffer). The cache may map that specific location to a unique location in the buffer.

In other embodiments, a "memory mapped" addressing model may optionally be used. Hardware may reserve a portion of the physical address space in the system and rely on the operating system to map each buffer to part of that space. The hardware may be enhanced to automatically direct read/write requests to that portion of the address space to the appropriate cache, indicate to the cache that this was a buffer access, and translate the address to an offset into the specific buffer being accessed. This can be done multiple ways, but one example would be via a table or other data structure (e.g., held in hardware or in memory) that stores the size of each chained operation buffer (e.g., buffer 0 is 1 KB, buffer 1 is 4 KB). If an access is to the physical address region for buffers, the hardware may check which buffer the access is to and the offset into that buffer using that information. More specifically, for a request to address X+2024, where X is the start address of the buffer region of physical memory, this goes to buffer 1, offset 1000. If the relevant cache is a shared and physically distributed one, the hardware may also know in which slice to find each buffer. This information may also be in the same table or other data structure (e.g., the table may hold entries mapping each buffer to a (pair of a size and a slice). The hardware may ignore the usual address hashing function that maps a physical address to a specific cache slice, and directly use the slice mapping or identifier from the table. In other embodiments, when mapping virtual addresses to host physical addresses for these staging buffers, the address allocation scheme may take the physical locality aspect into consideration when setting up virtual address-to-host physical address mappings. As with the scratchpad-like addressing model, for each operation, the producer and consumer may record the starting location in this memory space for the respective output or input buffer and uses addresses relative to that. Optionally, if allowed, system software may directly read/write the buffers from other devices that have permission to that portion of the physical address space. This may allow system software, for example, to pause a chain of operations and migrate the buffers to main memory (or migrate them back) on a context switch by reading the contents and copying them to main memory (e.g., pages in the application virtual address space).

In other embodiments, a “memory map buffer to application virtual address space” addressing model may optionally be used. This may be similar to the memory mapped option, but additionally, each page of the buffer may be mapped to the application’s virtual address space. Accelerators could address data in the buffer using physical addresses or virtual addresses.

As discussed above (e.g., for FIG. 17), when initially creating chains of accelerators, the characteristics of accelerator resources and storage may be evaluated, and the accelerator resources and storage may be selected and allocated so that they are sufficiently compatible with one another and suitable for the anticipated workload (e.g., the overall data throughput or bandwidth). This may be done based on characteristics advertised or otherwise provided for the accelerator resources.

When used as stand-alone or individual accelerator resources (i.e., not used in a chain of accelerators), the accelerator resources are often able to provide their advertised characteristics (e.g., bandwidth) reasonably well. This is partly because the stand-alone or individual accelerator resources have relatively high control over the factors that affect their bandwidth, and are not significantly influenced by other components. The accelerators may even allocate use of internal resources and arbitrate for use of system memory in order to help provide these characteristics. As a result, if software (e.g., for a single process space identifier (PASID) or Virtual Machine (VM) using multiple PASIDs) is assigned exclusive use of an accelerator resource (e.g., an accelerator, physical set of accelerator resources, virtual set of accelerator resources), it can usually reasonably rely on the bandwidth advertised by that accelerator engine and correspondingly achieve reasonably reliable performance.

However, additional challenges present themselves when accelerator resources and storage are included in chains of accelerators. For one thing, other accelerator resources and storage may significantly influence or impact the operation of the accelerator resources. For example, if there is a bottleneck or other data flow problem before the accelerator resources it may cause the accelerator resources to experience starvation or if there is a bottleneck or other data flow problem after the accelerator resources it may cause the accelerator resources to experience backpressure. For another thing, the accelerator resources are often not able to adequately take into account the influence or impact the other accelerator resources and storage will have on their characteristics.

Accordingly, even if the accelerator resources and storage are initially selected and allocated so that they are sufficiently compatible with one another and suitable for the anticipated workload, at times the chain of accelerators may experience unstable data flows and/or unreliable performance. Embodiments disclosed further below may be used to help monitor the operation of a chain of accelerators, identify bottlenecks, and change the chain of accelerators to help remove the bottlenecks and/or achieve more stable data flows and/or more reliable performance.

Figure 25:
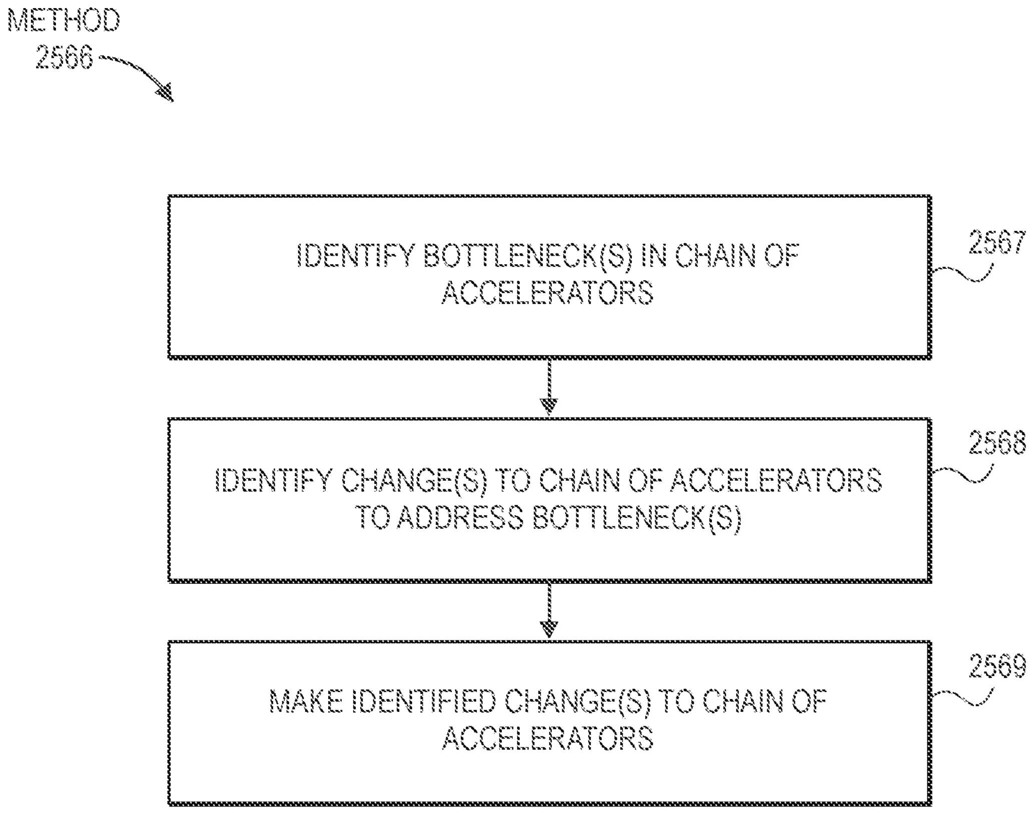
FIG. 25 is a block flow diagram of an embodiment of a method of identifying bottleneck(s) in a chain of accelerators, identifying change(s) to the chain of accelerators to help address the bottleneck(s), and making the identified change(s).

FIG. 25 is a block flow diagram of an embodiment of a method 2566 of identifying one or more bottlenecks in a chain of accelerators, identifying one or more changes to the chain of accelerators to help address the bottleneck(s), and making the identified change(s) to the chain of accelerators. Advantageously, the method may help to allow the chain of accelerators to perform chained accelerator operations with more stable bandwidth and/or may help to maintain performance objectives under varying system load conditions. The method may be performed by circuitry or other hardware, firmware, software (e.g., software 1411), or combinations thereof. In some embodiments, the method may be performed by the system 1400. The description and optional details described herein for the system 1400 also optionally apply to the method 2566. Alternatively, the method 2566 may be performed by and/or within a similar or different system, such as other systems disclosed herein.

At block 2567, the method includes identifying one or more bottlenecks in the chain of accelerators. As used herein, a bottleneck broadly represents part of the chain of accelerators (e.g., a set of accelerator resources or a storage) and/or a point in the chained accelerator operation where data flow is congested, hindered, or otherwise less than expected. In some embodiments, identifying the bottleneck (s) may include collecting and analyzing operational data for the chain of accelerators to help identify the bottleneck(s). Suitable examples of such operational data include, but are not limited to, telemetry data, profiling data, performance monitoring data, and the like, and combinations thereof. A few examples of suitable operational data are an indication that a storage is full or empty, a number of times that a storage is full or empty, a number of cycles that a storage is full or empty, and so on. Other examples of suitable operational data include data indicating or useful to determine how often a request for something was made by a set of accelerator resources but was not granted. Different types of requests may be under-serviced and may help to identify bottlenecks. In some embodiments, the operational data may be collected in hardware (e.g., circuitry) of the chain of accelerators. To help identify bottlenecks at different points in the chain of accelerators such operational data may be collected at different points in the chain of accelerator. For example, each of the accelerator resources and storage (or at least most of them dispersed throughout the chain of accelerators) may have data flow counters or other circuitry or logic to collect operational data. In some embodiments, software (e.g., software 1410 or software 1411) may specify how often or when the operation is to be examined for the need for dynamic reallocation (e.g., as an amount of time, as an amount of data processed, etc.).

At block 2568, the method includes identifying one or more changes to the chain of accelerators to help address the identified bottleneck(s). For example, identifying the change (s) may include identifying additional or different accelerator resources to supplant or replace the existing accelerator resources, identifying more storage space in the existing storage or additional or different storage to supplant or replace the existing storage.

To further illustrate, if the bottleneck is caused by a given set of accelerator resources, then identifying the changes may include identifying one or more sets of accelerator resources to supplant or replace the given set of accelerator resources. For example, in FIG. 19A, if Y3 is the bottleneck, then this may include identifying another VDEV (e.g., Y2 or a VDEV of a different accelerator that is also able to perform the same operation as Y3) to supplant or replace the VDEV Y3. As another example (e.g., if no other suitable sets of accelerator resources are available), identifying the changes may include identifying part of a CPU (e.g., a hardware thread or core) to supplant or replace the given set of accelerator resources. The use of the CPU in this way may tend to be less performant but may be appropriate for certain implementations.

In other embodiments, identifying the change(s) to the chain of accelerators may include identifying changes to one or more storage corresponding to the bottleneck(s). For example, in some cases, identifying the change(s) may include identifying a change (e.g., increase) in the amount of storage space allocated for the particular operation or link. For example, in FIG. 19A, if the first storage 1920-1 is implemented using the shared storage 2217 and is determined to be a bottleneck then a larger amount of the shared storage 2217 may be allocated to the first storage 1920-1. As another example, identifying the change(s) may include identifying one or more storage to supplant or replace the existing storage causing the bottleneck. For example, in FIG. 19A, if the first storage 1920-1 is implemented using the dedicated storage 2017-1 and is determined to be a bottleneck, then the storage 2320 may be identified to replace the dedicated storage 2017-1. As another example (e.g., if no other suitable sets of storage are available), identifying the change(s) may include identifying space in system memory to supplant or replace the existing storage causing the bottleneck. The use of system memory in this way may tend to be less performant but may be appropriate for certain implementations.

In some embodiments, the identification of the accelerator resources and/or storage to help alleviate the bottleneck may take into account the location of the accelerator resources and/or storage. For example, the identification may favor accelerator resources and/or storage that are relatively more local to their associated links to the chain as compared to those that are not. Keeping data local to the chain of accelerators has performance, power, and other benefits, as previously described. In other embodiments, for example, if sufficiently local accelerator resources and/or storage are not available to address the bottleneck(s)), then identifying the change(s) may include identifying a new replacement chain of accelerators (e.g., new sets of accelerator resources and storage in a different area of an SoC or on a different SoC) to serve as a replacement for the existing chain of accelerators. Then, the workload may be migrated or otherwise moved to the new replacement chain of accelerators. Moving the workload to a new replacement chain of accelerators in this way may tend to come at a relatively high cost but may be appropriate for certain implementations (e.g., for streaming or otherwise longer running chained operations, if the advantages outweigh the costs, if maintaining bandwidth is critical, etc.).

Referring again to FIG. 25, at block 2569, the method includes implementing or making the identified change(s) to the chain of accelerators. In some embodiments, this may include adding one or more new or additional accelerator resources or storage to the chain of accelerators, and moving part of the active workload to the new or additional accelerator resources or storage. In other embodiments, this may include adding one or more new or additional accelerator resources or storage to the chain of accelerators and removing one or more existing accelerator resources or storage from the chain of accelerators, and moving the active workload to the new or additional accelerator resources or storage. This may represent dynamic remapping of a running workload.

In some embodiments, moving part or all of an active workload may include optionally pausing the workload (e.g., pausing further job submissions for the workload), allow existing work to drain, remapping the set of accelerator resources or storage, and then un-pause the workload. The represents a relatively straightforward approach that relies on workload level pausing (i.e., pausing job submission), draining, and un-pausing. In the case of VDEV, the pausing and un-pausing can be performed through SIOV mechanisms. Draining can also be achieved by approaches similar to those used to drain previously submitted work. One possible drawback with this approach is that draining the work (e.g., from the entire chain of accelerators) may be longer than desired for some implementations. One option to help reduce the drain time is to use an abort flow to cancel in-progress work.

In some embodiments, moving part or all of an active workload may include isolating the particular bottleneck component (e.g., set of accelerator resources or storage), selectively pausing or stalling the port(s) feeding into the particular bottleneck component without stalling the entire workload, allow existing work to drain from the particular bottleneck component, chaining the new or replacement component (e.g., connecting the ports previously feeding into the particular bottleneck component to the new or replacement component), and then un-pausing or un-stalling the ports to allow the workload to flow into the new or replacement component. The draining is done selectively from the particular bottleneck component which may help to reduce the pause time.

To further illustrate certain concepts, consider the following specific examples of identifying bottlenecks and identifying changes to a chain of accelerators to address the bottlenecks. These examples are described for an SIOV VDEV, although the approach may be readily extended to other sets of accelerator resources.

In a first scenario, an accelerator may be overloaded, resulting in a VDEV not being able to get access to enough resources. A VDEV needed item for this first scenario may be an accelerator shared resource (e.g., for example on-device read buffers). This scenario may cover the case that the accelerator has been virtualized across multiple workloads, and utilization of the accelerator is high enough that VDEV-shared resources on the accelerator are not available enough to meet the workload's bandwidth requirements. There may be multiple on-device shared resources that are shared and relied upon by the VDEVs on an accelerator. In some cases, to allow better identification of which resource is limited on the accelerator, operational data may optionally be included for multiple of these resources or optionally on a per-resource basis. In this first scenario, identifying changes to the chain of accelerators may include identifying a replacement VDEV on a different comparable relatively less heavily loaded accelerator. Alternately, the accelerator may have mechanisms available to dedicate more shared resources for our workload. For example, if our workload is not able to get enough read buffer resources, the accelerator may provide a mechanism to reserve read buffer resources for our workload, or give higher priority to our workload requests for read buffer resources.

In a second scenario, an accelerator may not be overloaded, but one of its VDEV may be getting starved of input data. A VDEV needed item for this second scenario may be the input data stream, representing the input data starvation scenario for this VDEV. This scenario may indicate a bottleneck in a different component of the chain upstream of the VDEV. Identifying the bottleneck may include analyze operational data of upstream sets of accelerator resources and storage. If two sets of accelerator resources connected by a storage indicate that the problem is between them, then this may identify the storage as the bottleneck. For example, in FIG. 19A, if Z2 indicates a starvation problem and Y3 indicates a back-pressure problem, then the storage 1920-2 may be identified as the bottleneck. This may indicate that the bottleneck exists upstream, and so this VDEV and accelerator itself is not the bottleneck. Upstream VDEVs may also be analyzed to identify the bottleneck. In this second scenario, identifying changes to the chain of accelerators may potentially include a new storage to supplant or replace an existing storage or increasing an amount of space allocated for the existing storage.

In a third scenario, an accelerator may be unloaded, but a VDEV may be getting back-pressure from its downstream storage. A VDEV needed item for this scenario may be the output data stream, representing the output data buffer back-pressure scenario for this VDEV. This scenario may indicate the VDEV and the accelerator are not the bottleneck. Rather, the bottleneck may exist in a storage or different set of accelerator resources downstream of the VDEV. Downstream VDEVs should be analyzed to identify the bottleneck. In this third scenario, identifying changes to the chain of accelerators may potentially include identifying a different downstream VDEV or storage to supplant or replace the bottleneck VDEV.

In a fourth scenario, an accelerator may be unloaded as a whole, but a specific VDEV itself may be overloaded. If no VDEV needed items are under-serviced, and yet the VDEV is getting low bandwidth, this may indicate that the VDEV itself is not asserting requests fast enough to meet workload bandwidth requirements. This may indicate that the VDEV itself is overloaded. This can happen if multiple workloads have been mapped to this VDEV, and so the workload is not able to get enough service from the VDEV itself as it is too overloaded with servicing multiple workloads. To distinguish request rate between workloads, VDEVs should have a mechanism to filter telemetry on a per-PASID or per-ADI (Assignable Device Interface) basis. ADIs are accelerator job submission interfaces as defined by the SIOV spec, which multiple PASIDs can share. The per-PASID or per-ADI telemetry provides the information required to figure out that while the VDEV may be achieving a high aggregate request rate, the overloaded virtualization is preventing a particular workload from achieving a high request rate and bandwidth rate. In this fourth scenario, identifying changes to the chain of accelerators may potentially include identifying a different VDEV on either the same or a different accelerator to supplant or replace the bottleneck VDEV.

As discussed above, an accelerators bandwidth and processing ability may be affected by other accelerators and storage when that accelerator is incorporated in a chain of accelerators due in part to factors such as backpressure, starvation, and the like. For example, the accelerator may not be able to continue processing further input data if there is insufficient room in the storage that is to be used to store the resulting intermediate data. The dynamic reallocation approaches discussed above are one possible way to help achieve more reliable and stable data flow through the chain of accelerators. Another possible approach is to utilize a communication and control mechanism in the chain of accelerators to allow accelerators to communicate with one another about exchanging data between the accelerators and/or data flow. This may be implemented as a communication port architecture for control of data flow to help to improve data flow through the chain of accelerators. In some embodiments, this may be implemented as a credit-based or availability-based or approach. In other embodiments, this may be implemented as a doorbell-based or interrupt-based storage sharing approach. Both approaches facilitate data transfer data from one accelerator to another but work slightly different. With doorbells or interrupts the sending accelerator can actively inform the receiving accelerator that data is ready for consumption. In this case the receiving accelerator can now actively pull the data from the source, when it has space available to store the data which should be sent. With credits we have a constant stream of information flow and the credits manage if space on the receiving side is available. Further details of such a credit-based approach will be discussed further below.

Figure 26:
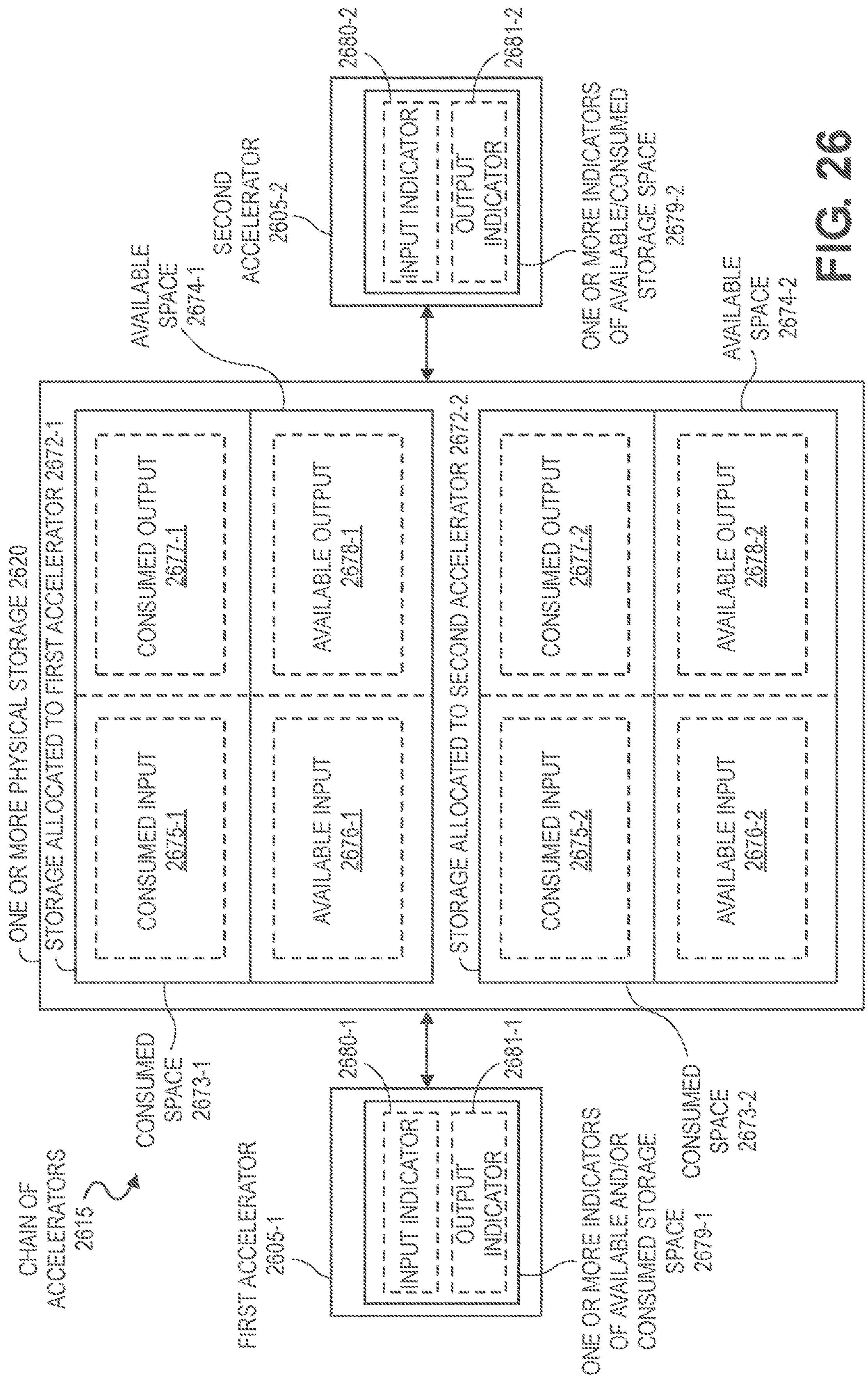
FIG. 26 is a block diagram of an embodiment of data flow control for a chain of accelerators.

FIG. 26 is a block diagram of an embodiment of data flow control for a chain of accelerators 2615. The chain of accelerators may be similar to, or the same as, those described elsewhere herein, and may have similar characteristics and variations. The chain of accelerators may be included on one or more chips, as previously described. The one or more chips may be deployed in systems, such as the system 1400, or other systems disclosed herein.

To avoid obscuring the description, the illustrated chain of accelerators is a simple chain of accelerators that includes a first accelerator 2605-1 and a second accelerator 2605-2 coupled via a single link. In other embodiments, the chain of accelerators may optionally be more complex, as previously described (e.g., may have more accelerators, more complex linking (e.g., some accelerators provide outputs to two or more accelerators and some accelerators receive inputs from two or more accelerators), more than one input and/or output to memory). Also, although the illustrated embodiment describes whole accelerators, the same general approach may instead be applied to sets of physical accelerator resources or sets of virtual accelerator resources (e.g., SIOV VDEV).

The chain of accelerators also includes one or more storage 2620 coupled with the first and second accelerators. The one or more storage is used to provide storage 2672-1 allocated to a first accelerator and storage 2672-2 allocated to a second accelerator. In some embodiments, the one or more storage may be a single storage (e.g., shared storage 2217 of FIG. 17, storage 2320 of FIG. 23, storage 2420 of FIG. 24). In other embodiments, the one or more storage may be a plurality of storage (e.g., storage 2017-1 and 2017-N of FIG. 20, multiple instances of storage 2117-1 of FIG. 21).

The storage allocated to the first accelerator includes both a currently consumed storage space 2673-1 (e.g., already consumed by data of the first accelerator), and a currently available storage space 2674-1 (e.g., currently available to store additional data of the first accelerator). Likewise, the storage allocated to the second accelerator includes both a currently consumed storage space 2673-2 (e.g., already consumed by data of the second accelerator), and a currently available storage space 2674-2 (e.g., currently available to store additional data of the second accelerator).

In some embodiments, the first accelerator may maintain, generate, or otherwise provide one or more indicators of the available storage space 2674-1 and/or the consumed storage space 2673-1. Likewise, in some embodiments, the second accelerator may maintain, generate, or otherwise provide one or more indicators of the available storage space 2674-2 and/or the consumed storage space 2673-2.

In some embodiments, the currently consumed storage space for the first accelerator may optionally be further characterized as consumed input storage space 2675-1 (e.g., already consumed by stored input data for the first accelerator), and consumed output storage space 2677-1 (e.g., already consumed by stored output data of the first accelerator). Also, the currently available storage space for the first accelerator may optionally be further characterized as available input storage space 2676-1 (e.g., available to store additional input data for the first accelerator) and available output storage space 2678-1 (e.g., available to store additional output data of the first accelerator). A dashed line is used to separate the consumed input storage space 2675-1 and the available input storage space 2674-1 from the consumed output storage space 2677-1 and the available output storage space 2678-1 in order to indicate that in some embodiments the input and output may optionally be in different storage.

The currently consumed storage space 2673-2 for the second accelerator may optionally be further characterized as consumed input storage space 2675-2 (e.g., already consumed by stored input data for the second accelerator), and consumed output storage space 2677-2 (e.g., already consumed by stored output data of the second accelerator). Also, the currently available storage space 2674-2 for the second accelerator may optionally be further characterized as available input storage space 2676-2 (e.g., available to store additional input data for the second accelerator) and available output storage space 2678-2 (e.g., available to store additional output data of the second accelerator).

In such embodiments, where such further characterization of the storage according to input and output is used, the indicator(s) 2679-1 may optionally include one or more input indicators 2680-1 to indicate one or more of an amount of the consumed input 2675-1 and/or an amount of the available input 2676-1, and one or more output indicators 2681-1 to indicate one or more of an amount of the consumed output 2677-1 and/or an amount of the available output 2678-1. Likewise, the indicator(s) 2679-2 may optionally include one or more input indicators 2680-2 to indicate one or more of an amount of the consumed input 2675-2 and/or an amount of the available input 2676-2, and one or more output indicators 2681-2 to indicate one or more of an amount of the consumed output 2677-2 and/or an amount of the available output 2678-2.

The one or more indicators 2679-1 of available and/or consumed storage space for the first accelerator and the one or more indicators 2679-2 of available and/or consumed storage space for the second accelerator may be expressed in various different ways. In some cases, these indicators may be expressed as a total amount of storage (e.g., total number of bytes, words, and so on). In other cases, these indicators may be expressed as a number of discrete sets of input and/or output data the storage is able to store.

In some embodiments, the first and second accelerators may message or otherwise communicate with one another to convey or otherwise provide one or more of these indicators. The communication may be handled in hardware, software, or a combination thereof (e.g., handled automatically in hardware, a software framework that defines a communication mechanism between accelerators together with underlying implementation mechanisms for how that gets mapped to hardware mechanisms or capabilities). In some embodiments, the first accelerator and/or the second accelerator may make determinations related to data flow and/or exchanging data with the other accelerator based at least in part on one or more of these indicators. For example, the first accelerator may use the input indicator 2680-2 of the second accelerator to decide if its output data can be pushed or otherwise provided to the second accelerator. As another example, the second accelerator may use the output indicator 2681-1 of the first accelerator and its own input indicator 2680-2 to determine whether it can pull additional output data from the first accelerator.

Figure 27:
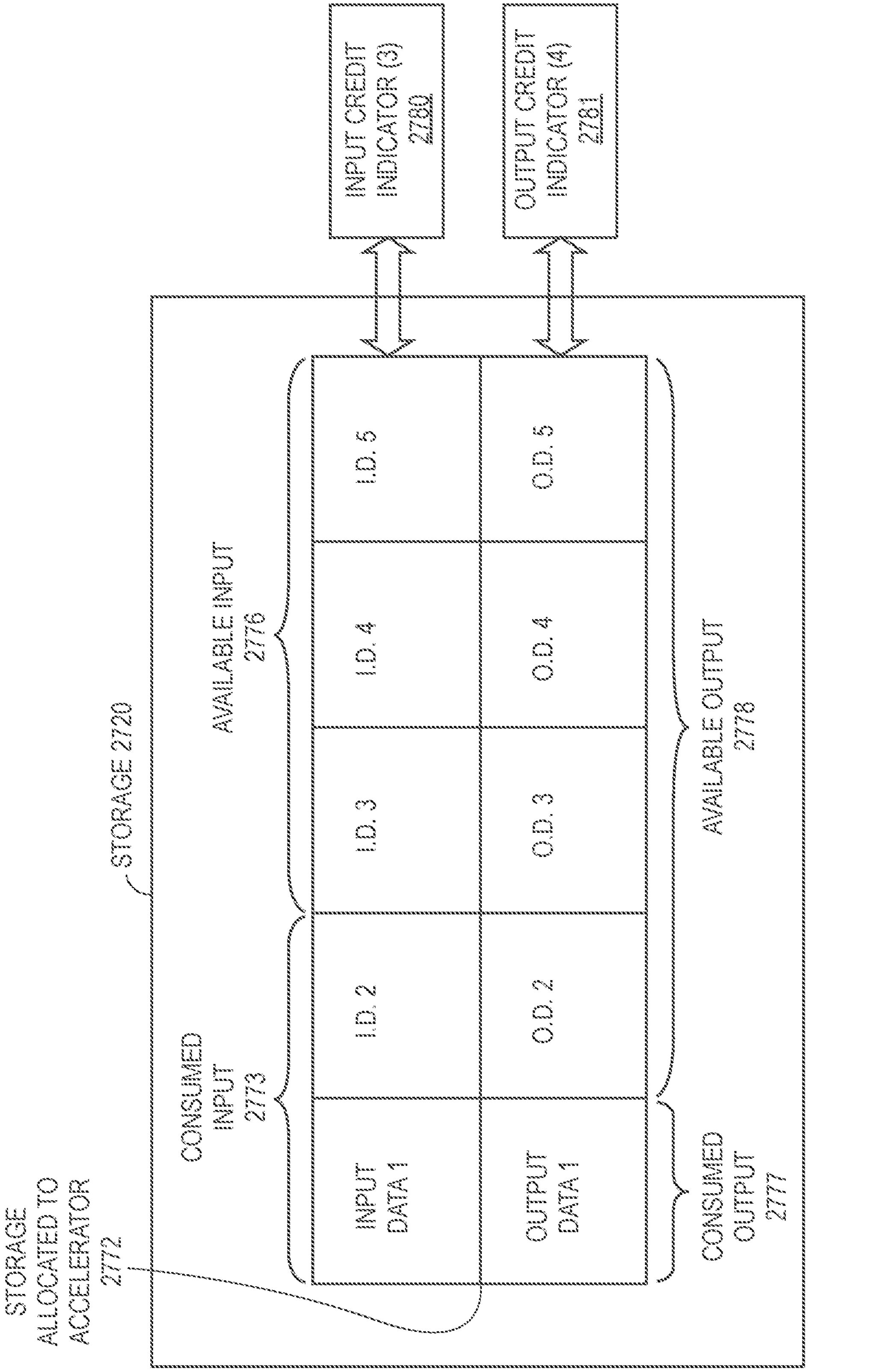
FIG. 27 is a block diagram of an example embodiment of storage allocated to an accelerator of a chain of accelerators.

FIG. 27 is a block diagram of an example embodiment of storage 2720 allocated to an accelerator of a chain of accelerators. In this example, the storage allocated to the accelerator is divided into a first part to store input data for the accelerator, and a second part to store output data for the accelerator. Specifically, input data (I.D.) 1, input data 2, input data 3, input data 4, and input data 5 represent storage locations allocated to store input data. Likewise, output data (O.D.) 1, output data 2, output data 3, output data 4, and output data 5 represent storage locations allocated to store output data.

In this embodiment, each of the input data storage locations (e.g., ID 1, ID 2, etc.) has a fixed size. Also, each of the output data storage locations (e.g., OD 1, OD 2, etc.) has a fixed size. By way of example, the input data 1 may represent storage locations sized to store a chunk or other discrete set of input data that when processed by the accelerator produces output data that the storage locations of output data 1 is sized to store, and so for the other input and output storage locations. The amount of storage space allocated to store input data for the accelerator may therefore determine the number of chunks or other discrete sets of input data that the accelerator can receive and store concurrently or at the same time. Similarly, the amount of storage space allocated to store output data for the accelerator may therefore determine the number of chunks or other discrete sets of output data that the accelerator can generate and store concurrently or at the same time.

In this illustrative example, input data 1 and input data 2 represent consumed input storage locations currently/already storing input data for the accelerator, whereas input data 3, input data 4, and input data 5 represent available input storage locations currently available to store additional input data. Continuing, output data 1 represents the consumed output storage locations currently/already storing output data for the accelerator, whereas output data 2, output data 3, output data 4, and output data 5 represent available output storage locations currently available to store additional output data.

In some embodiments, the accelerator may maintain, generate, or otherwise provide an input credit indicator 2780 and an output credit indicator 2781. In the illustrated example, the input credit indicator may indicate three (3) credits available to indicate that input data 3, input data 4, and input data 5 represent available input storage locations currently available to store three additional chunks or discrete sets of additional input data. Continuing, the output credit indicator may indicate four (4) credits available to indicate that output 2, output data 3, output data 4, and output data represent available output storage locations currently available to store four additional chunks or discrete sets of output data. The input and output credit indicators are example embodiments of indicators of available storage space. In addition, the input and output credit indicators are quantitative indicators because they do not just indicate that there is available storage space but they quantitatively indicate how much available storage space there is. Alternatively, other embodiments may be based on doorbells instead of credits.

Figure 28:
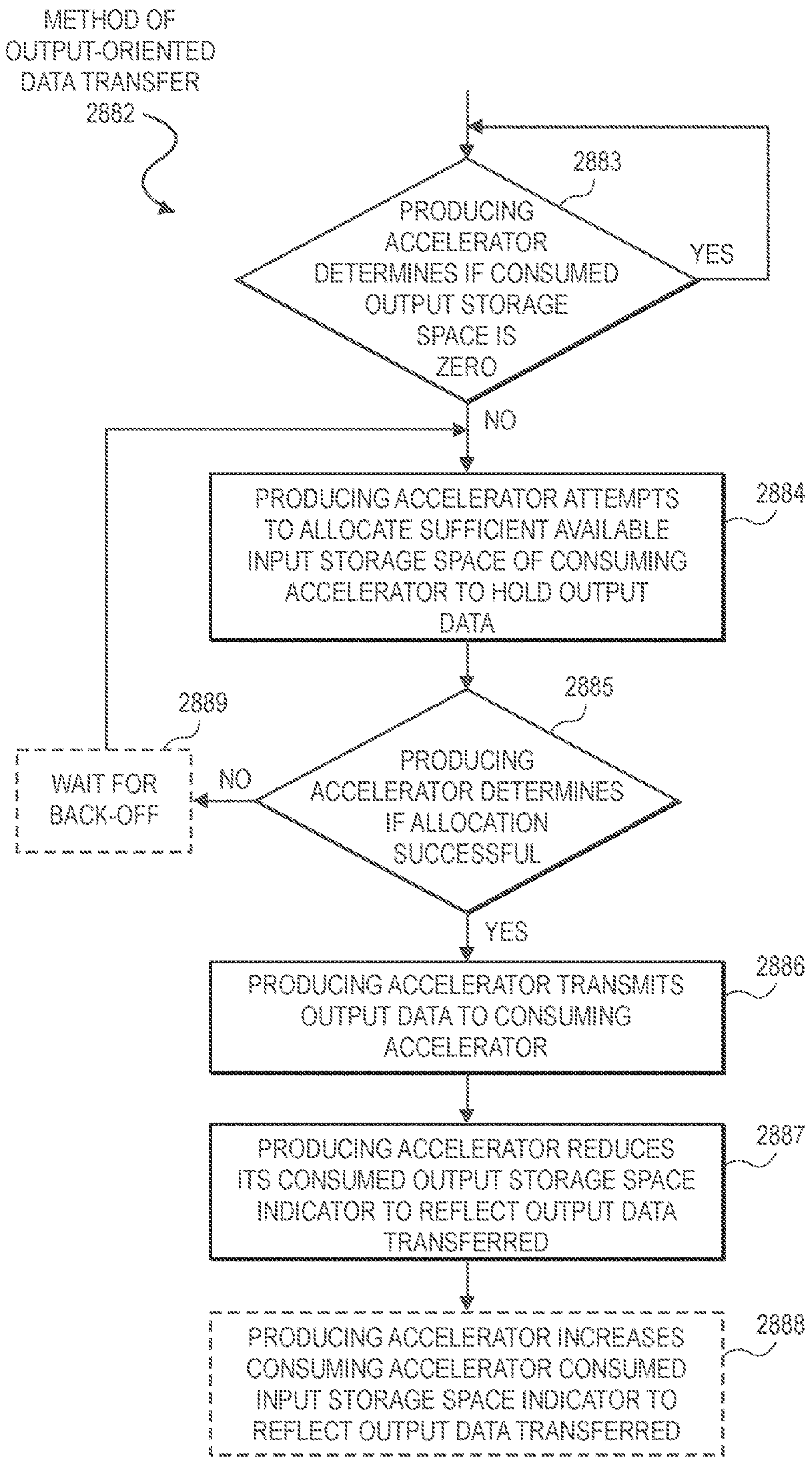
FIG. 28 is a block flow diagram of an example embodiment of an output-oriented method of data transfer to be used in a chain of accelerators.

FIG. 28 is a block flow diagram of an example embodiment of a push or output-oriented method 2882 of data transfer to be used in a chain of accelerators. In some embodiments, the method may be performed by a producing (e.g., preceding) accelerator in a chain of accelerators to attempt to push or otherwise provide its output data to a consuming (e.g., subsequent) accelerator of the chain of accelerators.

At block 2883, the producing accelerator may determine if its consumed output storage space is zero. If "yes" is the determination, the method may revisit block 2883. Alternatively, if "no" is the determination, the method may advance to block 2884. At block 2884, the producing accelerator may attempt to allocate sufficient input storage space of the consuming accelerator to hold a set of output data. At block 2885, the producing accelerator may determine if the allocation is successful. If "no" is the determination, the method may advance to optional block 2889. At block 2889, the producing accelerator may optionally wait/delay for a period of time and/or until receipt of a signal from the consuming accelerator that space has been freed, before retrying, or may optionally perform a back-off approach before retrying, and then revisit block 2884. This is optional but may help to avoid overwhelming the accelerators with too frequent and/or unnecessary checking.

Alternatively, if "yes" is the determination at block 2885, the method may advance to block 2886. At block 2886, the producing accelerator may push, transmit, or otherwise provide the set of output data to the consuming accelerator. At block 2887, the producing accelerator may reduce its consumed output storage space indicator to reflect the set of output data transferred (e.g., to reflect the freed-up storage space). At block 2888, the producing accelerator may optionally increase the consuming accelerators consumed input storage space indicator to reflect the set of output data transferred (e.g., to reflect the consumed storage space). Alternatively, the consuming accelerator may optionally increase its own consumed input storage space indicator.

Figure 29:
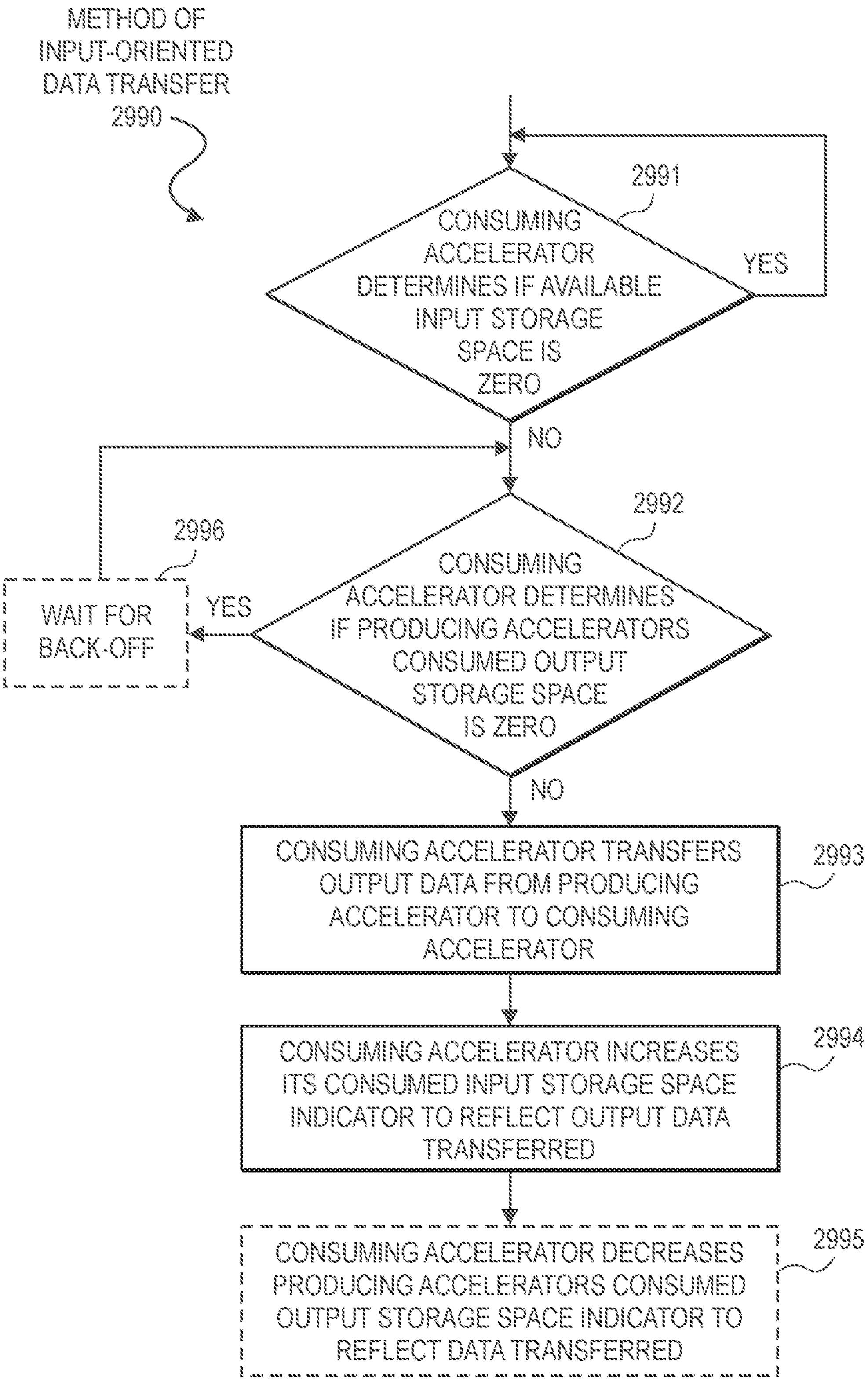
FIG. 29 is a block flow diagram of an example embodiment of an input-oriented method of data transfer to be used in a chain of accelerators.

FIG. 29 is a block flow diagram of an example embodiment of a pull or input-oriented method 2990 of data transfer to be used in a chain of accelerators. In some embodiments, the method may be performed by a consuming (e.g., subsequent) accelerator in a chain of accelerators to attempt to pull or otherwise receive its output data from a producing (e.g., preceding) accelerator of the chain of accelerators.

At block 2991, the consuming accelerator may determine if its available input storage space is zero. If "yes" is the determination, the method may revisit block 2991. Alternatively, if "no" is the determination, the method may advance to block 2992. At block 2992, the consuming accelerator may determine if the preceding accelerators consumed output storage space is zero. If "yes" is the determination, the method may advance to optional block 2996. At block 2996, the consuming accelerator may optionally wait/delay for a period of time and/or until receipt of a signal from the preceding/producing accelerator that its consumed output is non-zero, before retrying, or may optionally perform a back-off approach before retrying, and then revisit block 2992. This is optional but may help to avoid overwhelming the accelerators with too frequent and/or unnecessary checking.

Alternatively, if "no" is the determination at block, the method may advance to block 2993. At block 2993, the consuming accelerator may pull, otherwise transfer, or otherwise receive output data from the producing accelerator. At block 2994, the consuming accelerator may increase its consumed input storage space indicator to reflect the set of output data transferred (e.g., to reflect the consumed storage space). At block 2995, the consuming accelerator may optionally decrease the producing accelerators consumed output storage space indicator to reflect the set of output data transferred (e.g., to reflect the freed-up storage space). Alternatively, the producing accelerator may optionally decrease its own consumed output storage space indicator.

Approaches described above can be extended to multiple outputs and/or multiple inputs. In some embodiments, in order to promote fairness and to help avoid starvation, available storage space may be allocated in a fair, distributed, or balanced fashion. In some cases, available storage space may be allocated statically and equally among the immediately connected accelerators. In other cases, available storage space may be allocated statically among the communication partners but in amounts that are based on the rate of compute of the various immediately connected accelerators (e.g., slower accelerators may be allocated less than faster accelerators). In still other cases, available storage space may be allocated dynamically based on real time data (e.g., telemetry data or performance monitoring data exchanged between accelerators) to help reduce starvation, backpressure, or improve data throughput. In still other cases, available storage space may be allocated based on control flow explicitly exposed in the chained operation/DAG that influences the route of the data (e.g., if the output of accelerator A is negative, send it to accelerator B, else send it to accelerator C together with a mechanism to help reduce starvation, backpressure, or improve data throughput through such dynamic allocation of available storage space.

In some embodiments, application-informed selection of one of two or more consuming accelerators may also be performed. If two or more consuming accelerators are suitable for processing output data (e.g., even if they are not exactly the same but are suitable), then selection of one of the two accelerators to process the output data may be based at least in part on their input and/or output indicators. For example, a consuming accelerator with a relatively higher available input accelerator may optionally be selected.

In some embodiments, in addition to the current indicators mentioned above, accelerators may also communicate "distress messages or signals." The distress messages or signals may represent indicators of repeat or reoccurring available input and/or available output status. For example, an accelerator may provide a distress message or signal if it repeatedly has low available input and/or low available output indicators. This may help to notify another accelerator (e.g., a preceding/producing accelerator) so that it can take preventative actions, such as by slowing its rate, sending its data to a different accelerator, and so on. These distress signals may also be incorporated in the re-try algorithms or may be propagated to other accelerators that are not immediately adjacent to the accelerator sending the message/signal.

Components, features, and details described for any of the apparatus disclosed herein may optionally apply to any of the methods disclosed herein, which in embodiments may optionally be performed by and/or with such processors.

Any of the chains of accelerators or chips described herein in embodiments may optionally be included in any of the systems disclosed herein. Any of the chains of accelerators disclosed herein may optionally be included on a chip with any of the GPUs disclosed herein.

In the description and claims, the terms "coupled" and/or "connected," along with their derivatives, may have be used. These terms are not intended as synonyms for each other. Rather, in embodiments, "connected" may be used to indicate that two or more elements are in direct physical and/or electrical contact with each other. "Coupled" may mean that two or more elements are in direct physical and/or electrical contact with each other. However, "coupled" may also mean that two or more elements are not in direct contact with each other, but yet still co-operate or interact with each other. For example, an execution unit may be coupled with a register and/or a decode unit through one or more intervening components. In the figures, arrows are used to show connections and couplings.

The components disclosed herein and the methods depicted in the preceding figures may be implemented with logic, modules, or units that includes hardware (e.g., transistors, gates, circuitry, etc.), firmware (e.g., a non-volatile memory storing microcode or control signals), software (e.g., stored on a non-transitory computer readable storage medium), or a combination thereof. In some embodiments, the logic, modules, or units may include at least some or predominantly a mixture of hardware and/or firmware potentially combined with some optional software.

In the description above, specific details have been set forth in order to provide a thorough understanding of the embodiments. However, other embodiments may be practiced without some of these specific details. The scope of the invention is not to be determined by the specific examples provided above, but only by the claims below. In other instances, well-known circuits, structures, devices, and operations have been shown in block diagram form and/or without detail in order to avoid obscuring the understanding of the description. Where considered appropriate, reference numerals, or terminal portions of reference numerals, have been repeated among the figures to indicate corresponding or analogous elements, which may optionally have similar or the same characteristics, unless specified or clearly apparent otherwise.

Certain operations may be performed by hardware components, or may be embodied in machine-executable or circuit-executable instructions, that may be used to cause and/or result in a machine, circuit, or hardware component (e.g., a processor, portion of a processor, circuit, etc.) programmed with the instructions performing the operations. The operations may also optionally be performed by a combination of hardware and software. A processor, machine, circuit, or hardware may include specific or particular circuitry or other logic (e.g., hardware potentially combined with firmware and/or software) is operative to execute and/or process the instruction and store a result in response to the instruction.

Some embodiments include an article of manufacture (e.g., a computer program product) that includes a machine-readable medium. The medium may include a mechanism that provides, for example stores, information in a form that is readable by the machine. The machine-readable medium may provide, or have stored thereon, an instruction or sequence of instructions, that if and/or when executed by a machine are operative to cause the machine to perform and/or result in the machine performing one or operations, methods, or techniques disclosed herein.

In some embodiments, the machine-readable medium may include a tangible and/or non-transitory machine-readable storage medium. For example, the non-transitory machine-readable storage medium may include a floppy diskette, an optical storage medium, an optical disk, an optical data storage device, a CD-ROM, a magnetic disk, a magneto-optical disk, a read only memory (ROM), a programmable ROM (PROM), an erasable-and-programmable ROM (EPROM), an electrically-erasable-and-programmable ROM (EEPROM), a random access memory (RAM), a static-RAM (SRAM), a dynamic-RAM (DRAM), a Flash memory, a phase-change memory, a phase-change data storage material, a non-volatile memory, a non-volatile data storage device, a non-transitory memory, a non-transitory data storage device, or the like. The non-transitory machine-readable storage medium does not consist of a transitory propagated signal. In some embodiments, the storage medium may include a tangible medium that includes solid-state matter or material, such as, for example, a semiconductor material, a phase change material, a magnetic solid material, a solid data storage material, etc. Alternatively, a non-tangible transitory computer-readable transmission media, such as, for example, an electrical, optical, acoustical or other form of propagated signals—such as carrier waves, infrared signals, and digital signals, may optionally be used.

Examples of suitable machines include, but are not limited to, processors, accelerators, digital logic circuits, an integrated circuits, chips, system-on-chips, computer systems, and other electronic devices. Examples of such computer systems or electronic devices include, but are not limited to, desktop computers, laptop computers, smartphones, servers, network devices (e.g., routers and switches), and the like.

Reference throughout this specification to "one embodiment," "an embodiment," "one or more embodiments," "some embodiments," for example, indicates that a particular feature may be included in the practice of the invention but is not necessarily required to be. Similarly, in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects lie in less than all features of a single disclosed embodiment. Thus, the claims following the Detailed Description are hereby expressly incorporated into this Detailed Description, with each claim standing on its own as a separate embodiment of the invention.

EXAMPLE EMBODIMENTS

The following examples pertain to further embodiments. Specifics in the examples may be used anywhere in one or more embodiments.

Example 1 is a system-on-a-chip (SoC) or other apparatus including a first accelerator having support for a chained accelerator operation. The first accelerator to be controlled as part of the chained accelerator operation to access an input data from a source memory location in system memory, process the input data, generate first intermediate data, and store the first intermediate data to a storage. The apparatus also includes a second accelerator having support for the chained accelerator operation. The second accelerator to be controlled as part of the chained accelerator operation to receive the first intermediate data from the storage, without the first intermediate data having been sent to the system memory, process the first intermediate data, and generate additional data.

Example 2 includes the apparatus of Example 1, further including the storage, in which the storage corresponds to, and is dedicated for use by, at least a portion of one of the first and second accelerators.

Example 3 includes the apparatus of any one of Examples 1 to 2, in which the storage corresponds to, and is dedicated for use by, all of said one of the first and second accelerators.

Example 4 includes the apparatus of any one of Examples 1 to 2, in which the storage corresponds to, and is dedicated for use by, only a subset of accelerator resources of said one of the first and second accelerators.

Example 5 includes the apparatus of any one of Examples 1 to 2, in which the storage corresponds to, and is dedicated for use by, only a subset of virtual accelerator resources of said one of the first and second accelerators.

Example 6 includes the apparatus of any one of Examples 1 to 5, further including a first connection from the first accelerator to the storage, and a second connection from the second accelerator to the storage.

Example 7 includes the apparatus of Example 1, further including the storage, in which the storage corresponds to, and is dedicated for use by, at least a portion of the first accelerator, at least a portion of the second accelerator, and at least a portion of each of one or more additional accelerators.

Example 8 includes the apparatus of Example 1, further including a cache, and circuitry to repurpose a first portion of the cache for the storage, optionally in which the cache is to apply a cache replacement policy to evict cache lines from a second portion of the cache but not the first portion of the cache for the storage.

Example 9 includes the apparatus of Example 8, in which the cache is optionally one of a lowest-level cache in a cache hierarchy of a central processing unit (CPU) and a shared cache in the cache hierarchy of the CPU.

Example 10 includes the apparatus of any one of Examples 8 to 9, in which the cache is a distributed cache having a plurality of distributed cache portions, and in which the first portion of the cache is in a first of the distributed cache portions.

Example 11 includes the apparatus of any one of Examples 8 to 10, optionally in which distributed cache does not have any distributed cache portions closer to the first accelerator than the first distributed cache portion.

Example 12 includes the apparatus of any one of Examples 8 to 11, in which the cache is an input/output (I/O) cache.

Example 13 includes the apparatus of any one of Examples 1 to 12, in which one of the first and second accelerators includes a first set of physical accelerator resources and a second set of physical accelerator resources, and in which the first set of physical accelerator resources, but not the second set of physical accelerator resources, is to be controlled as part of the chained accelerator operation.

Example 14 includes the apparatus of any one of Examples 1 to 13, in which one of the first and second accelerators includes a first set of virtual accelerator resources and a second set of virtual accelerator resources, and in which the first set of virtual accelerator resources, but not the second set of virtual accelerator resources, is to be controlled as part of the chained accelerator operation.

Example 15 includes the apparatus of any one of Examples 1 to 14, in which the additional data is second intermediate data, in which the second accelerator is to be controlled as part of the chained accelerator operation to store the second intermediate data to a second storage, and further including a third accelerator having support for the chained accelerator operation, the third accelerator to be controlled as part of the chained accelerator operation to receive the second intermediate data from the storage, without the second intermediate data having been sent to the system memory, process the second intermediate data, and generate additional data.

Example 16 is a method including performing operations of a chained accelerator operation with a first accelerator, including accessing an input data from a source memory location in system memory, processing the input data, generating first intermediate data, and storing the first intermediate data to a storage. The method also includes performing operations of the chained accelerator operation with a second accelerator, including receiving the first intermediate data from the storage, without the first intermediate being sent to the system memory, processing the first intermediate data, and generating additional data.

Example 17 includes the method of Example 16, in which storing the first intermediate data to a storage includes storing the first intermediate data to the storage that corresponds to, and is dedicated for use by, at least a portion of one of the first and second accelerators.

Example 18 includes the method of Example 17, in which storing the first intermediate data to a storage includes storing the first intermediate data to the storage that corresponds to, and is dedicated for use by, only a subset of virtual accelerator resources of said one of the first and second accelerators.

Example 19 includes the method of Example 16, in which storing the first intermediate data to a storage includes storing the first intermediate data to the storage that corresponds to, and is dedicated for use by, at least a portion of the first accelerator, at least a portion of the second accelerator, and at least a portion of each of one or more additional accelerators.

Example 20 includes the method of Example 16, further including repurposing a first portion of a cache for the storage, and applying a cache replacement policy to evict cache lines from a second portion of the cache optionally without applying the cache replacement policy to the first portion of the cache for the storage.

Example 21 includes the method of Example 20, in which said repurposing the first portion of the cache includes optionally repurposing the first portion of one of a lowest-level cache in a cache hierarchy of a central processing unit (CPU) and a shared cache in the cache hierarchy of the CPU.

Example 22 includes the method of Example 20, in which the cache is optionally an input/output (I/O) cache.

Example 23 includes at least one non-transitory machine-readable storage medium, the at least one non-transitory machine-readable storage medium storing instructions that, if performed by a machine, are to cause the machine to perform operations including to perform operations of a chained accelerator operation with a first accelerator, including to access an input data from a source memory location in system memory, process the input data, generate first intermediate data, and store the first intermediate data to a storage. The operations also include to perform operations of a chained accelerator operation with a second accelerator, including to receive the first intermediate data from the storage, without the first intermediate having been sent to the system memory, process the first intermediate data, and generate additional data.

Example 24 includes the at least one non-transitory machine-readable storage medium of Example 23, in which the instructions that, if performed by the machine, are to cause the machine to store the first intermediate data to a storage further comprise instructions that, if performed by the machine, are to cause the machine to store the first intermediate data to a first portion of a cache that has been repurposed for the storage, and optionally in which a cache eviction algorithm used for another portion of the cache is not used on the first portion of the cache.

Example 25 includes the at least one non-transitory machine-readable storage medium of Example 23, in which the instructions that, if performed by the machine, are to cause the machine to store the first intermediate data to a storage further comprise instructions that, if performed by the machine, are to cause the machine to store the first intermediate data to the storage that corresponds to, and is dedicated for use by, at least a portion of one of the first and second accelerators.

Example 26 includes an apparatus to perform the method of any one of Examples 16 to 22.

Example 27 includes an apparatus including means for performing the method of any one of Examples 16 to 22.

Example 28 includes an apparatus including any combination of circuitry, logic, modules, or means for performing the method of any one of Examples 16 to 22.

What is claimed is:

1. An apparatus comprising:

a first accelerator on a first chip, the first accelerator to receive an instruction, the instruction to indicate a chained accelerator operation, to indicate a source memory location in system memory, and to indicate a destination memory location in the system memory, the first accelerator to be controlled based on the instruction to implement the chained accelerator operation, including to access an input data from the source memory location in the system, memory indicated by the instruction, process the input data, generate first intermediate data, and store the first intermediate data to a storage; and a second accelerator on a second chip, the second accelerator having support for the chained accelerator operation, the second accelerator to be controlled based on the instruction to implement the chained accelerator operation to receive the first intermediate data from the storage, without the first intermediate data having been sent to the system memory, process the first intermediate data, generate additional data, and store the additional data to the destination memory location indicated by the instruction.

2. The apparatus of claim 1, further comprising the storage, wherein the storage corresponds to, and is dedicated for use by, at least a portion of one of the first and second accelerators.

3. The apparatus of claim 2, wherein the storage corresponds to, and is dedicated for use by, all of said one of the first and second accelerators.

4. The apparatus of claim 2, wherein the storage corresponds to, and is dedicated for use by, only a subset of accelerator resources of said one of the first and second accelerators.

5. The apparatus of claim 2, wherein the storage corresponds to, and is dedicated for use by, only a subset of virtual accelerator resources of said one of the first and second accelerators.

6. The apparatus of claim 2, further comprising:

a first connection from the first accelerator to the storage; and a second connection from the second accelerator to the storage.

7. The apparatus of claim 1, further comprising the storage, wherein the storage corresponds to, and is dedicated for use by, at least a portion of the first accelerator, at least a portion of the second accelerator, and at least a portion of each of one or more additional accelerators.

8. The apparatus of claim 1, further comprising:

a cache; and circuitry to repurpose a first portion of the cache for the storage, wherein the cache is to apply a cache replacement policy to evict cache lines from a second portion of the cache but not the first portion of the cache for the storage.

9. The apparatus of claim 8, wherein the cache is one of a lowest-level cache in a cache hierarchy of a central processing unit (CPU) and a shared cache in the cache hierarchy of the CPU.

10. The apparatus of claim 8, wherein the cache is a distributed cache having a plurality of distributed cache portions, and wherein the first portion of the cache is in a first of the distributed cache portions.

11. The apparatus of claim 10, wherein distributed cache does not have any distributed cache portions closer to the first accelerator than the first distributed cache portion.

12. The apparatus of claim 8, wherein the cache is an input/output (I/O) cache.

13. The apparatus of claim 1, wherein one of the first and second accelerators includes a first set of physical accelerator resources and a second set of physical accelerator resources, and wherein the first set of physical accelerator resources, but not the second set of physical accelerator resources, is to be controlled based on the instruction to implement the chained accelerator operation.

14. The apparatus of claim 1, wherein one of the first and second accelerators includes a first set of virtual accelerator resources and a second set of virtual accelerator resources, and wherein the first set of virtual accelerator resources, but not the second set of virtual accelerator resources, is to be controlled based on the instruction to implement the chained accelerator operation.

15. The apparatus of claim 1, wherein the additional data is second intermediate data, wherein the second accelerator is to be controlled based on the instruction to implement the chained accelerator operation to store the second intermediate data to a second storage, and further comprising a third accelerator having support for the chained accelerator operation, the third accelerator to be controlled based on the instruction to implement the chained accelerator operation to receive the second intermediate data from the storage, without the second intermediate data having been sent to the system memory, process the second intermediate data, and generate additional data.

16. A method comprising:

receiving, at a first accelerator on a first chip, an instruction indicating a chained accelerator operation to implement a Directed Acyclic Graph (DAG), a source memory location in system memory, and a destination memory location in the system memory;

performing, based on the instruction, operations of the chained accelerator operation with the first accelerator, including accessing an input data from the source memory location in the system memory, processing the input data, generating first intermediate data, and storing the first intermediate data to a storage; and performing, based on the instruction, operations of the chained accelerator operation with a second accelerator, accelerator on a second chip, including receiving the first intermediate data from the storage, without the first intermediate data being sent to the system memory, processing the first intermediate data, generating additional data, and storing the additional data to the destination memory location.

17. The method of claim 16, wherein storing the first intermediate data to a storage comprises storing the first intermediate data to the storage that corresponds to, and is dedicated for use by, at least a portion of one of the first and second accelerators.

18. The method of claim 17, wherein storing the first intermediate data to a storage comprises storing the first intermediate data to the storage that corresponds to, and is dedicated for use by, only a subset of virtual accelerator resources of said one of the first and second accelerators.

19. The method of claim 16, wherein storing the first intermediate data to a storage comprises storing the first intermediate data to the storage that corresponds to, and is dedicated for use by, at least a portion of the first accelerator, at least a portion of the second accelerator, and at least a portion of each of one or more additional accelerators.

20. The method of claim 16, further comprising:

repurposing a first portion of a cache for the storage; and applying a cache replacement policy to evict cache lines from a second portion of the cache without applying the cache replacement policy to the first portion of the cache for the storage.

21. The method of claim 20, wherein said repurposing the first portion of the cache comprises repurposing the first portion of one of a lowest-level cache in a cache hierarchy of a central processing unit (CPU) and a shared cache in the cache hierarchy of the CPU.

22. The method of claim 20, wherein the cache is an input/output (I/O) cache.

23. An apparatus comprising:

a first accelerator to have a first set of virtualized accelerator resources configured to be used by a first virtual machine and a second set of virtualized accelerator resources configured to be used by a second virtual machine, the first set of virtualized accelerator resources, but not the second set of virtualized accelerator resources, to be controlled according to a chained accelerator operation to access an input data from a source memory location in system memory, process the input data, generate first intermediate data, and store the first intermediate data to a storage; and a second accelerator to have a third set of virtualized accelerator resources configured to be used by the first virtual machine and a fourth set of virtualized accelerator resources configured to be used by a third virtual machine, the third set of virtualized accelerator resources, but not the fourth set of virtualized accelerator resources, to be controlled according to the chained accelerator operation to receive the first intermediate data from the storage, without the first intermediate data having been sent to the system memory, process the first intermediate data, and generate additional data.

24. The apparatus of claim 23, wherein the chained accelerator operation is to implement a Directed Acyclic Graph (DAG).

25. The apparatus of claim 23, wherein the first accelerator is to receive an instruction that is to indicate the chained accelerator operation, a source memory location in the system memory which is to store the input data, and a destination memory location in the system memory where the additional data is to be stored by the second accelerator.

* * * * *